United States Patent
Spencer

(10) Patent No.: US 6,342,261 B1
(45) Date of Patent: *Jan. 29, 2002

(54) METHOD OF PRESERVING FOODS USING NOBLE GASES

(75) Inventor: Kevin C. Spencer, Hinsdale, IL (US)

(73) Assignee: American Air Liquide, Walnut Creek, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/232,460

(22) Filed: Apr. 22, 1994

Related U.S. Application Data

(63) Continuation of application No. 07/863,172, filed on Apr. 3, 1992, now abandoned.

(51) Int. Cl.$^7$ .............................. A23B 7/152; A23B 7/00
(52) U.S. Cl. ....................... 426/312; 426/316; 426/615; 426/616; 426/629
(58) Field of Search .................. 426/658, 654, 426/652, 653, 549, 580, 574, 496, 498, 316, 324, 327, 331, 332, 262, 263, 264, 312, 330, 330.1, 330.2, 330.3, 334, 330.4, 330.5, 330.6, 333, 448, 615, 616, 629

(56) References Cited

U.S. PATENT DOCUMENTS

| | | |
|---|---|---|
| 2,569,217 A | 9/1951 | Bagdigian |
| 3,096,181 A | 7/1963 | Dixon et al. |
| 3,143,471 A | 8/1964 | Coady |
| 3,183,171 A * | 5/1965 | Schreiner |
| 3,378,443 A | 4/1968 | Cooper et al. |
| 3,677,024 A * | 7/1972 | Segall ..................... 426/524 |
| 3,725,076 A | 4/1973 | Stefanucci et al. |
| 3,957,892 A | 5/1976 | Kleiman |
| 4,008,754 A | 2/1977 | Kraushaar et al. |
| 4,017,363 A | 4/1977 | McMullen et al. |
| 4,044,004 A | 8/1977 | Saucy et al. |
| 4,136,049 A | 1/1979 | Horiishi et al. |
| 4,138,565 A | 2/1979 | Ehrhardt et al. |
| 4,308,264 A | 12/1981 | Conway et al. |
| 4,314,810 A | 2/1982 | Fourcadier et al. |
| 4,315,266 A | 2/1982 | Ellis, Jr. |
| 4,450,960 A | 5/1984 | Johnson |
| 4,496,397 A | 1/1985 | Waite |
| 4,501,814 A | 2/1985 | Schoenrock et al. |
| 4,515,266 A * | 5/1985 | Myers ..................... 426/419 |
| 4,548,605 A | 10/1985 | Iwamoto et al. |
| 4,622,425 A | 11/1986 | Gagne |
| 4,664,256 A | 5/1987 | Halskov |
| 4,812,320 A | 3/1989 | Ruzek |
| 4,830,858 A | 5/1989 | Payne et al. |
| 4,892,579 A | 1/1990 | Hazelton |
| 4,895,726 A | 1/1990 | Curtet et al. |
| 4,895,729 A * | 1/1990 | Powrie et al. .............. 426/316 |
| 4,919,955 A | 4/1990 | Mitchell |
| 4,946,326 A | 8/1990 | Schvester et al. |
| 4,965,165 A | 10/1990 | Saccocio et al. |
| 4,971,813 A | 11/1990 | Strobel et al. |
| 5,004,623 A | 4/1991 | Giddey et al. |
| 5,006,222 A | 4/1991 | Sequeria, Jr. |
| 5,021,251 A | 6/1991 | McKenna et al. |
| 5,030,778 A | 7/1991 | Ransford |
| 5,045,529 A | 9/1991 | Chiang |
| 5,064,070 A | 11/1991 | Higashiyama |
| 5,108,656 A | 4/1992 | Schvester et al. |
| 5,128,160 A | 7/1992 | Fath et al. |

FOREIGN PATENT DOCUMENTS

| | | |
|---|---|---|
| CA | 989 311 | 5/1976 |
| DE | 0635 601 | 9/1936 |
| DE | 3 007 712 | 10/1981 |
| DE | 3446829 A1 | 7/1986 |
| EP | 0111 595 | 6/1984 |
| EP | 204 532 | 12/1986 |
| EP | 0 289 777 | 11/1988 |
| EP | 0 346 201 | 12/1989 |
| EP | 0346 201 | 12/1989 |
| EP | 0412 155 | 2/1991 |
| EP | 0440 273 | 8/1991 |
| FR | 1 339 669 | 9/1963 |
| FR | 1 454 653 | 8/1966 |
| FR | 2 261 518 | 9/1975 |
| FR | 2 406 567 | 5/1979 |
| FR | 2 643 232 | 8/1990 |
| GB | 0415 656 | 8/1934 |
| GB | 1 376 362 | 12/1974 |
| GB | 2 029 846 | 3/1980 |
| GB | 2 091 556 | 8/1982 |
| JP | 52-27699 | 9/1972 |
| JP | 52-86987 | 7/1977 |
| JP | 52-97913 | 8/1977 |
| JP | 54-129185 | 10/1979 |
| JP | 1-059647 | 1/1980 |
| JP | 58-39650 | 3/1983 |
| JP | 60-56984 | 4/1985 |
| JP | 63-77848 | 4/1988 |
| JP | 2-104502 | 4/1990 |
| JP | 3-200568 | 9/1991 |
| SU | 1 289 437 | 2/1987 |

OTHER PUBLICATIONS

Collmb, M., et al, "Optimisation des donditons d'entreposage des ochantillions de frromage en laboratoire a l'aide d' analyses chimiques", Schweizerische Milch-wirtschaftlicheforschung, vol. 21, No. 1, 1992, pp. 6–11.

(List continued on next page.)

Primary Examiner—Anthony Weier
(74) Attorney, Agent, or Firm—Oblon, Spivak, McClelland, Maier & Neustadt, P.C.

(57) ABSTRACT

A method of preserving a food by contacting the food with a noble gas, a mixture of noble gases or a mixture containing at least one noble gas.

16 Claims, 25 Drawing Sheets

OTHER PUBLICATIONS

Derwent—Abstract No. 85–181496.
Derwent—Abstract No. 88–363951.
Derwent—Abstract No. 77–73631Y.
Patent Abstracts of Japan, publication No. 58193651.
Derwent—Abstract No. 79–65468B.
Derwent—Abstract No.78–73421A.
Chemical Abstracts, vol. 108, No. 9; abstract No. 74017f; see abstract & JP, A, 62 224 233 (Idemitsu Petrochemical Co. Ltd).
Database WPIL, Derwent Publications Ltd., London, GB; AN 85–181496; & JP,A, 60 110 663 (Kureha Chem. IND. KK) see abstract.
Database WPI, Derwent Publications Ltd., London GB; AN 80–72434C & JP,A,55 111 755 (Kyodo Gas KK) Aug. 29, 1980 see abstract.
Database WPIL, Derwent Publications Ltd., London, GB: AN 85–181496 & JP,A,60 110 663 (DAIO KK) 11/88; cited in the application; see abstract.
Database WPIL, Derwent Publications Ltd., London, GB: AN 77–73631 & JP,A, 52 105 232 (Teikoku Sanso KK) 9/77; cited in the application; see abstract.
Patent Abstracts of Japan, vol. 8, No. 30, (C–209) 2/84; & JP,A,58 193 651 (Kawai Masao) 11/83 see abstract.
Federation Proceedings, vol. 26, No. 2, Mar.–Apr. 1967, p. 650, G.F. Doebbler, et al., "INERT Gas Interactions and Effects on Enzymatically Active Proteins".
Febs Letters, vol. 62, No. 3, Mar. 1976, pp. 284–287, K. Sandhoff, et al., "Effect Of Xenon, Nitrous Oxide and Halothane on Membrane–Bound Sialidase from Calf Brain".
Aviation, Space and Environmental Medicine, vol. 48, No. 1, Jan. 1977, pp. 40–43, S.K. Hemrick, et al., "Effect of Increased Pressures of Oxygen, Nitrogen, and Helium on Activity of a Na–K–Mg ATPase of Beef Brain".
Undersea Biomedical Research, vol. 17, No. 4, 1990, pp. 297–303, J.S. Colton, et al., "Effect of Helium and Heliox on Glutamate Decarboxylase Activity".
Sciences Des Aliments, vol. 4, No. 4, 1984, pp. 595–608, B. Pichard, et al., "Effect Of Nitrogen, Carbon Monoxide and Carbon Dioxyde on the Activity of Proteases of *Pseudomas fragi* and *Streptomyces caespitosus*".
Chemical Abstracts, vol. 68, No. 14, AN–60751j.
Chemical Abstracts, vol. 74, No. 23, AN–121276I.
Chemical Abstracts, vol. 76, No. 13, AN–70898s.
Chemical Abstracts, vol. 80, No. 7, AN–35579z.
Chemical Abstracts, vol. 80, No. 11, AN–56112g.
Chemical Abstracts, vol. 86, No. 3, AN–14672h.
Chemical Abstracts, vol. 87, No. 22, AN–172800y.
Chemical Abstracts, vol. 91 No. 17, AN–138183x.
Chemical Abstracts, vol. 93, No. 24, AN–225670p.
Chemical Abstracts, vol. 97, No. 18, AN–145890c.
Chemical Abstracts, vol. 98, No. 10, AN–78191f.
Chemical Abstracts, vol. 99, No. 21, AN–172397v.
Chemical Abstracts, vol. 106, No. 25, AN–210601e.
Chemical Abstracts, vol. 115, No. 20, AN–214644e.
WPI Abstracts, AN–70–84762R, DE–1753586.
WPI Abstracts, AN–82–05785E, DE–3 202 622, Sep. 9, 1982.
Federation Proceedings, vol. 27, No. 3, May–Jun. 1968, H.R. Schreiner, "General Biological Effects of the Helium–Xenon Series of Elements".
156 Food Technology, vol. 34, No. 6, Jun. 1980, p. 102.

* cited by examiner

METHOD OF PRESERVING FOODS USING NOBLE GASES

This application is a continuation of application Ser. No. 07/863,172, filed on Apr. 3, 1992, now abandoned.

BACKGROUND OF THE INVENTION

1. Field of the Invention

The present invention relates to a method of preserving foods using noble gases.

2. Description of the Background

Gas packaging of foods for preservation is well known, and a general description of this technique may be found in A. L. Brody, *Controlled/Modified Atmosphere/Vacuum Packaging of Foods*, Food & Nutrition Press, Trumbull, Conn. 01989. A description of important consumer quality perception parameters is presented in J. J. Jen, *Quality Factors of Fruits and Vegetables, Chemistry and Technology*, ACS Symposium Series No. 405, American Chemical Society, Washington, D.C., 1989, and a description of the biochemical and chemical reactions important in foods may be found in N. A. Michael Eskin, *Biochemistry of Foods*, second ed., Academic Press, New York N.Y., 1990.

It is evident from these sources that a large preponderance of modern and past gas packaging methodologies have relied primarily upon the use of carbon dioxide, nitrogen, and oxygen, alone or in mixtures. Generally, nitrogen is used as an inerting; or non-reactive gas, to displace oxygen in order to prevent oxidation or limit respiration. Generally, carbon dioxide is used as a microbiocidal or microbiostatic agent, or as in the case of certain beverages, to provide an effervescent effect. Carbon dioxide is also often used as an inerting gas. Generally, oxygen is used as such or as the active component in the inclusion of air to permit aerobic respiration or to prevent the development of anaerobic conditions which might permit the growth of pathogenic microorganisms.

For example, U.S. Pat. No. 4,454,723 describes a refrigerated trailer cooled by sprinkler water with concomitant release of inerting nitrogen from a cryogenic source, for inerting the respiration of produce.

CH 573848 also describes the inerting activity of nitrogen in the preparation of coffee packages.

Irisawa, 1974, describes the use of a nitrogen atmosphere or liquid in the preservation of strawberries, salmon, and fish.

Kocys and Veskevicius, 1970, describe the storage in nitrogen.

Lapin and Koburger, 1974 describe the storage of shrimp in N2, showing improved control of bacteria.

Moor, 1984 describe storage of malting barley in a N2 atmosphere.

Niu and Su, 1969, describe effective storage of bananas in N2.

Lebedeva et al., 1984, describe the utility of nitrogen in storage of sunflower seeds preserved in a nitrogen atmosphere as due to a change in oxidative metabolism, that is, respiratory rates.

U.S. Pat. No. 4,515,266 exemplifies the importance of package type in gas packaging applications. A modified atmosphere packaging high barrier film is used in the packaging, and a preservative atmosphere is introduced into the package. The essence of the packaging process is that it allows preservative gases, such as nitrogen gas for inerting, to be introduced, but at the same time prevents air from getting into the package which would allow oxygen to contact the food and which would then cause degradative oxidation of the food product.

U.S. Pat. No. 4,522,835 shows that gases whose molecules contain oxygen can often be reactive in food systems, herein including oxygen, carbon dioxide and carbon monoxide. Preservation of color in poultry, fish is claimed by reducing oxygen content to produce myoglobin/hemoglobin versus the ordinary oxidized states of oxymyoglobin/hemoglobin, and finally adding carbon monoxide to produce carboxymyoglobin/carboxyhemoglobin, then storing under carbon dioxide to maintain the thus improved color. Storage under inert nitrogen is possible, as is further reoxidation using oxygen.

EP 354337 claims the use of carbon dioxide as an antibacterial agent in the preservation of foods.

SU 871363 illustrates the complexity of gas packaging methodologies, as specific regimes of preparation and gas applications are often recommended. This patent describes the storage of plums in nitrogen, oxygen and carbon dioxide mixtures in three separate steps. 1st, 2–2.5 wks at 0° C. in 78–82% nitrogen+10–12% oxygen+8–10% carbon dioxide; 2nd, for next 2.5–3 wks at –1° C. in 93–95% nitrogen+3–5% oxygen+2–4% carbon dioxide; 3rd, remainder of storage period at –2° C. in 90–92% nitrogen+2.5–3.5% oxygen+ 4.5–5.5% carbon dioxide. The method claims 99.4 vs 91–94% good condition after 151 days. This marginal increase may be considered to be due primarily to more effective regulation of the respiratory gas exchange between oxygen and carbon dioxide, where nitrogen plays no real part except as an inert bond non-reactive carrier gas.

SU 1245284 reinforces such concepts of treatment. Here cherries are better kept under a limiting respiratory mixture of carbon dioxide 5–8%+oxygen 4.5–5.5%+nitrogen bal. It is important that the fruit be picked at the correct maturation stage, and kept chilled at 0 to –1° C., also to lower respiration.

WO 9015546, CA 2019602, AU 9059469 each describes the importance of the climacteric state of foods, that is the ethylene-induced maturation phase of the product. Each discloses improved preservation of food in a process using two gas separators, where first, unwanted gases, such as ethylene, oxygen, carbon dioxideand water vapor are removed, second, the preservative (inert or respiratory mix) gas is supplied.

JP 55029426 use a complex mixture of 20–99.5% nitrogen and/or carbon dioxide+80–0.5% ethanol vapor where residual oxygen is 10%. In an impermeable package, this is claimed to prevent sticky-substance forming fungi growth.

Burgheimer et al., 1967 provides evidence of the chemical changes which occur during exposure to oxygen, here spinach in air versus in a controlled atmosphere of nitrogen undergoes considerable degradative changes in vitamin C and ascorbic acid contents.

Similarly, Consignado et al. 1976 compare the sugar content of stored coconuts under air versus nitrogen, and find that sugar content is not surprisingly correlated with availability of oxygen for respiration.

Thus, it is evident that the gases oxygen, carbon dioxide, and nitrogen alone or in mixtures have the well-established effects of oxidation, antimicrobial activity, and inerting, repectively. It is also evident that the balance of such gases in an atmosphere superimposed upon living systems may depress respiration and the resulting production or maintenance of chemical and other food quality parameters in basic and well-understood ways. It is also evident that oxidative and reactive gases will have destructive effects upon chemical and biological systems.

Although literature has appeared describing the use of argon for packaging, this literature generally describes the gas to be completely inert and equivalent to nitrogen or the other noble gases in their non-reactivity.

It is also clear from the following literature citations that argon is typically described or used as an inert or non-reactive gas equivalent not only to nitrogen and the other noble gases, but that carbon dioxide, nitrous oxide and hydrogen and other gases are considered inert as well. This is particularly the case for food gas packaging systems.

For example, JP 2010077 describes the use of a mixed gas source to supply a gas packaged product with a mixture of nitrogen:carbon dioxide:ethylene 60:30:1 where the small amount of argon present is inert.

Also, JP 3058778 (89192663) describes storage and maturation of alcoholic drinks in an argon headspace. Deterioration can be prevented and maturation can be promoted or delayed by regulating the packaging density of argon. The utility of the argon lies in its displacement of oxygen, i.e., inerting.

JP 58101667 (88019147) describes sealing of citrus drink in vessels under pressure using an inert gas such as argon, so that bubbles are released upon opening which then cling to pulp.

JP 60134823 discloses a process whereby packaging of liquid food by is accomplished by feeding sterile liquid into the package under pressure with an inert gas, either nitrogen or argon.

JP 62069947 (88051660) discloses long term preservation of shiitake mushrooms in the dark in a container in a mixture of nitrogen:carbon dioxide:argon:nitrous oxide. Argon is described therein as an inert gas.

JP 63273435 describes preserving roasted chestnuts in a permeable container in a mixture of argon, carbon dioxide, nitrogen and nitrous oxide. The container is permeable to argon, therefore, it can have no utility.

JP 7319947 (730618) claims fruit juice preservation with noble gases. However, argon, helium and nitrogen are described as inert gases.

JP 77027699 describes a process for freezing and storing under pressure, the pressure being applied as carbon dioxide or nitrogen or argon or hydrogen, all being considered equally inert.

U.S. Pat. No. 4,054,672 (JP 7169757) describes the defrosting of frozen foods under a pressure of 2–5 atmospheres, preferably under carbon dioxide or nitrogen or helium or argon, all being inert, non-reactive and non-oxidizing.

JP 89192663 claims preservation of alcoholic beverages with argon, specifically sake and wine in containers, wherein argon is considered as a superior inerting agent due to its higher solubility than nitrogen.

U.S. Pat. No. 3,096,181 describes a food processing method and apparatus used in gas-packaging of tomato juice or liquid food products or vegetable concentrates, wherein any inert gas from the group of nitrogen, argon, krypton, helium, or mixtures thereof, are equally inert and useful at or above ambient pressure, after steam sterilization.

U.S. Pat. No. 3,128,188 describes lagering Ruh beer under an inert atmosphere.

U.S. Pat. No. 3,442,657 claims the preservation of hops in an inert atmosphere.

U.S. Pat. No. 3,498,798, CA 867629 describe a package for potato crisps which is impermeable and in which an inert gas is used to displace oxygen as the functionally useful step. It is disclosed that any of nitrogen or carbon dioxide or argon or neon may be used equivalently.

U.S. Pat. No. 3,535,124 discloses a process for fresh fruit juice preservation in a dispenser using carbon dioxide, wherein preferably the juice is sprayed through an inert atmosphere.

U.S. Pat. No. 3,587,203 describes the gas packaging of tossed salad cut and prepared ready to eat, where it is stored in an inert atmosphere in order to prevent oxidative discoloration.

U.S. Pat. No. 3,715,860 describes a method of gas packaging wherein inert fluid passage through an impermeable container functions to remove oxygen and prevent spoilage.

U.S. Pat. No. 4,152,464 describes a method and apparatus to sterilize packages which includes applying sterile any inert gas into an enclosed space.

U.S. Pat. No. 4,205,132 describes the storage of lyophilized bacteria. Storage requires the complete absence of oxygen, preferably using argon inerting because argon commercially contains very low levels of oxygen.

U.S. Pat. No. 4,229,544 describes the storage of dormant living microorganisms by gas packaging in nitrogen, argon or helium, where all are equivalent.

U.S. Pat. No. 4,391,080 describes a gas packaging machine in which the essence of the invention is the filling of the package through the machine with sterile inert gas.

U.S. Pat. No. 4,524,082 describes the preparation of concentrated egg white or salted whole egg product under inert atmospheres.

U.S. Pat. No. 4,627,336 also describes a gas packaging apparatus which requires the flushing of inert gases to replace air.

In U.S. Pat. No. 4,803,090, which concerns the preparation of cheese puffs in hot oil, it was not noticed that different inert gases produce any difference in the product.

Also, U.S. Pat. No. 4,835,937 describes a food packaging process involving flushing and filling with inert gas.

A similar process is claimed in U.S. Pat. No. 4,870,801.

U.S. Pat. No. 4,901,887 claims a beverage dispenser which is pressurized with an inert gas.

In U.S. Pat. No. 4,919,955 a gas packaging method for meat is described wherein inert gas is used to package and store the meat, and at a later stage oxygen is added to the package to permit oxygenation of the myoglobin to produce a red color.

Cooling of foods by direct injection of gases is described in DE 2147880, ZA 7106193, FR 2107946, GB 1371027, where any of nitrogen, oxygen, argon, or even Air may be used equivalently.

DE 2736282, WO 7900092, HU H2477, GB 2021070, DD 137571, DD 137571, EP 6888 describe a beer tank road tanker charging system which uses inert gas constituting any of carbon dioxide, nitrogen, or noble gas.

A process is claimed in EP 146510, SE 8306164, NO 8404468, FI 8404402, DK 8405347 for extrusion of porous foodstuffs by compression, heating and extrusion in an inert atmosphere, e.g. nitrogen or carbon dioxide.

EP 289777, AU 8814003, JP 1020056, U.S. Pat. No. 4,895,729 claim the packaging of cut or segmented fresh fruit pieces by flushing with O2-containing gas, sealing, cold shocking, refrigerating, wherein the preferred mixture is 5–50% oxygen and the balance is any inert gas from the group nitrogen, helium, argon or hydrogen.

BE 881368, DE 2903300, NL 8000353, GB 2042320, FR 2447155, U.S. Pat. No. 4,289,148, CA 1127037, CH 642519, NL 177974, IT 1130237 describe the improvement of packing capacity of tobacco by applying pressure using either nitrogen or argon then heating.

The pressurization of foods by sterile heat, followed by inert gas packaging is claimed in EP 368603, using either nitrogen or carbon dioxide. The factors of importance are water and oxygen content.

ES 8500634 discloses a method of vinification without using preservatives, using inert or non-reactive gas to displace oxygen to prevent aerobic microbial growth. Any of nitrogen, carbon dioxide, or the noble gases are deemed equally useful.

GB 1331533, FR 2089899, BE 765637, DE 2031068, CH 522734 describe a method of improving the keeping properties of alcoholic beverages produced by fermentation which prevents the destructive action of oxygen by displacing oxygen during or after fermentation and/or at any process stage and/or during storage under preferably nitrogen, but Ar or other noble gases may be used, all being equivalently inert.

IT 1190200 describes the use of an inert gas atmosphere upon agricultural products to prevent attack by aerobic microorganisms.

SU 249965 describes storage of brined meat e.g. ham under e.g. Ar as an inerting process.

SU 825619 describes a tank for storing wine in inert gas atm with filling controls. First the tank is filled with carbon dioxide, then wine is fed by pump or inert gas sprayer.

WO 8600503, DE 3425088, AU 8546026, EP 189442, DE 3448380 each disclose use of gas in the heating of liquid food products while maintaining pressure to prevent loss of aroma and prevent boiling. For milk and coffee prods, especially an inert gas and non-reactive such as nitrogen or a noble gas.

FR 2225095 describes the gas packaging of roasted coffee where the coffee is degassed in inert and non-reactive gas, preferably carbon dioxide, for 12–48 hrs, impermeable packets are filled with the coffee, a 50–90% partial vacuum is drawn, followed by injection of a preservative gas, where either argon or nitrogen at preferably less than <1 atm may be used equivalently. The effectiveness of such inerting is claimed as a ten-fold improvement in shelf life.

In FR 2621224 for avocado pulp or other, the grinding in inert gas, followed by adding other flavoring food product liquids is claimed.

Storage of refrigerated butter under an inert atmosphere is claimed in FR 2642275, where the gas may be nitrogen or others.

Rzhavskaya 1967 describes the utility of nitrogen in preventing oxidation of whale fats due to displacement of oxygen.

Shejbal, 1979a,b describes the use of nitrogen in preservation of cereals and oilseeds by inerting.

Terebulina et al., 1983 describes lipid oxidation of rice in air as controllable by displacement of oxygen to prevent repiration and oxidation.

Corey et al., 1983, in addressing storage issues, measured nitrogen and carbon dioxide diffusion rates through cucumber and found carbon dioxide was three times as soluble as nitrogen. Solubility was determined to be the critical factor in storage atmosphere choice. Argon was used as an inert gas control.

Fullerton et al., 1982 show improvement in storage of animal feeds under argon as inerting agent because of its solubility and lack of oxygen content.

Pichard et al., 1984 tested the enzymes of bacteria, specifically Pseudomanas proteases under carbon monoxide, carbon dioxide and nitrogen. Air and Ar as mixers and controls. Only carbon dioxide was found to have effects, which conflicted depending upon which protease was measured, and argon was specifically found not to have an effect on these enzymes.

Zee et al., 1984 studied the effects of carbon monoxide, carbon dioxide and nitrogen on bacterial growth on meat under gas packaging. They used argon as a fully inert control. It was found that argon and nitrogen were equivalent in inhibition of anaerobes, and acted as inerting agents in inhibiting aerobes. Specifically, 4 strict aerobes, 3 anaerobes, and 12 facultative anaerobes isolated from meat were grown under carbon dioxide, argon, nitrogen, carbon monoxide, where argon was "inert" containing 10–70% nitrogen, carbon dioxide or carbon monoxide. Ar effect was found to be due strictly due to the gases in which it was admixed.

In the medical area, the noble gases are described as being useful in the preservation of living organs, cells, and tissues, primarily due to the high solubility and penetrability of the gases. For example, Ikegami et al., 1979, compare sperm motility and viability in nitrogen, argon, helium and carbon dioxide, where thermal factors are most important.

SU 507187 discloses improved preservation of bone transplants in a mixture of argon and formalin. The function of the argon is claimed as inerting.

In U.S. Pat. No. 4,008,754, preservation of isolated organs is described wherein helium or nitrogen or helium+xenan or helium+xenan+sulfur hexafluoride function equally well in preserving tissues in cooling. Similar results are described in Voss et al., 1970; SU 1289437; Ruile et al., 1971; Braun et al., 1973 (for freezing); Poppert et al., 1973. In the latter, organ preservation in hyperbaric xenon is described.

Thus, it is evident from the above that argon is perceived of and has been clearly described in both patent and in literature citations to be an inert and non-reactive gas, capable of affecting biological systems, such as food products, medical tissues, chemical reactions, enzymes, and food storage parameters only by means of displacing more active gases, such as oxygen. Thus, argon has been conventionally considered to be the equivalent of nitrogen as an inert and non-reactive gas, and is presently differentiated for use in the food industry solely based upon such commercial factors as cost, availability, and purity.

While a few literature citations are known in which it has been even suggested that argon and other noble gases may have properties unique for application to biological systems or food, each of these citations are different and clearly fail to teach or even suggest the conclusion upon which the present invention is premised.

For example, JP 52105232, (80002271), 1059647 describe the use of a gas mixture containing argon for preserving roasted chestnuts by retarding the growth of anaerobic molds, and extends this preservation to include rice cakes, bread, cakes in 80–20:30:70 argon:carbon dioxide, describing that this prevents growth of molds and anaerobic microorganisms. However, the data provided are self-conflicting, holding that neither high nor low levels of argon have effects, but that intermediate values do, in a simple experiment in which significant data are not presented, no tests or controls for oxygen levels were conducted, and no demonstration of the described anaerobicity of the molds tested was made. In fact, the data do not show an improvement for argon, and may be interpreted as simply proposing the substitution of argon for nitrogen as an inert and non-reactive gas.

JP 55111755 describes the preservation of cereals or vegetables in nitrogen+carbon dioxide, optimally containing also helium or argon (1–10 preferably 4–6% in the mixture) in 5–70% carbon dioxide in 95–30% nitrogen. This description is made to allow for the inclusion of noble gases as contaminants in other gases, however, the disclosed benefit of the noble gases is demonstrably impossible as reducing the content of the noble gas in the mixture cannot and does not improve the possible benefit. Further, described improvement in storage of cereals and vegetables (rice, onions, potatoes) preserved for long periods manifested itself by the suppression of budding. Argon and helium are described specifically to help color and glossiness. At the levels described, no improvement is possible, and even repetition of these experiments can show no effect.

Further, Manchon, 1978 studied preservation of bread and pastry in controlled atmosphere packaging. Poor results were obtained using nitrogen or argon or nitrogen+carbon dioxide. Good results were obtained using nitrous oxide or ethylene oxide+carbon dioxide. However, nitrous oxide is a reactive gas, and experiments carried out as described could only have substantiated argon to be inert and non-reactive.

U.S. Pat. No. 3,183,171 describes the control of fungal growth by noble gases. In particular, mixtures of carbon dioxide, carbon monoxide, oxygen, water vapor, or nitrogen with helium, xenon, krypton, neon, argon or a mixture of these, or a noble gas fraction constituting between three and ninety-five percent were used. Inhibition of growth rate is described for most mixes containing argon, xenan, krypton, or neon, while enhancement of growth rate is claimed when helium is added to certain mixtures. The very limited data were obtained solely for *Neurospora crassa*, as hyphal length increase over time.

U.S. Pat. No. 3,183,171 is based upon data presented *Neurospora crassa*. This patent did not demonstrate that hypha growth is equivalent to growth of the organism. By contrast, in accordance with the present invention; as will be described hereinafter, it has been discovered that enzymes responsible for fugal growth are inhibited and it is evident that the data of U.S. Pat. No. 3,183,171 describes effects for the control of hypha growth and not for the enzymatic control of microorganism growth. Thus, it is not possible from U.S. Pat. No. 3,183,171 for the artisan to comprehend that effective control of microbial growth is possible with noble gases.

As proof thereof, it is noted tha no application of practical utility in the control of microbial growth with noble gases has been made in the intervening twenty-five years.

Helium and high pressure application of various noble gases have been described as affecting the growth of bacteria (Fenn and Marquis, 1968, Thom and Marquis, 1979, Hegeman and Featherstone, 1969); protozoa (Sears et al., 1964), mammalian cells (Bruemmer et al.; 1967; Schreiner 1964, 1965, 1966 Nonr) and bacterial spore germination (Enfors and Molin, 1977). These results are cited in Schreiner, 1968 and Behnke et al., 1969). However, all of these reports provide inconclusive results and are difficult to interpret.

The use of nitrous oxide is described in U.S. Pat. No. 3,398,001, where during preparation and packaging of frozen avocados, freezing in nitrous oxide or nitrogen, followed by packaging in nitrogen using and oxygen level of <2%, gave good preservational results.

A two-step treatment process for fresh fruits and vegetables is disclosed in EP 0422995 whereby nitrous oxide (10–100%) in admixture with oxygen and/or carbon dioxide is applied to vegetables for a time period in a first phase of treatment, followed by a separate second phase application of a gas mixture which contains nitrous oxide (10–99%) admixed with oxygen or carbon dioxide or nitrogen, which by action of the nitrous oxide then confers preservation. It is clearly described that nitrogen or argon are equally inert and non-reactive gases which may be freely used to complement in bulk any given gas mixture without effect.

Nitrous oxide has been shown to prevent ethylene formation and to provide significant fungistatic activity. For example, data are clearly presented in FR 2191850 proving the effective dissolution of nitrous oxide into the fruit/vegetable whereby it may be present to have an effect.

EP 0422995, AU 9063782, CA 2026847, ZA 9005704, FR 2652719, BR 9004977, JP 03206873, PT 95514 each describes a two-step treatment for preserving fresh vegetables by exposure at refrigeration temperature to an atmosphere of nitrous oxide and/or argon (other noble gases are specifically claimed to be inert) and optimally oxygen. Mixtures used variously include high titers of nitrous oxide, oxygen, carbon dioxide or nitrogen.

For packaging, a semipermeable membrane is described which has poor ability to retain argon. No controls were made, however, in the experiments for carbon dioxide or oxygen or nitrogen or argon, and no apparent action can be attributed to any gas except nitrous oxide.

The essence of each of these disclosures pertains to a two-step treatment process, not simple gas packaging, in which applied nitrous oxide or argon directly interferes with the production of ethylene by the fruit (tomatoes were tested). Argon is claimed to have specific utility in this regard, however, it is obvious from the data presented that the only effect of argon is to displace oxygen from the tissues of the fruit and thereby to limit respiration and thus ethylene production. The essential data presented in the figure purport to show a difference in ethylene production of air, nitrogen, argon and nitrous oxide which is precisely identical to their differences in solubility in the fruit (data given in EP 0422995 and below). In fact, this has been proven by duplicating the above experiment wherein adequate controls for solubility were made by inclusion of other gases, and finding that depression of ethylene is completely explained by oxygen displacement. Data are presented in FIG. 1 of the present specification.

Thus, the above descriptions of uses of argon in food treatment demonstrate only the inertness or non-reactivity of argon and merely confirm its ability as a non-reactive gas to displace air.

Addition of argon to a known mixture of carbon dioxide+oxygen is claimed in Schvester & Saunders. U.S. Pat. No. 4,946,326, EP 346201, PT 90762, AU 8936152, DK 8902755, BR 8902636, JP 2053435, ZA 8904258 to be effective in preservation of seafood and fish at 4° C. The mixture comprises in partial pressure 5–68% carbon dioxide+5–20% oxygen+27–45% argon (preferably 50:20:30 carbon dioxide:oxygen:argon). The text describes the mixture as slowing down enzymatic and chemical reactions at the surface and inside fish and seafood products, as well as growth of some microorganisms such as fungus. No such data are presented, and no claim is made thereto. Other studies on such mixtures and such products find opposite results.

The results disclosed are not generally reproducible, and, in fact, are due entirely to careful control of processing hygiene, and the effects of carbon dioxide on microbes. The results presented are generally not significant and do not control for the known effects of carbon dioxide, oxygen and nitrogen alone or in mixtures without noble gases. It is clearly not apparent from the data disclosed that any observed effect is in fact due to argon or to the specific mixture claimed. The effects may be rationally be concluded to be due to the other components alone or in partial combination.

Moreover, EP 354337 describes an effect of carbon dioxide upon bacterial systems. Such effects are widely known and understood as being caused by the depressive effect of carbon dioxide upon ordinary repiratory processes, which cannot be interpreted as being specifically antienzymatic. The observed results in U.S. Pat. No. 4,946,326 can be largely attributed to the simple depression of respiration by carbon dioxide.

Additionally, JP 89/192663 describes the use of argon as an inert gas in the storage of liquors, while JP 88/51660 discloses the use of argon as an inert gas in the storage of mushrooms.

JP 87/108025 describes the use of a mixed gas including nitrogen, carbon dioxide, argon and nitrous oxide to store roasted chestnuts.

JP 70/66269 discloses a method of processing orange, lemon, group and pineapple juice and for preserving such juices by dissolving inert or non-reactive gases, such as nitrogen, argon and helium in the juice to a saturation level.

Thus, a considerable volume of literature exists generally relating to the gas packaging or gas saturation of foods. Some of this literature relates to the use of noble gases and inert gases in food packaging, using such gases as inerting or non-reacting agents equivalent to nitrogen. However, it would be extremely advantageous if a means were attained by which food substances could be preserved directly and not indirectly by mere oxygen displacement.

SUMMARY OF THE INVENTION

Accordingly, it is an object of the present invention to provide a method of preserving foods using at least one noble gas.

It is also an object of the present invention to provide various gas mixtures for effecting the above method.

It is further, an object of the present invention to provide a method for inhibiting enzymes which cause microbial organisms to grow in food and/or on food.

It is also an object of the present invention to provide a method for inhibiting enzymes produced by food which cause degradation thereof.

Moreover, it is an object of the present invention to provide a method for inhibiting enzymes secreted by spoilage microorganisms and/or on food.

Further, it is an object of the present invention to provide a method for inhibiting enzymes in and/or on food.

It is also an object of the present invention to provide a method for preserving color and/or appearance of a food product.

Also, it is an object of the present invention to provide a method for inhibiting non-enzymatic chemical oxidation reactions of a food product.

Moreover, it is an object of the present invention to provide a method for inhibiting chemical oxidative degradative reactions in food.

It is also an object of the present invention to inhibit oxidative degration of color in foods.

Moreover, it is also an object of the present invention to provide a method for preserving foods without using technologies which result in undesired changes in a food product, such as organoleptic, rheological, microbiological and nutritional changes.

Accordingly, the above objects and others which will become more apparent in view of the following disclosure are provided by a method of preserving a food by contacting the same with a noble gas, a mixture of noble gases or a gaseous mixture containing at least one noble gas.

DETAILED DESCRIPTION OF THE PREFERRED EMBODIMENTS

Figure 1:
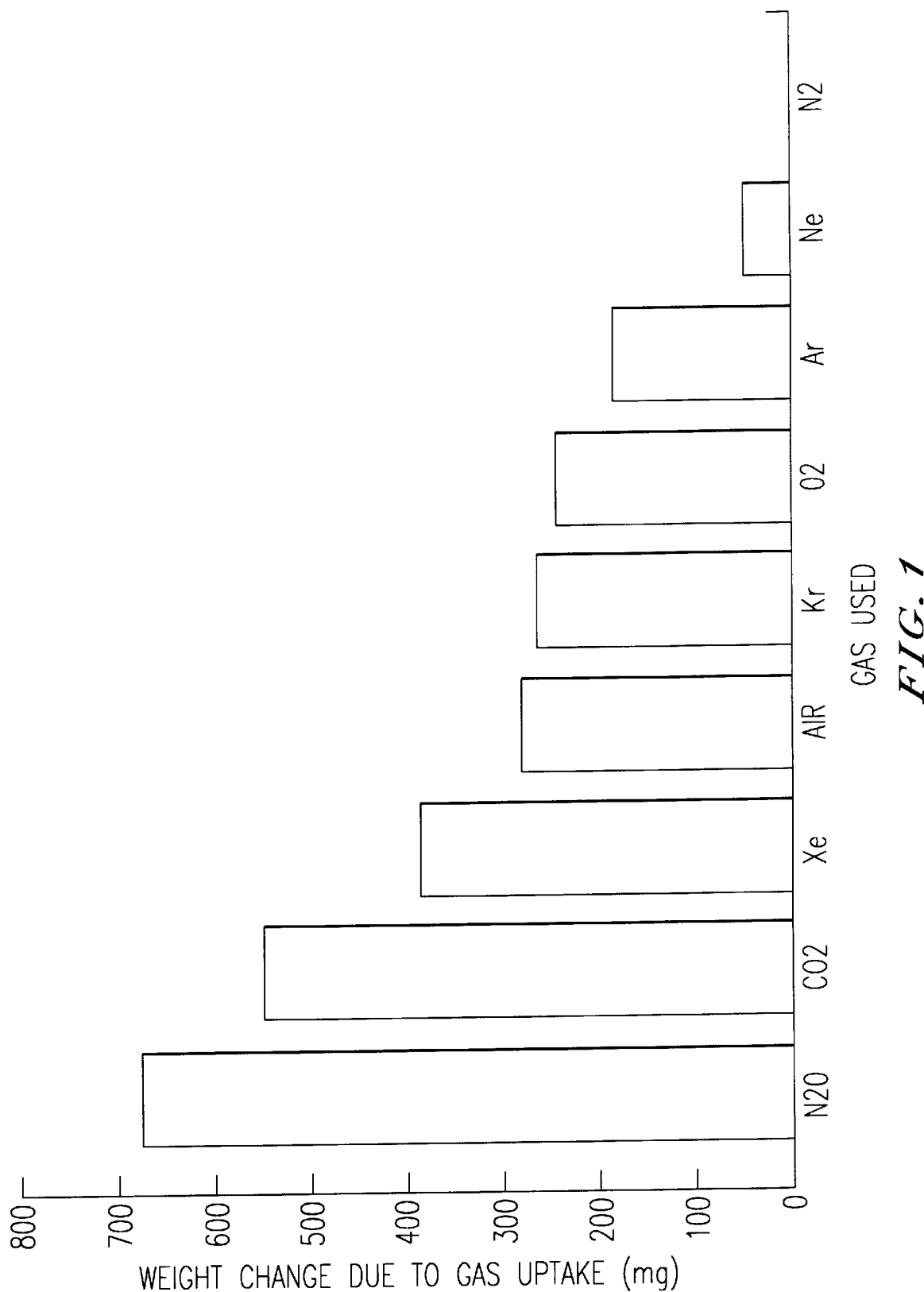
FIG. 1 illustrates weight change in tomatoes at room temperature due to gas uptake for different gases.
Figure 2:
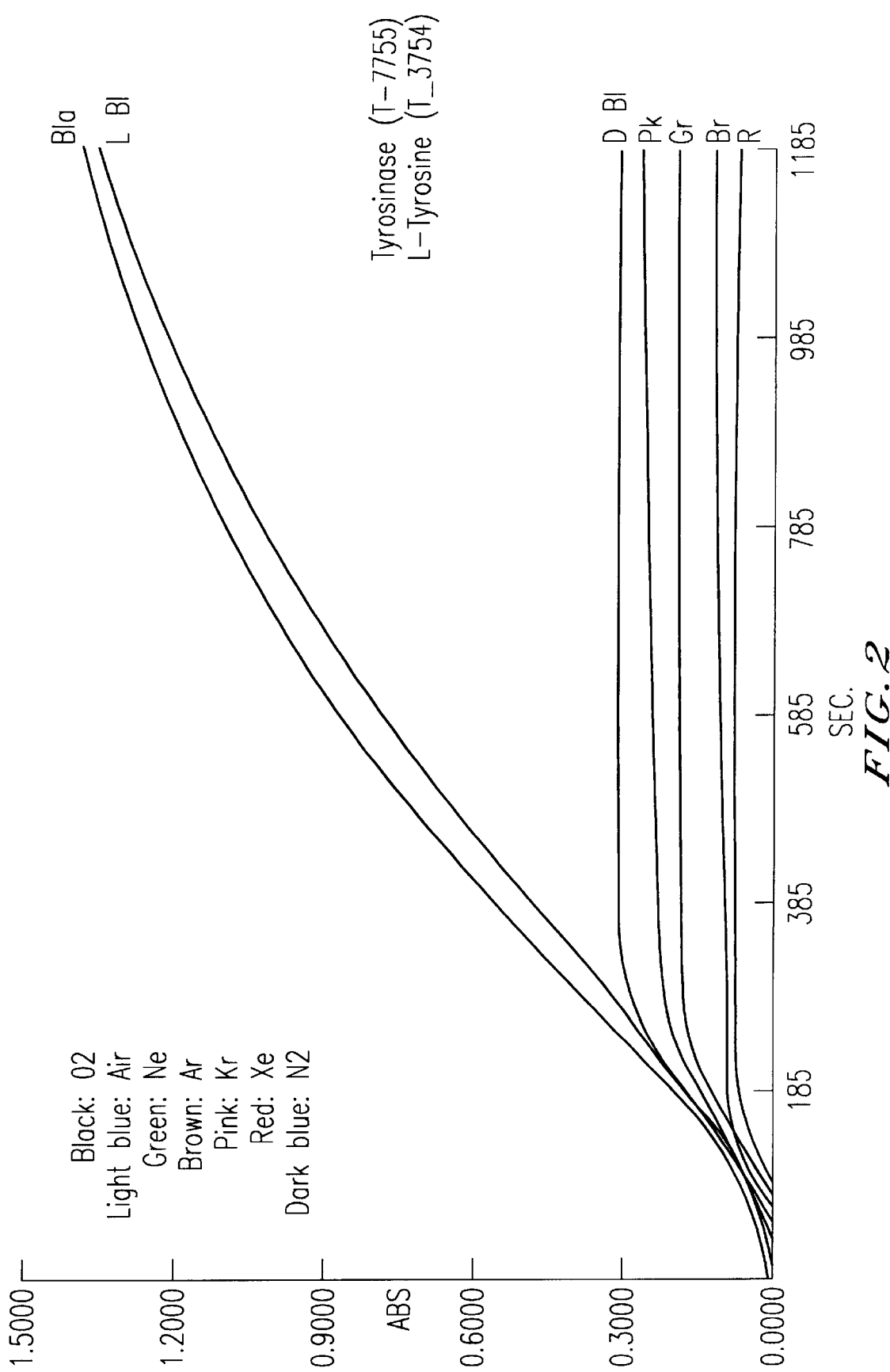
FIG. 2 illustrates the effect of different gases as indicated on the enzyme tyrosinase at 25° C.
Figure 3:
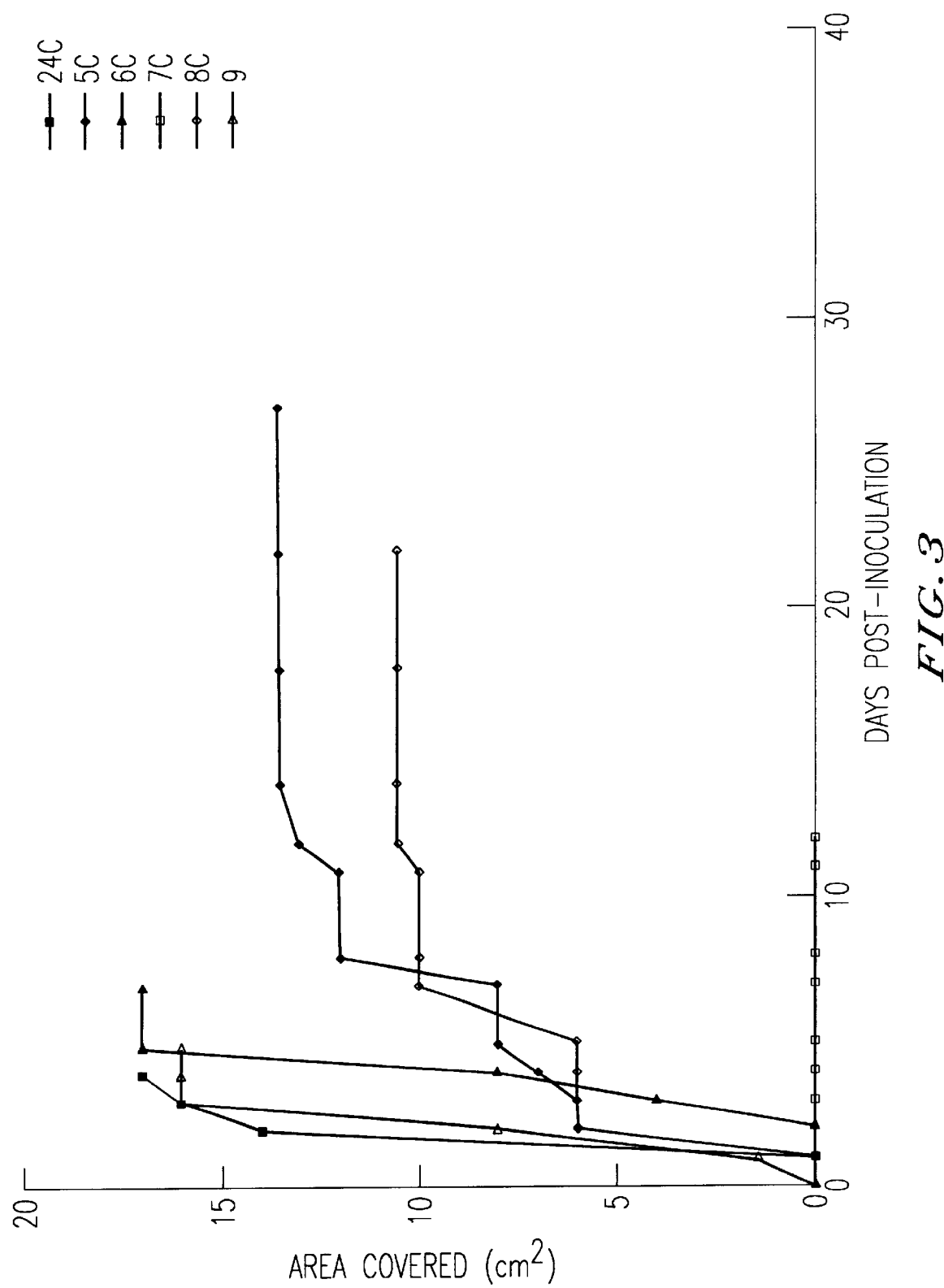
FIG. 3 illustrates the effect of noble gas atmospheres upon the growth of A. alternata.
Figure 4:
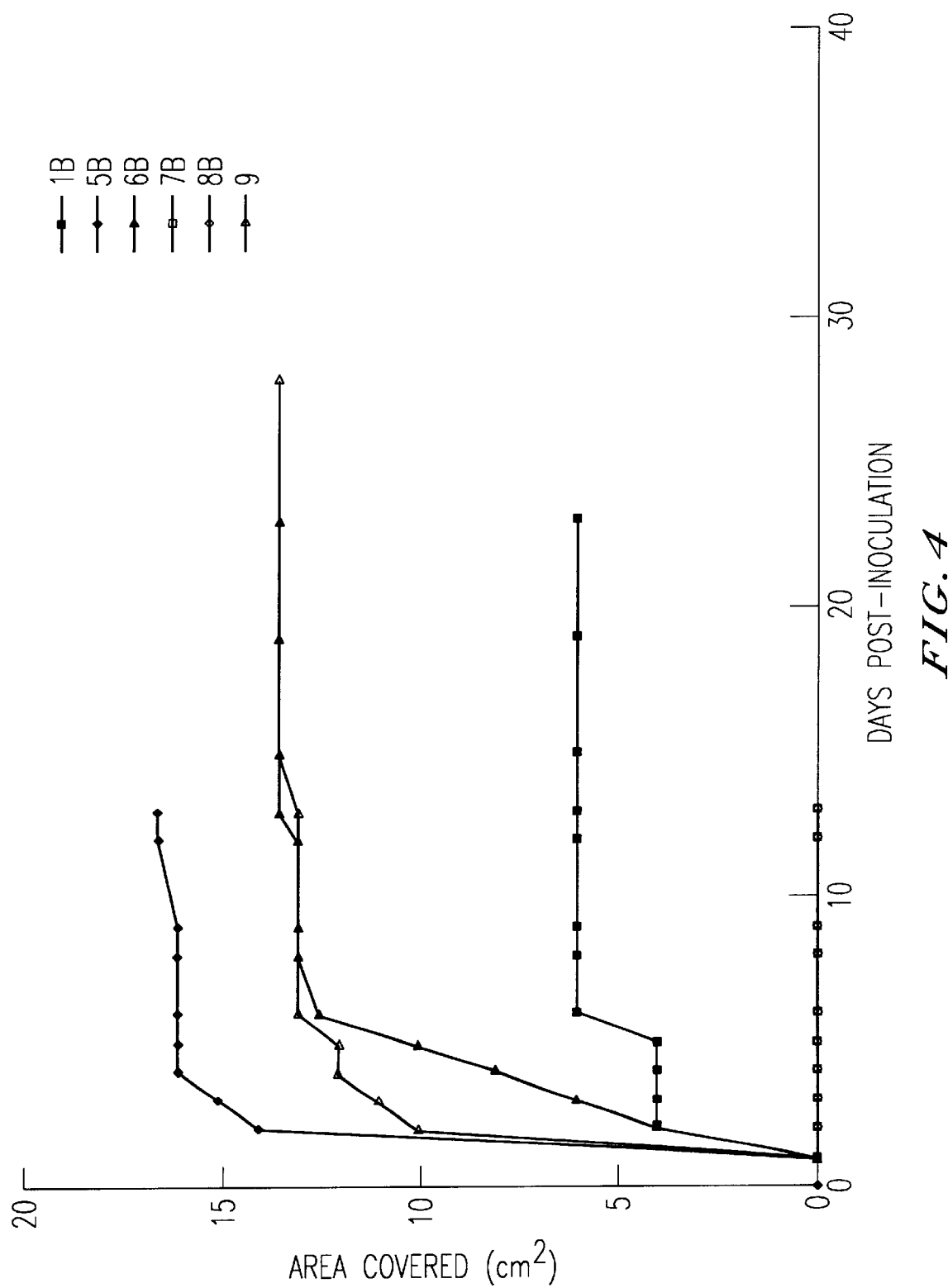
FIG. 4 illustrates the effect of noble gas atmospheres upon the growth of E. coli.
Figure 5:
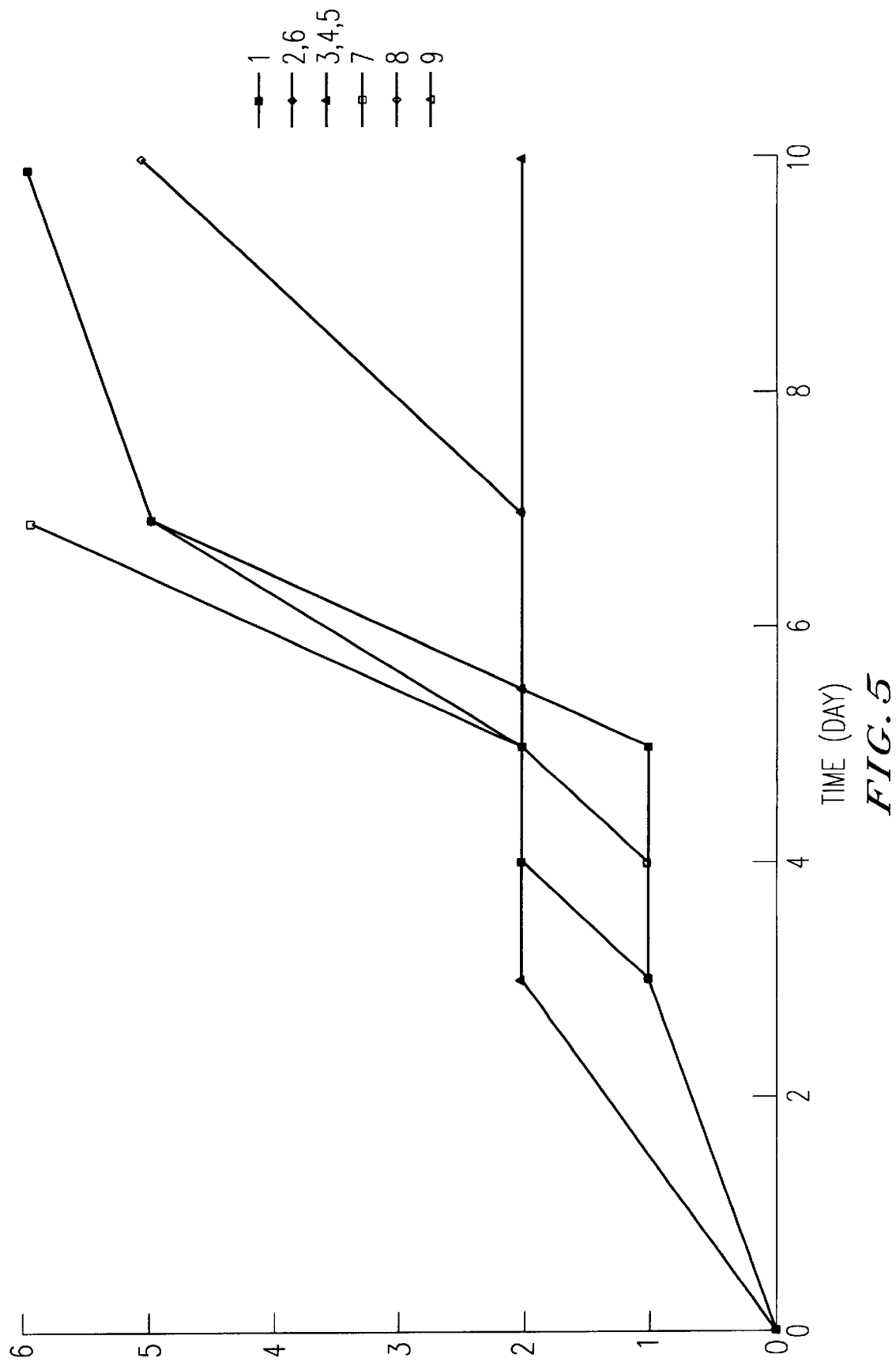
FIG. 5 illustrates the effect of different atmospheres as indicated upon the shelf-life of apples.
Figure 6:
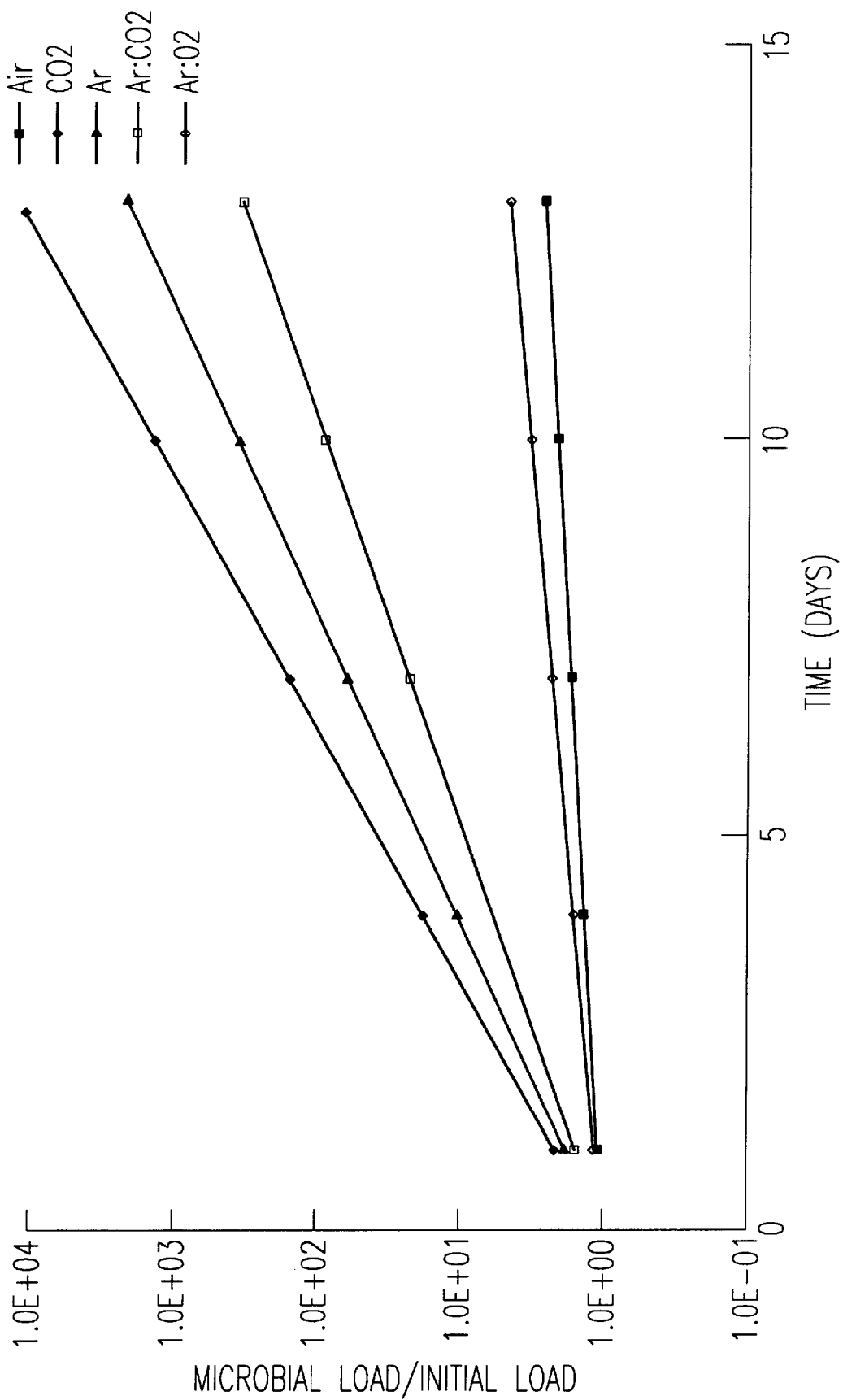
FIG. 6 illustrates the effect of different atmospheres as indicated upon the microbial load for carrots stored at room temperature.
Figure 7:
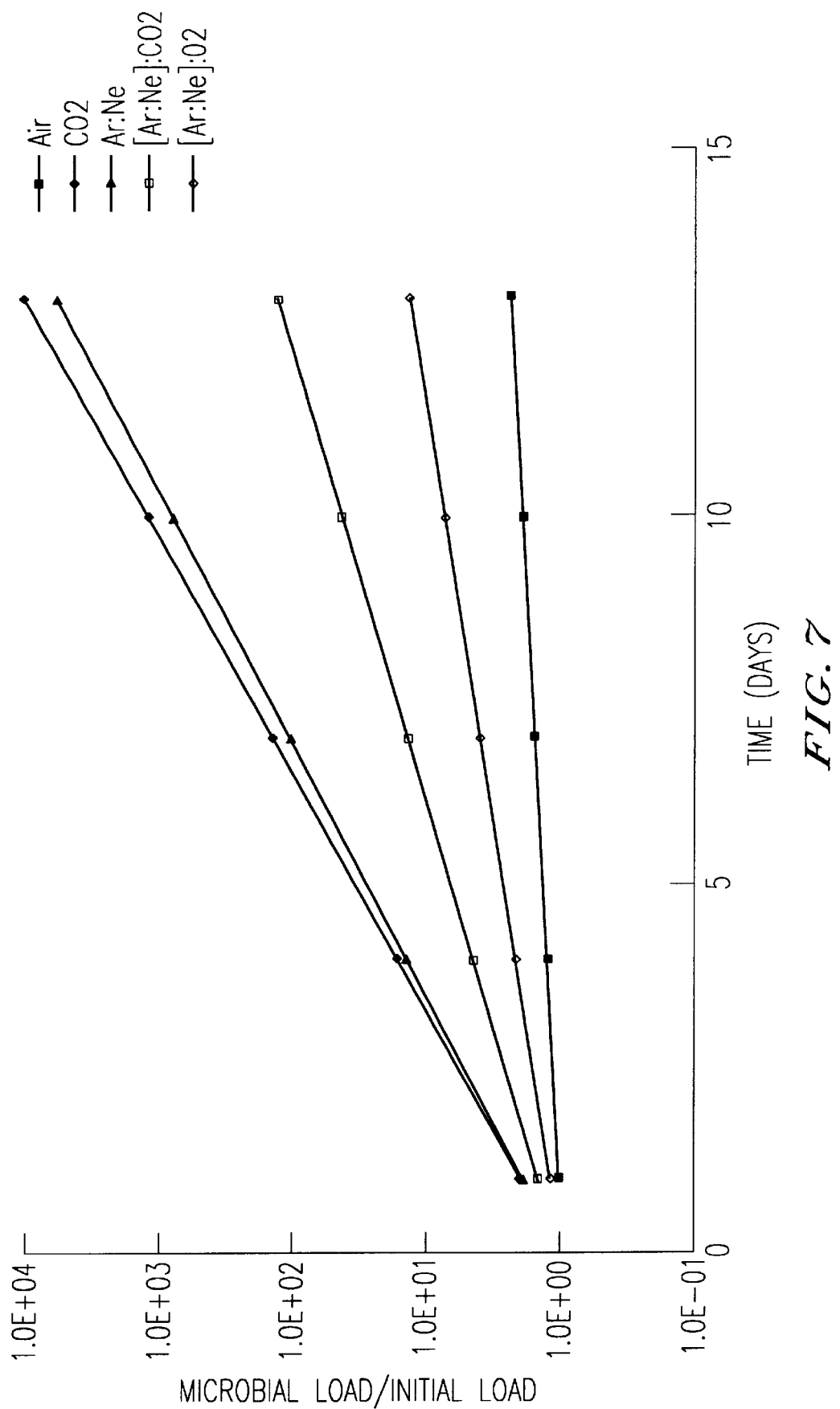
FIG. 7 illustrates the effect of different atmospheres as indicated upon the microbial load for carrots stored at room temperature.
Figure 8:
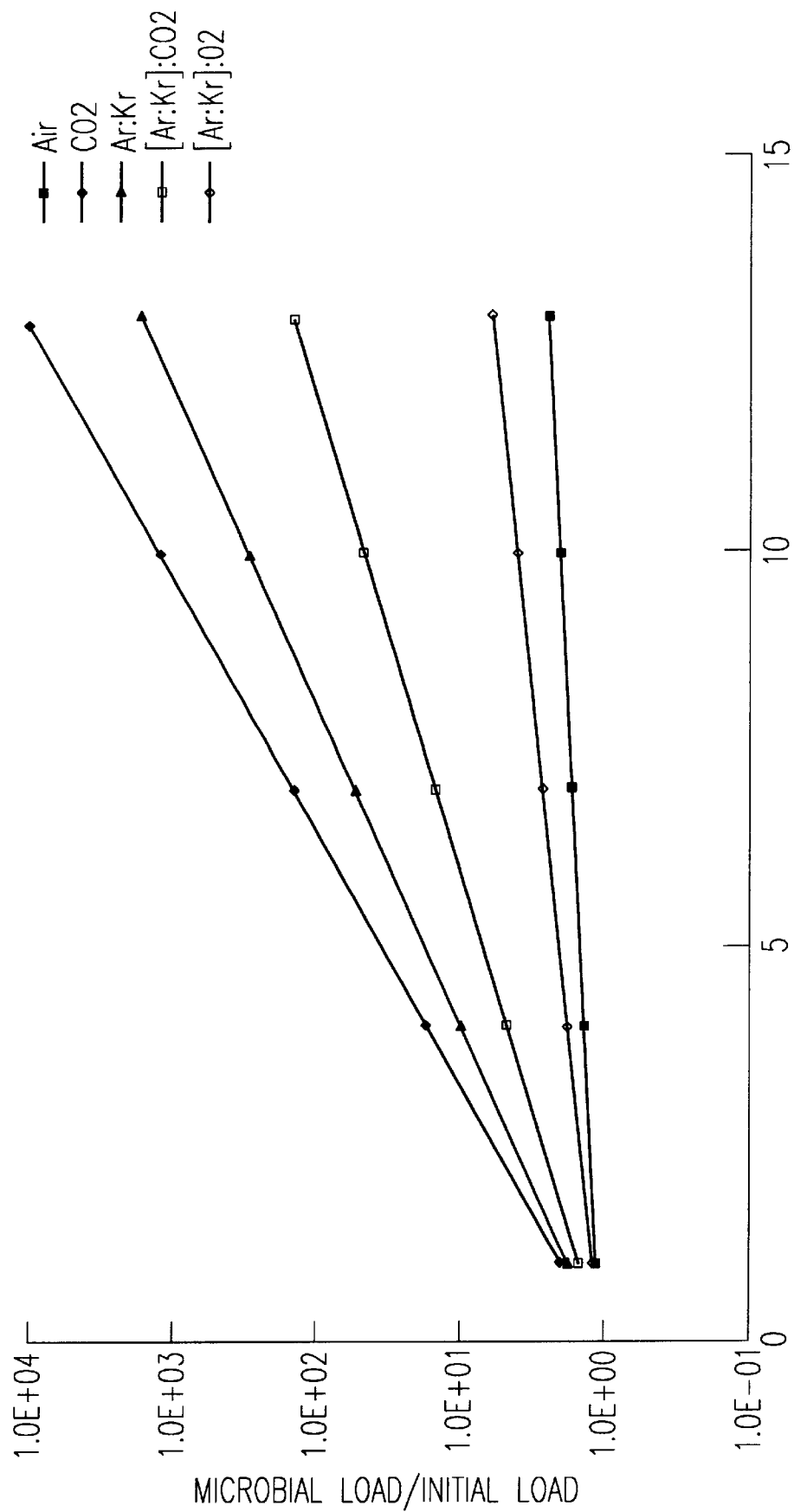
FIG. 8 illustrates the effect of different atmospheres as indicated upon the microbial load for carrots stored at room temperature.
Figure 9:
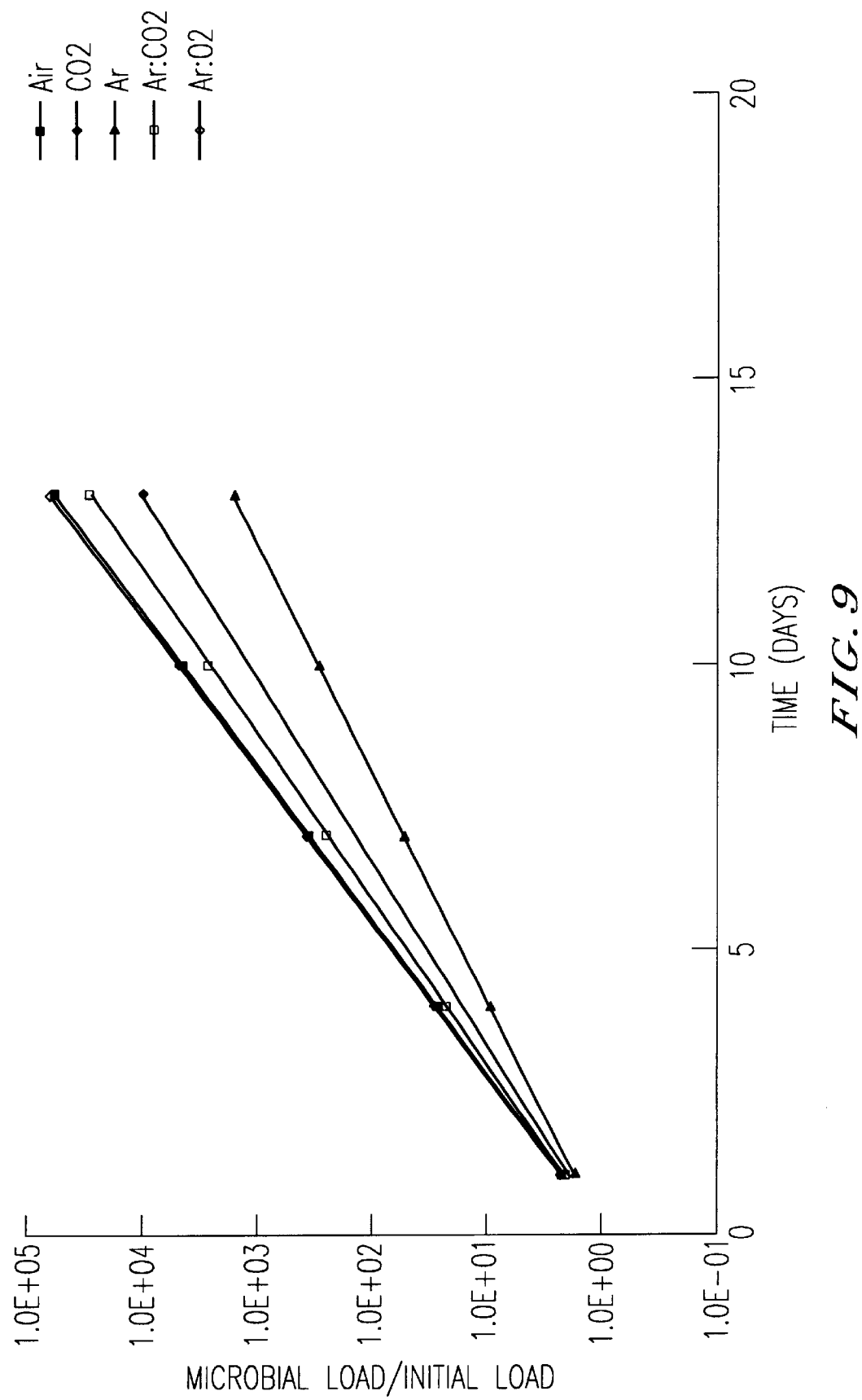
FIG. 9 illustrates the effect of different atmospheres as indicated on the microbial load for refrigerated fish fillets.
Figure 10:
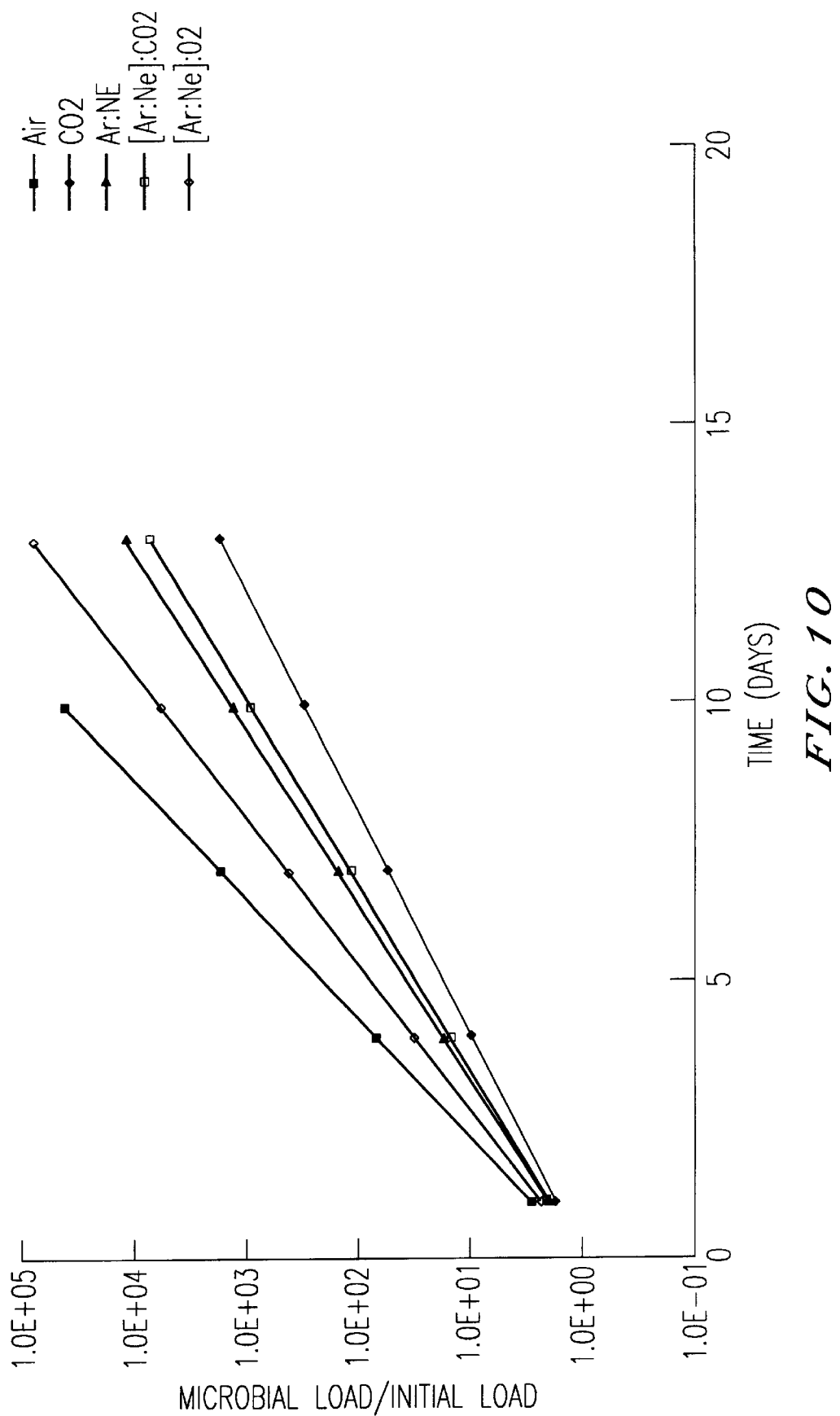
FIG. 10 illustrates the effect of different atmospheres as indicated on the microbial load for refrigerated fish fillets.
Figure 11:
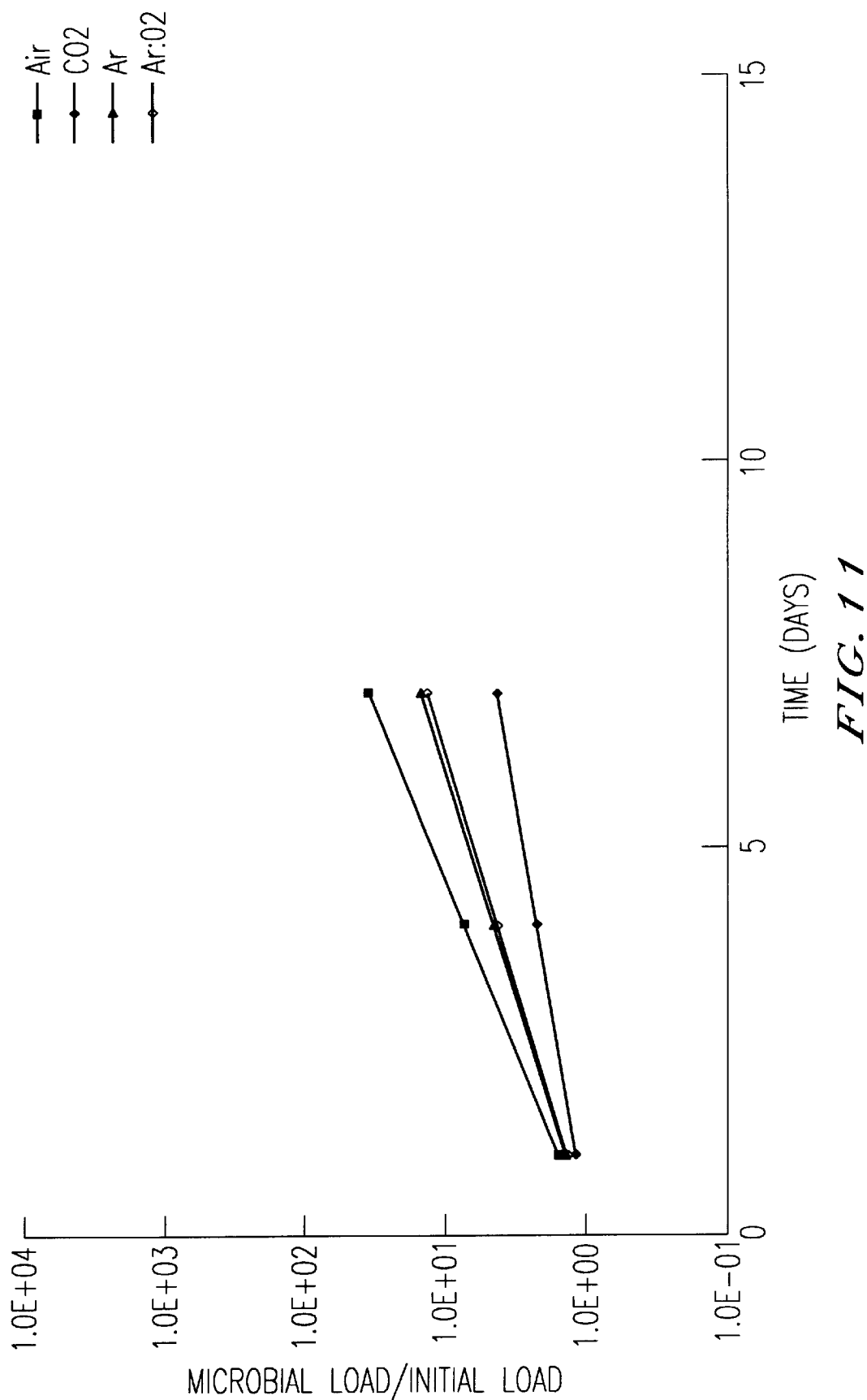
FIG. 11 illustrates the effect of different atmospheres as indicated on the microbial load for refrigerated green beans.
Figure 12:
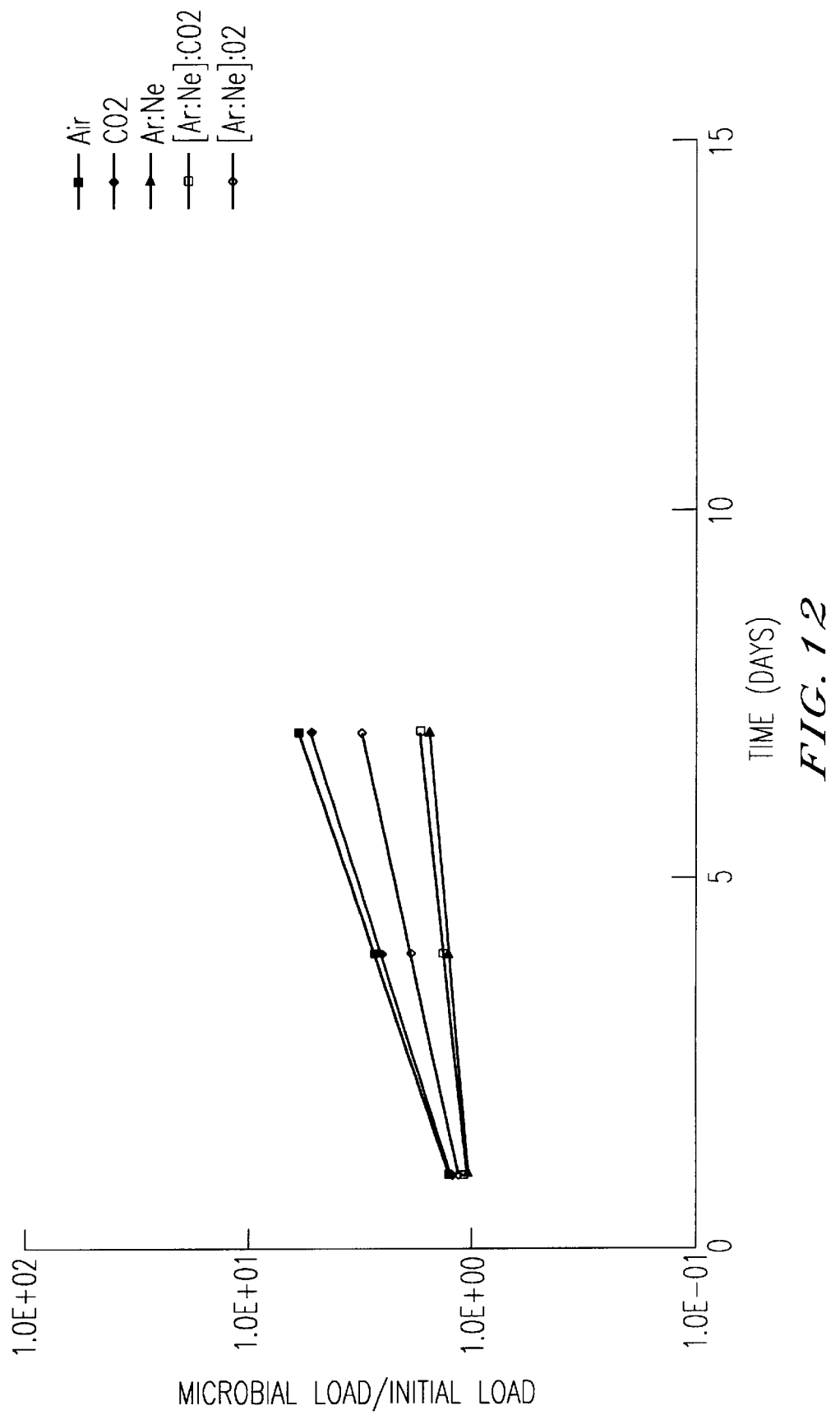
FIG. 12 illustrates the effect of different atmospheres as indicated on the microbial load for refrigerated green beans.
Figure 13:
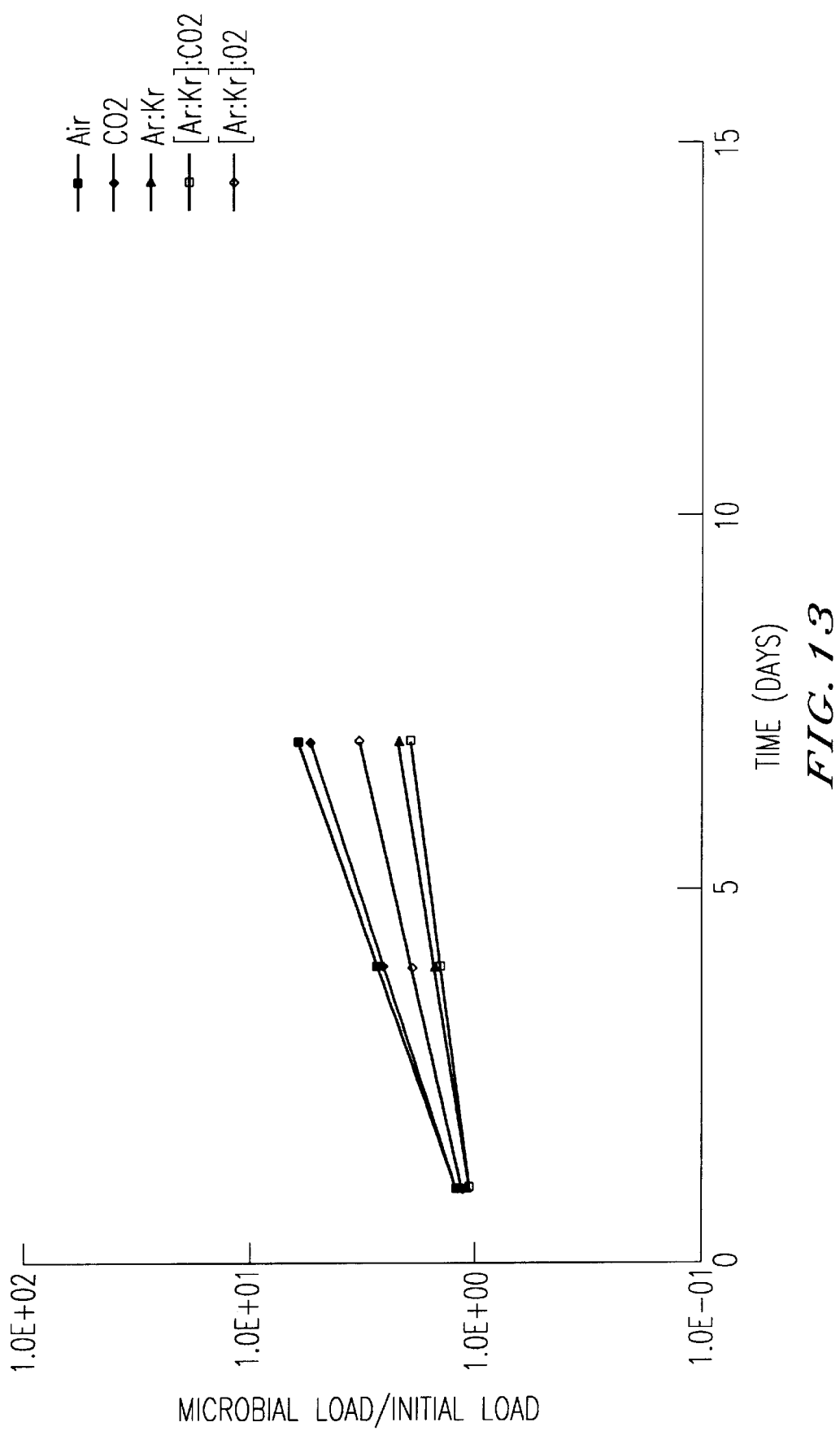
FIG. 13 illustrates the effect of different atmospheres as indicated on the microbial load for refrigerated green beans.
Figure 14:
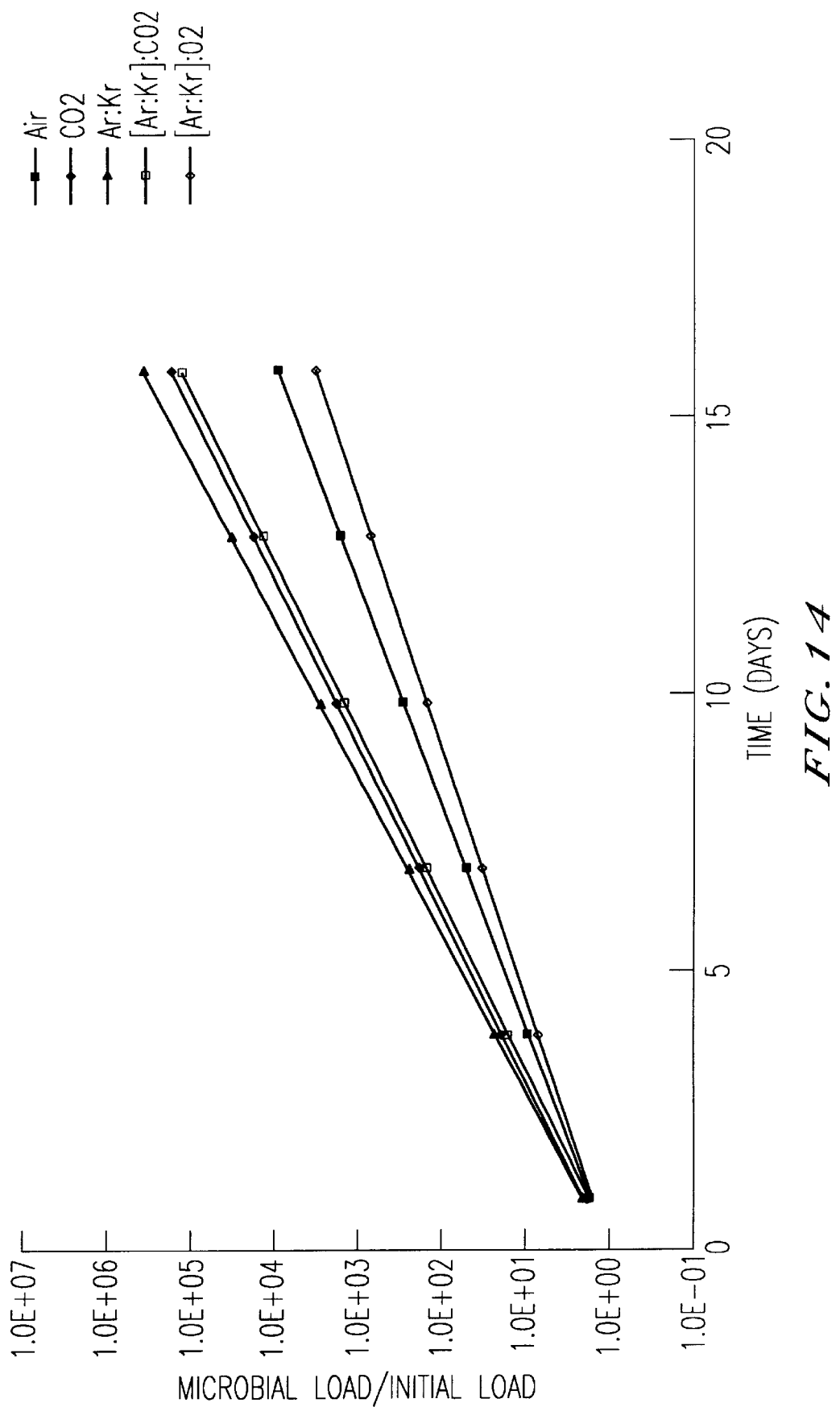
FIG. 14 illustrates the effect of different atmospheres as indicated on the microbial load for green beans stored at room temperature.
Figure 15:
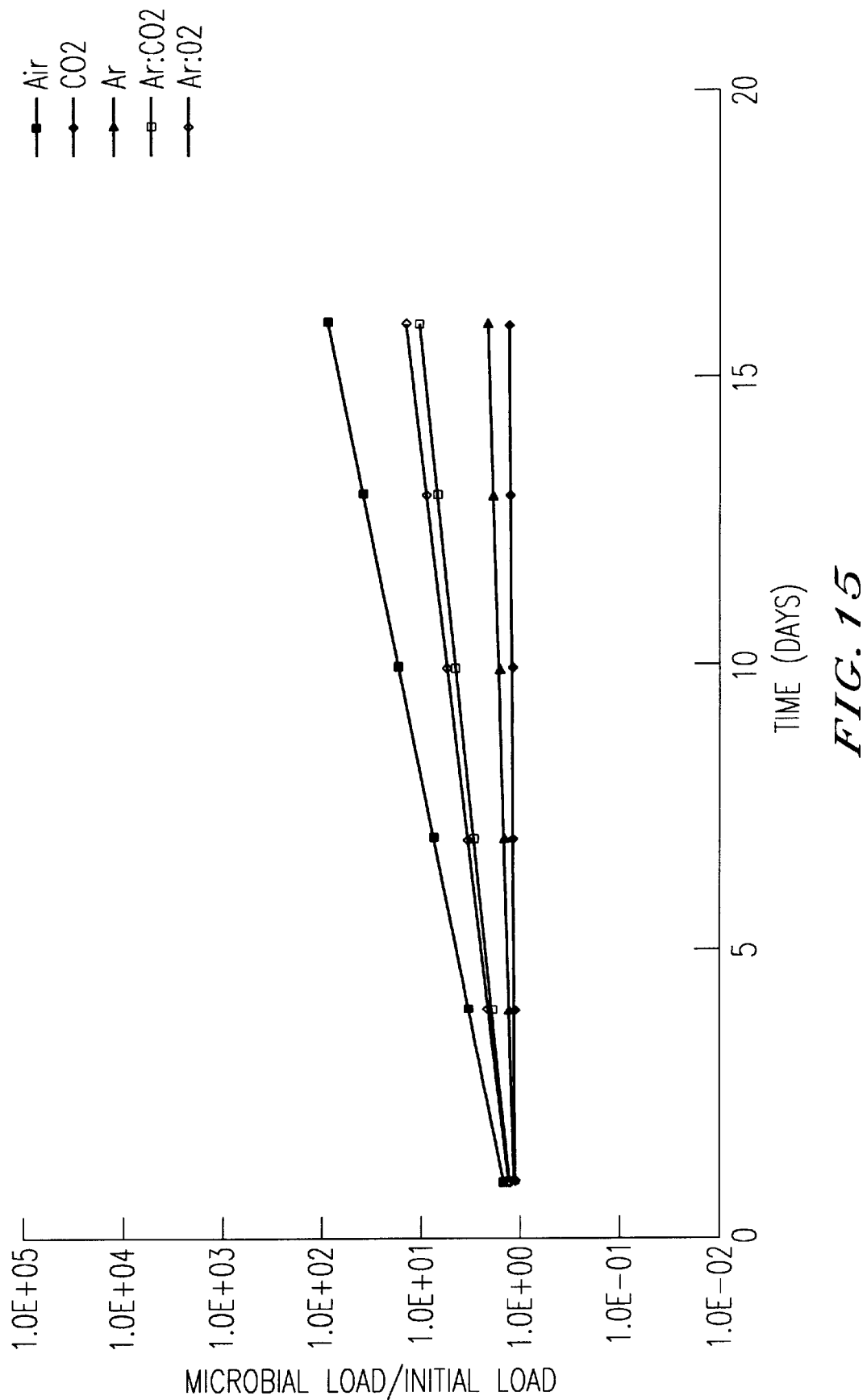
FIG. 15 illustrates the effect of different atmospheres as indicated on the microbial load for green beans at room temperature.
Figure 16:
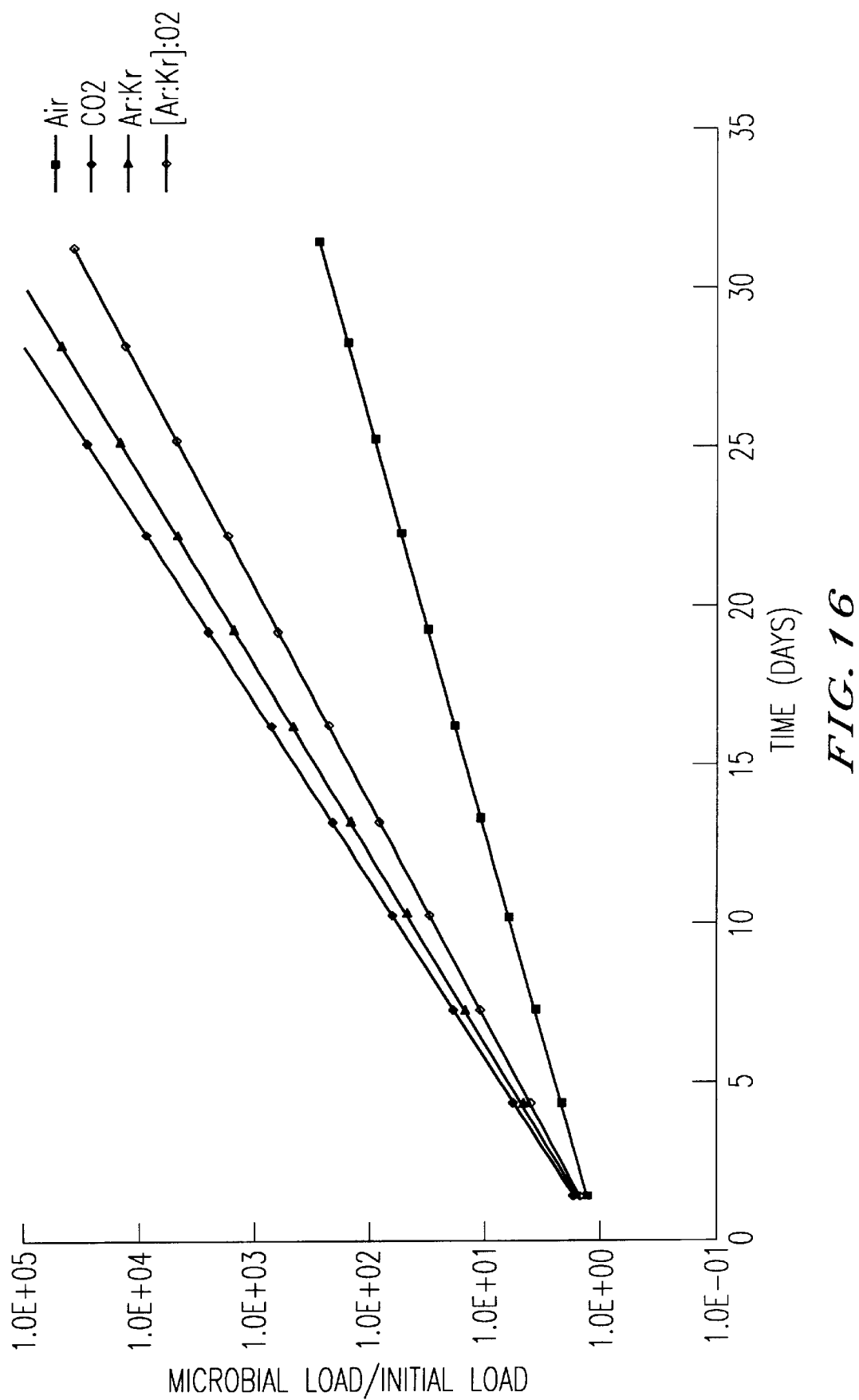
FIG. 16 illustrates the effect of different atmospheres as indicated on the microbial load for lettuce at room temperature.
Figure 17:
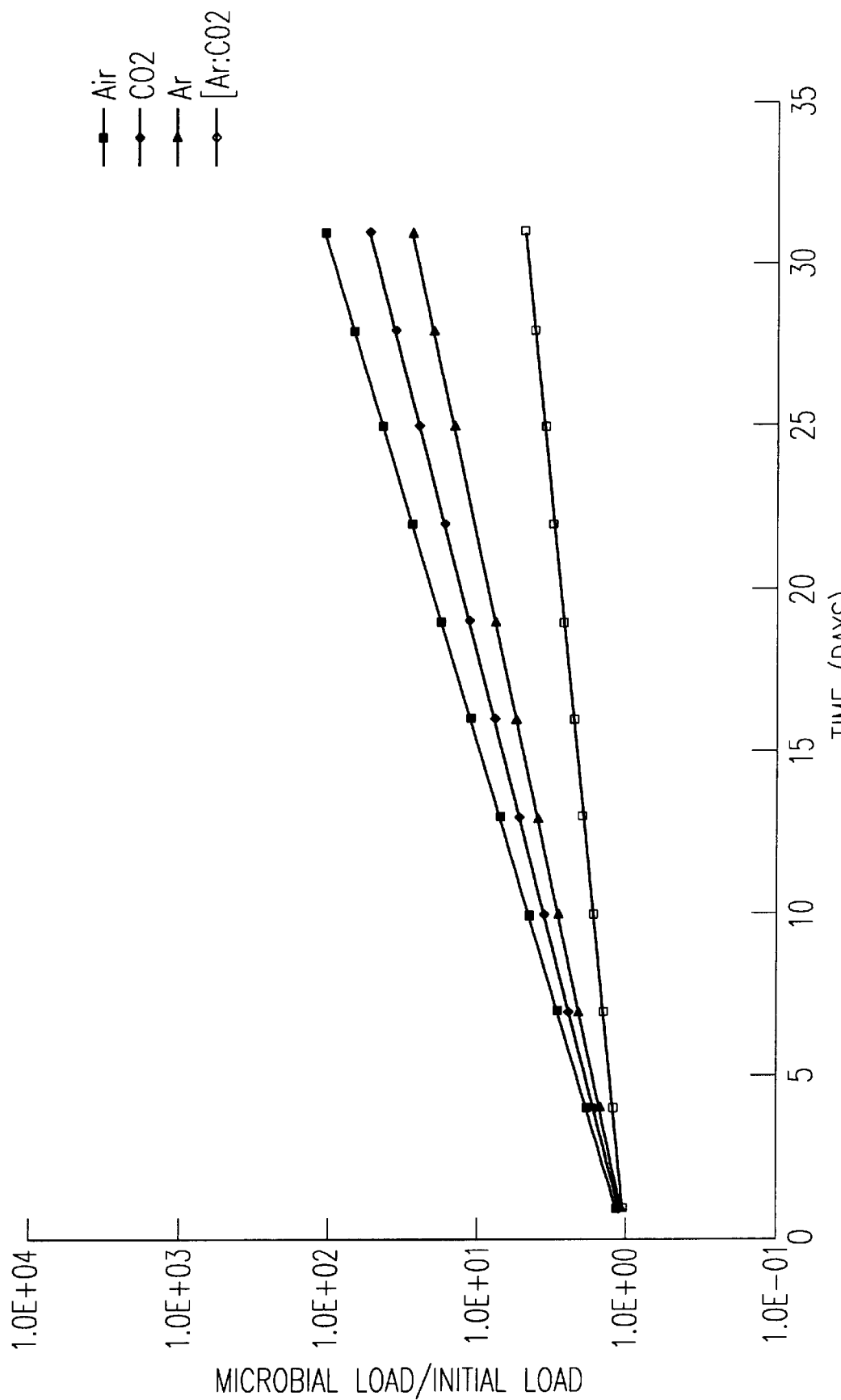
FIG. 17 illustrates the effect of different atmospheres as indicated on the microbial load for lettuce stored at room temperature.
Figure 18:
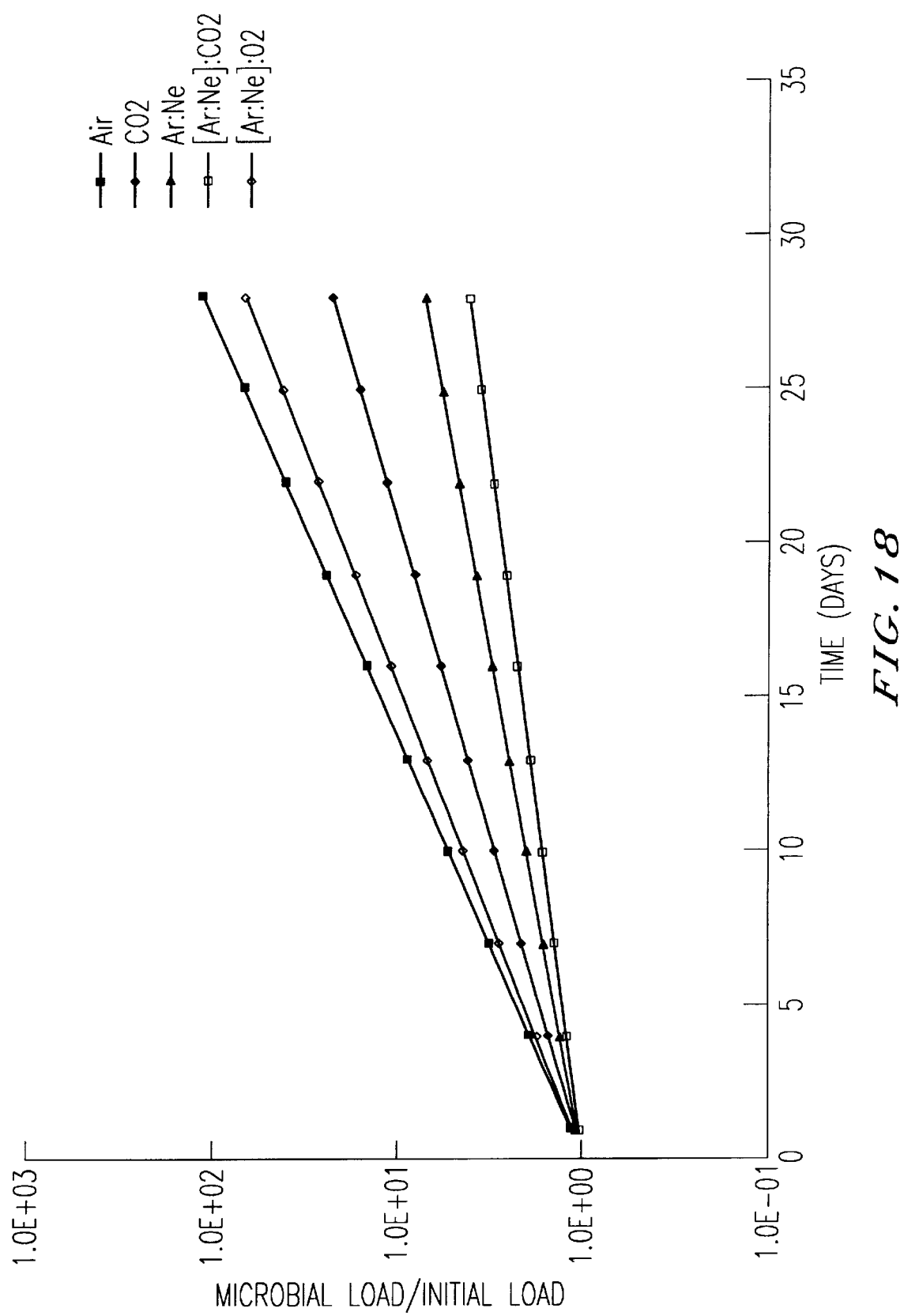
FIG. 18 illustrates the effect of different atmospheres as indicated on the microbial load for refrigerated mixed salad.
Figure 19:
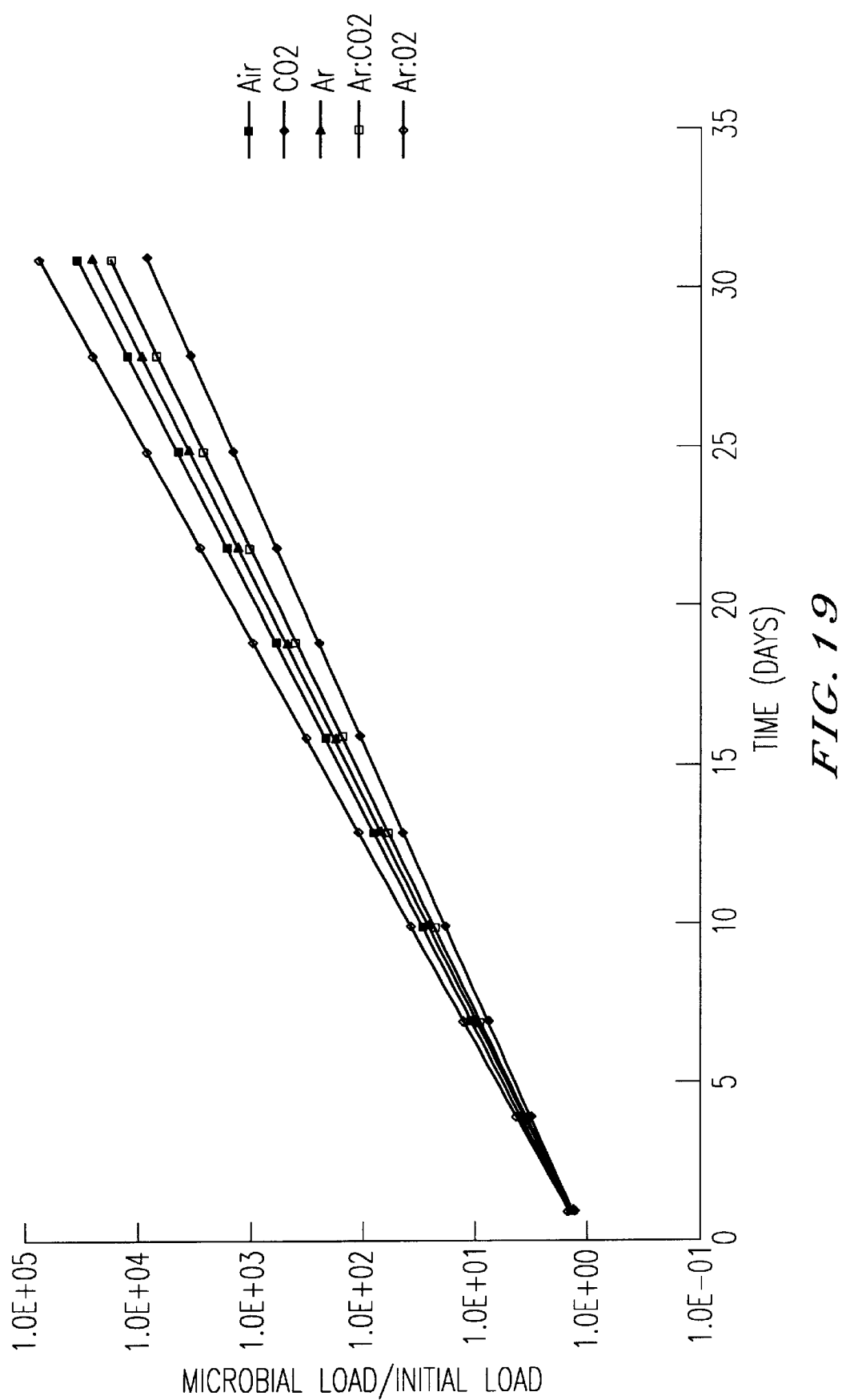
FIG. 19 illustrates the effect of different atmospheres as indicated on the microbial load for refrigerated shrimp.
Figure 20:
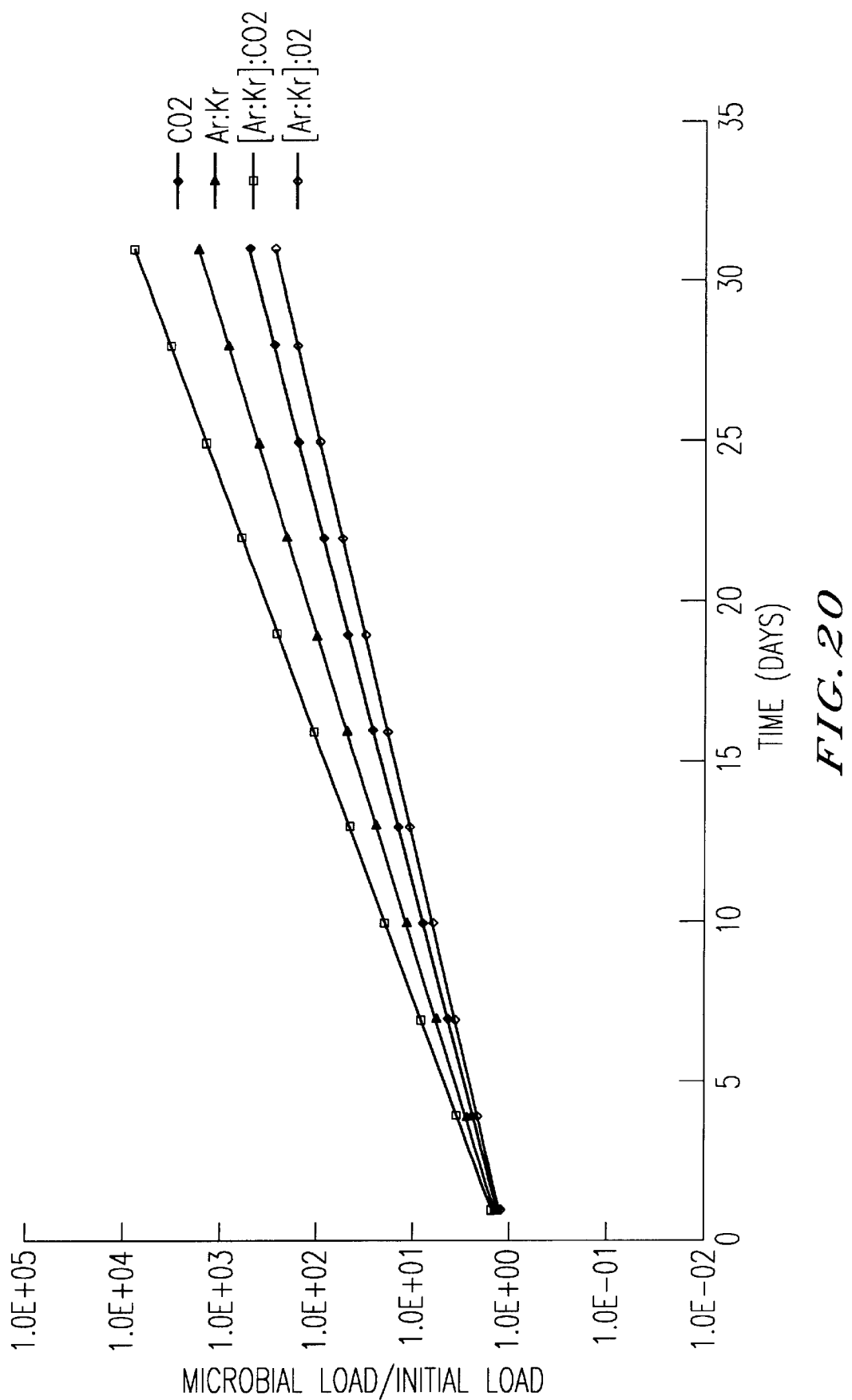
FIG. 20 illustrates the effect of different atmospheres as indicated on the microbial load for refrigerated shrimp.
Figure 21:
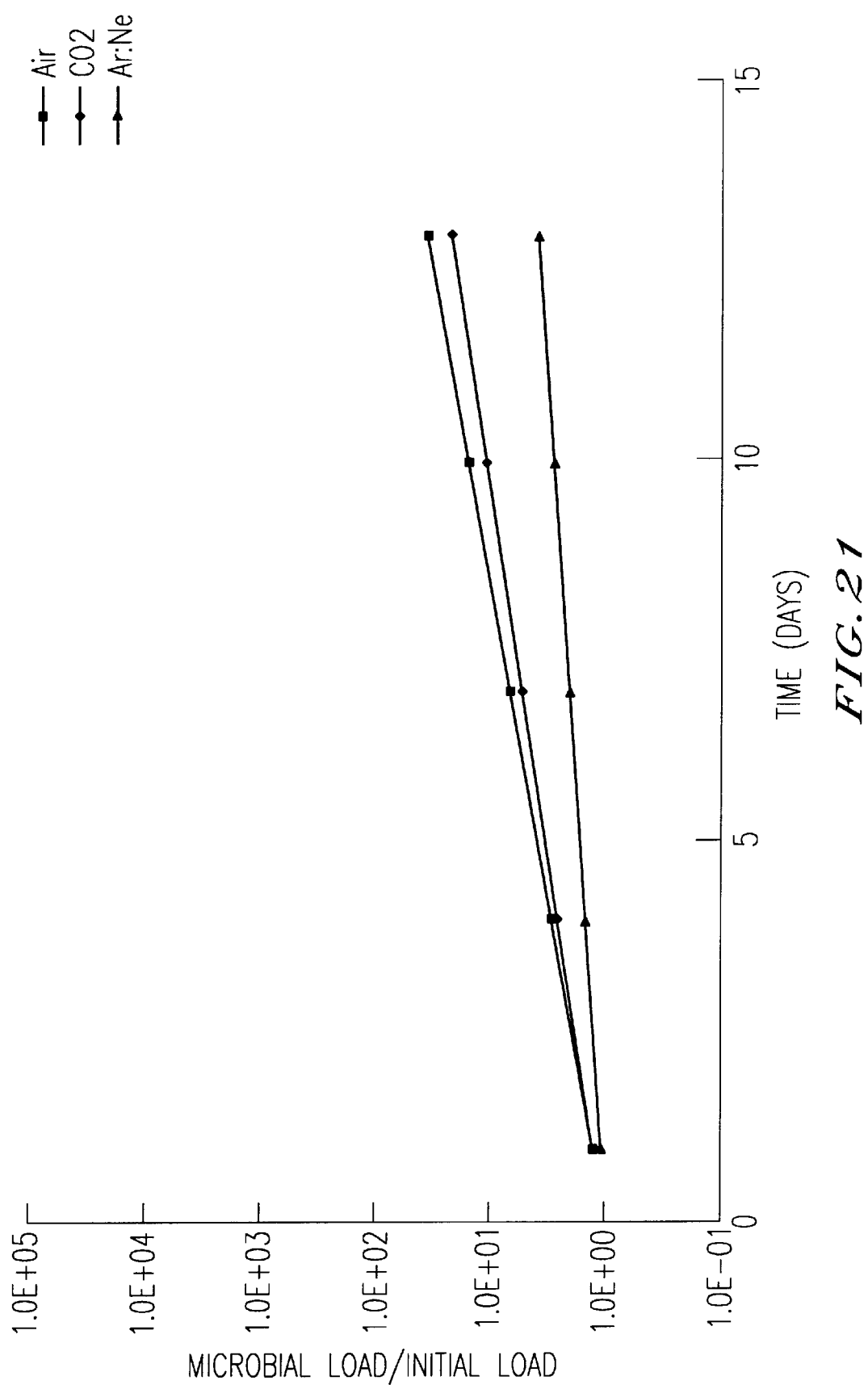
FIG. 21 illustrates the effect of different atmospheres as indicated on the microbial load for refrigerated smelt.
Figure 22:
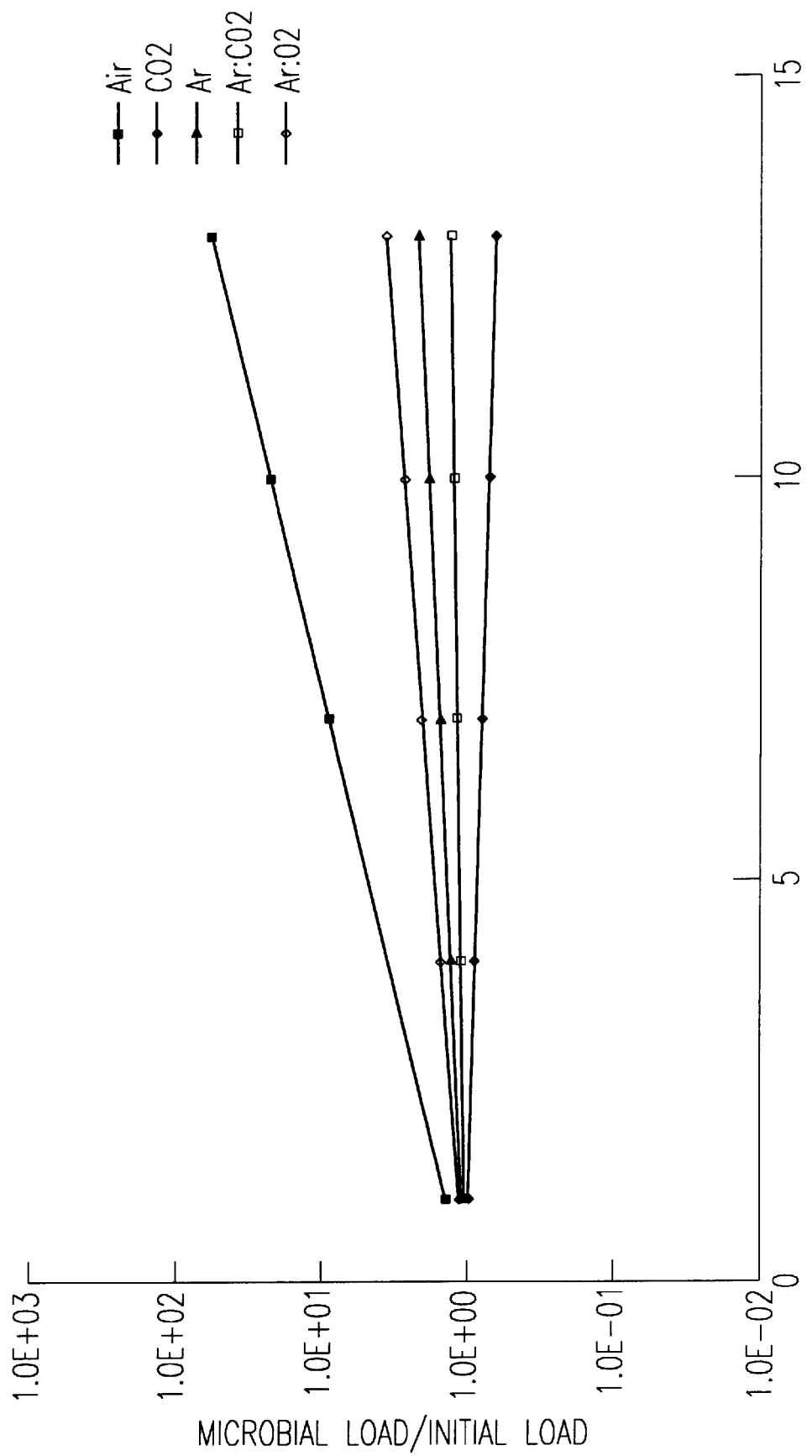
FIG. 22 illustrates the effect of different atmospheres as indicated on the microbial load for refrigerated smelt.
Figure 23:
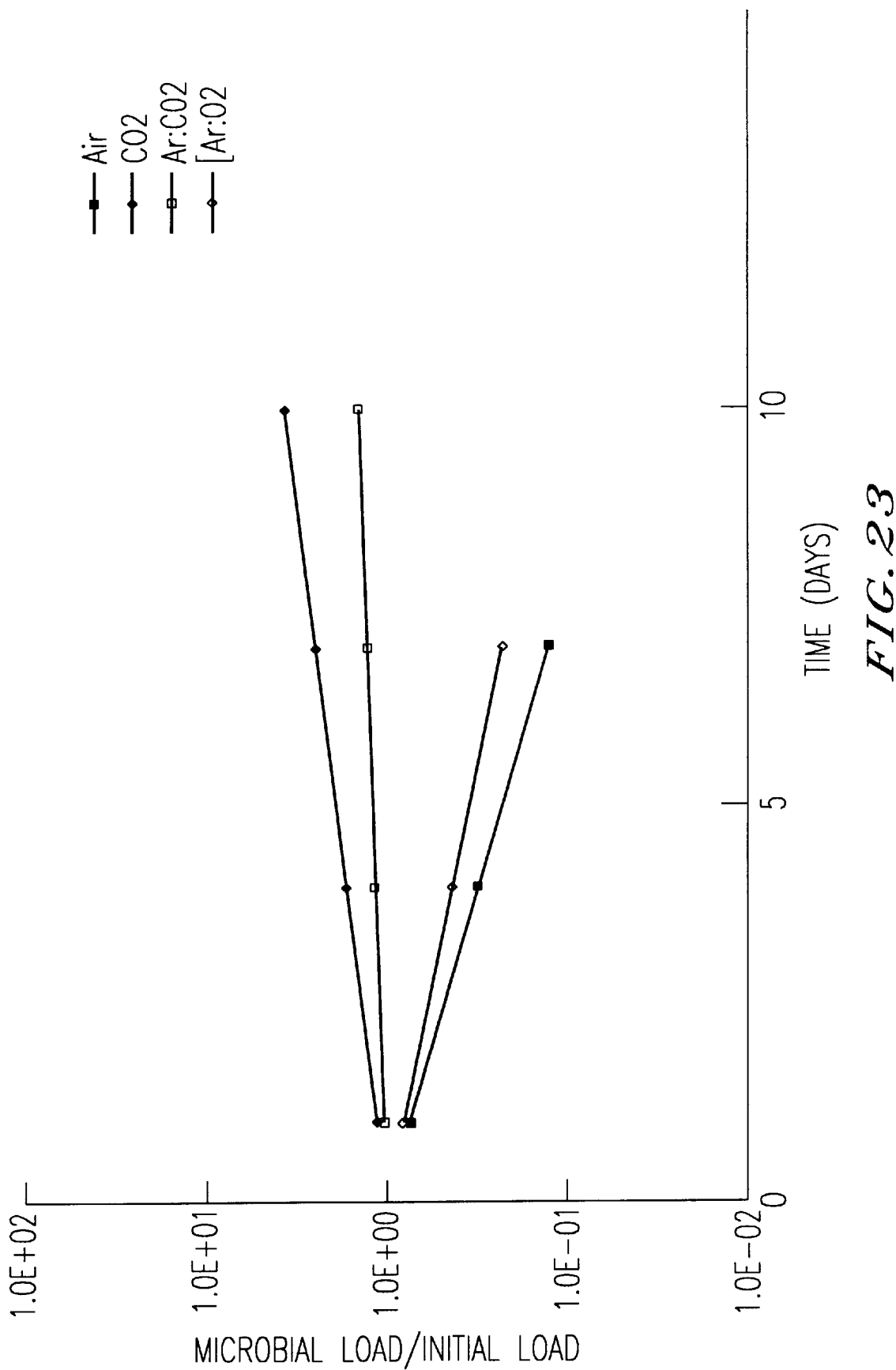
FIG. 23 illustrates the effect of different atmospheres as indicated on the microbial load for strawberries at room temperature.
Figure 24:
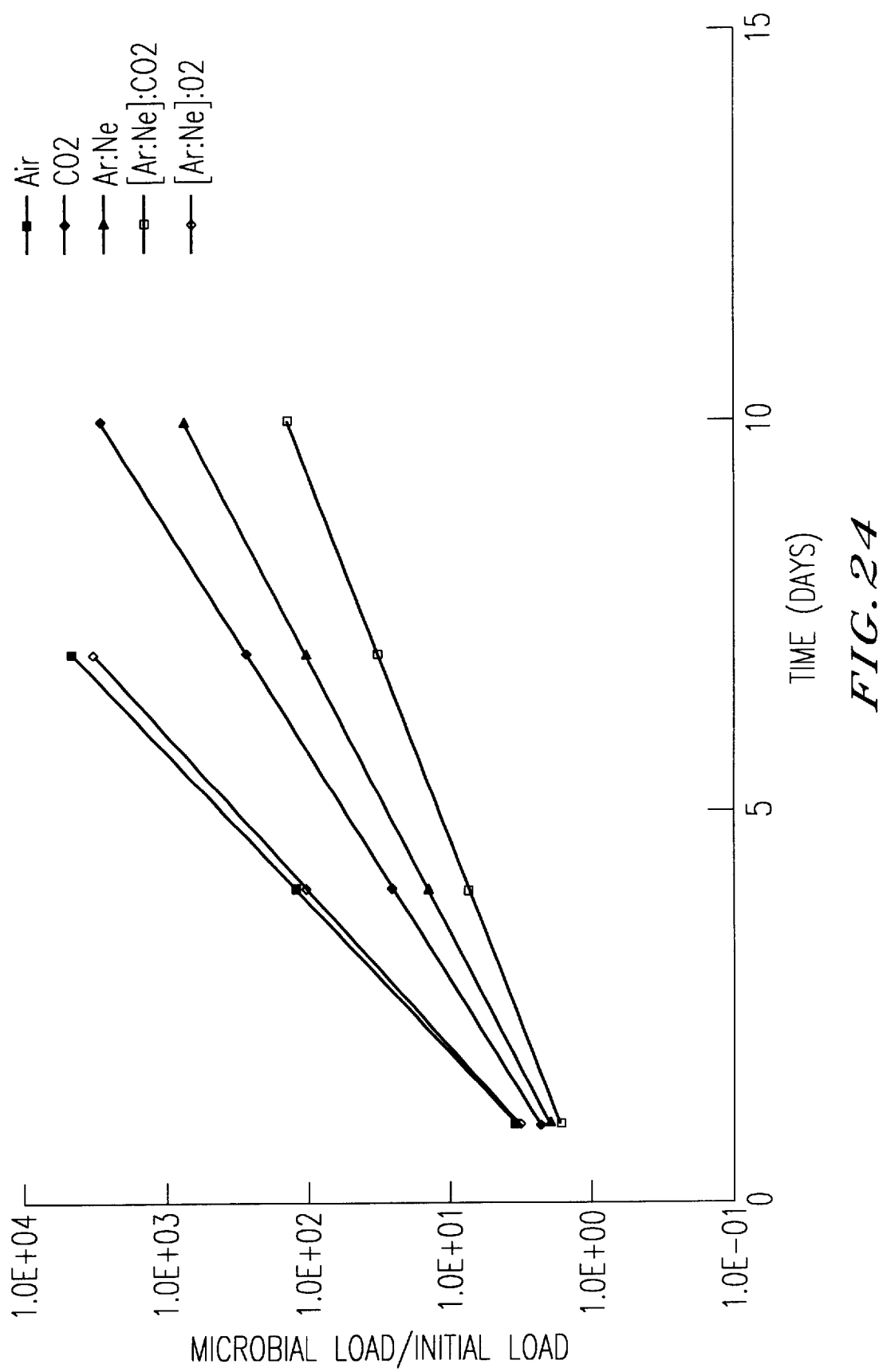
FIG. 24 illustrates the effect of different atmospheres as indicated on the microbial load for strawberries at room temperature.
Figure 25:
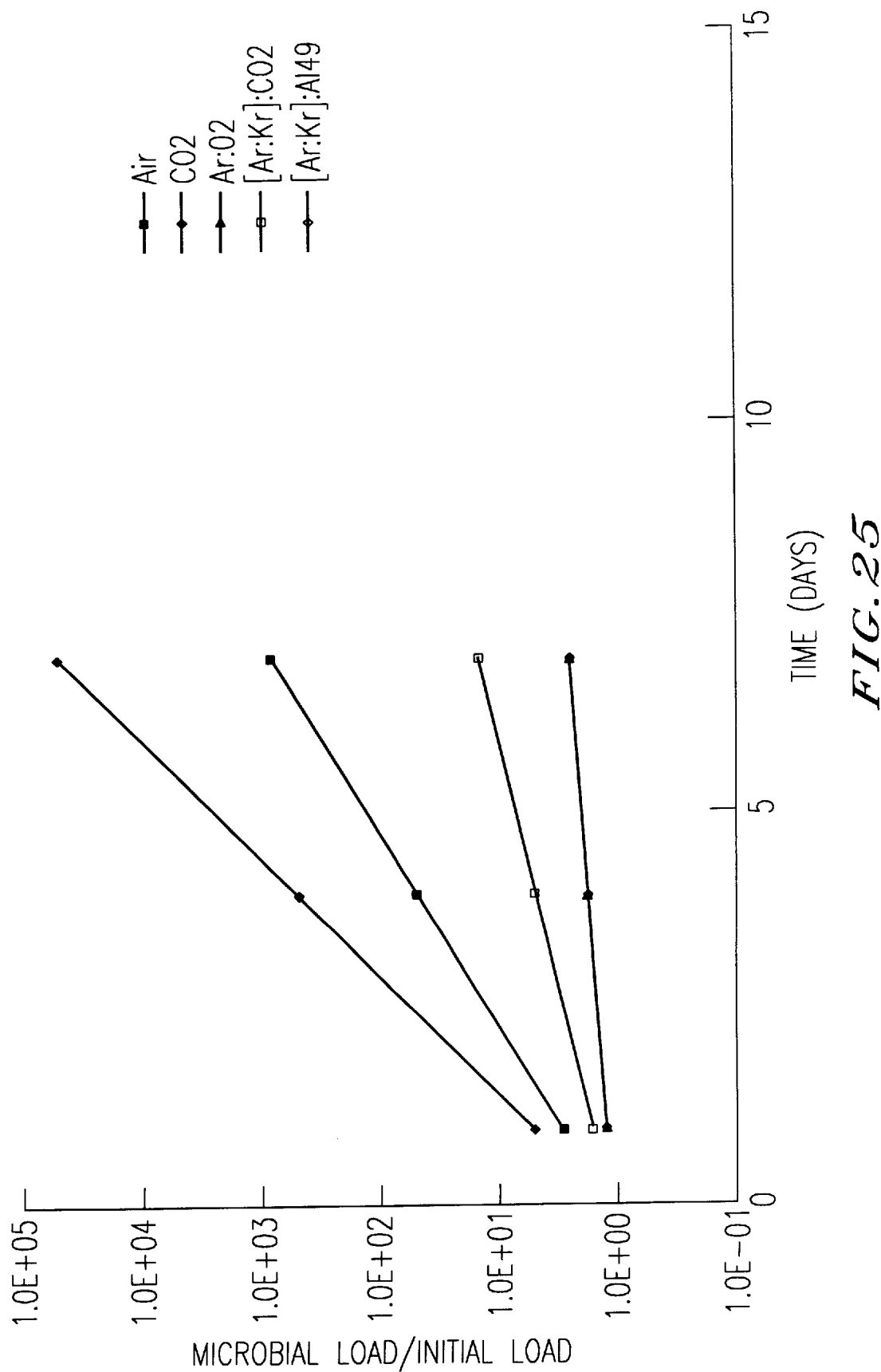
FIG. 25 illustrates the effect of different atmospheres as indicated on the microbial load for strawberries at room temperature.

In accordance with the present invention, it has been surprisingly discovered that argon and the other noble gases, xenon, krypton, neon and helium, possess profound and significant properties in improving the preservation of foodstuffs in gas-packaging applications. These improvements are manifested at all levels, including the chemical, enzymatic, microbiological and consumer quality perception levels. In view of the following disclosure, it will now be clear to the artisan that the present invention has wide utility and application in preserving food.

When compared to the use of conventional nitrogen/oxygen/carbon dioxide modified atmospheres, introduction of noble gases in the gaseous environment of packaged food products affords the extension of the shelf-life of those perishable products in a surprising manner. The gases and gas mixtures of the present invention act in at least three ways: 1) by controlling of endogenous (product origin) and exogenous (process origin and microbial origin) enzymes responsible for food degradation, 2) by controlling of the growth of spoilage microorganisms, and 3) by controlling chemical oxidations and other chemical reactions.

What is described hereinafter represents a fundamental advancement in controlling microbial growth germane to the preservation of foods and secondary to a comprehensive demonstration of inhibition of growth regulating enzymes.

The present invention provides a method whereby any food may be contacted with any of argon and the other noble gases xenon, krypton, neon and helium during packaging or storage, preferably gas packaging or controlled atmosphere storage. The present method provides a surprisingly superior method of preservation as evidenced by superior control of degradative chemical and oxidative reactions, control of degradative and oxidative enzymatic reactions, and control of degradation of important consumer quality perception parameters.

The present invention provides the first demonstration that noble gases and noble gas-based mixtures significantly and quite surprisingly increase the shelf-life of a wide variety of food products through concerted action upon chemical, biochemical and microbial degradation parameters. Through the extensive empirical assay of numerous degradation parameters, including enzyme activity from within the food product, from external application during processing, from microbial secretion, and including microbial growth rate, and including oxidative chemical processes and certain other processes, it has been surprisingly discovered that noble gases or noble gas-containing mixtures can inhibit all of the above. It has further been discovered that noble gases or noble gas-containing mixtures can inhibit all of the above, even when applied at low pressures or in solution.

The present invention thus provides, in part, a method of gas packaging food using noble gases or of storing of food under noble gases, alone or in mixtures. It also provides a method for improved preservation of foods.

The present invention thus has broad applicability to any problem or condition arising from food product storage or processing where the limitation of degradation, oxidation, food spoilage or deterioration is desirable.

In accordance with the present invention, the term "noble gas" means neon, krypton, argon or xenon. Each of these gases may be used singly or in combination with each other. Because of its low solubility in water and its high volatility, however, helium is not preferably used. Radon is not generally useable because it is dangerously radioactive. However, any gas or gas mixture, including nitrogen, oxygen, carbon dioxide, nitrous oxide, carbon monoxide, or combinations of these gases may be used as supplementing gases or "carrier gases" in the atmosphere used. Notably, helium may be used as either a noble gas or a carrier gas. The composition of the appropriate gas mixture to use is determined by the nature of the product or process to be regulated, its most common spoilage flora and the packaging material of choice.

Depending on their concentration levels and on their physical properties, the present gases and gas mixtures can inhibit microbial enzymes, both endogenous and exogenous. The present gases and gas mixtures also inhibit the other enzymes present in the product, that is endogenous enzymes and enzymes introduced during the processing of the product. The present gases and gas mixtures also inhibit chemical oxidation and certain other degradative chemical processes. The combination of the above mentioned inhibitions surprisingly improves the shelf-life of the product.

In the case of living products, such as fresh horticultural commodities, a minimum level of oxygen is necessary to allow respiration and avoid anaerobic fermentation of product, responsible for the generation of off-flavors. In other products, oxygen significantly causes oxidative degradation to produce undesirable color changes and other substantive changes. Addition of noble gases to oxygen-containing atmospheres significantly alters the resultant effect of oxygen.

Additionally, however, the present invention also may be used to control the growth of microorganisms on foods.

The present invention also provides method of maintaining or improving the flavor, texture, color or appearance of food.

In particular, the present invention provides a method of specifically maintaining or improving the color of food, such as foods having vivid colors such as red, yellow, green, orange and purple. For example, the red color of red shrimp or radishes or the green color of beans or broccoli may be preserved in accordance with the present invention.

Moreover, the present invention also provides a method of preserving or maintaining pigmented compounds, such as caretenoids, flavenoids, anthocyanins or chlorophyll, whether in naturally occurring foods, synthetic foods or foods pigmented with these compounds or the compounds themselves.

Additionally, the present invention provides a method of inhibiting aerobic and anaerobic bacteria, yeast, mold and/or fungi growth on foods.

Generally, in accordance with the present invention, pressures are used of from near vacuum, i.e., about $10^{-8}$ torr, to about 100 atmospheres. However, it is generally preferred that a pressure be used between about 0.001 to about 3 atmospheres. Further, a range of temperatures may be used from about 0° C. to about 120°.

Generally, the present invention may be used to preserve all types of food, including but not limited to meats such as processed meats or poultry, vegetables, fruits and various types of baked goods.

Having generally described the present invention, reference will now be made to certain examples which are provided solely for purposes of illustration and are not intended to be limitative.

DETAILED EXAMPLE OF THE INVENTION
Preliminary Assay Protocols and Results
Control of Enzymatic Activity Assay Sealed cuvettes containing enzymes representative of and in fact important in food product degradation processes were thoroughly purged and filled with assay gases. Injection of gassed substrate solutions started the reactions, which were generally conducted under optimal conditions. These were monitored calorimetrically by scanning uv/vis spectrophotometry. All controls were conducted for oxygen, nitrogen and carbon dioxide. A range of temperatures and pressures were employed. An example protocol is appended. Results were expressed in real-time, and transformed to calculate yield and rate differences for the reaction. Over 50 exemplary enzymes were so assayed. Enzymes selected for examination from various products are assayed in precisely the same manner, but always in terms of relative activity in comparison with that product in air or another control gas or gas mixture.

The result below shows the inhibitory effect of noble gases upon tyrosinase.

Product Testing
Enzymes, Chemical Oxidation, Micobiral Growth and Consumer Preference Parameter Many different products were assayed under a wide variety of temperatures and pressures, packaging treatments, and post-packaging handling. In the general experiment, sterile pouches of impermeable film were filled with freshly-obtained food products under recommended handling regimes. Each was then purged thoroughly with the gas mixture to be tested. Then sealed, the pouch was further treated by cooking, cold storage, or other parameter, or else was not. The sealed pouch was stored at room, cold, or freezing temperature, and periodically sampled for microorganism counts (total, aerobic, anaerobic, Pseudomonas, Lactobacilli). It was also studied for observable deterioration and scored. Some samples were subjected to appropriate chemical analysis. Others were sampled for specific enzyme activities as above. All told, the average experiment consisted of replicate samples of product being assayed for microbial counts, microbial identifications, enyzme activities, chemical oxidation, discoloration, odor and/or taste changes, and final carbon dioxide and oxygen concentrations.

Microbes and enzymes known to be important in the degradation of each individual product were selected for examination and scoring from the literature.

The results below show simple vacuum-formed pouch gas-packaging results as expressed for 11 parameters of observable degradation. Gases tested are: I-IX and identified in the key. In addition, microbial samples were taken and plated, and exemplary enzyme activities were scored. In this particular experiment, replicate packages of apportioned apples, bananas, carrots, tomatoes, green beans, strawberries, steak cuts, and whole fresh fish were prepared. Each product was cleaned in water under standard food-preparation conditions, was packaged in a vacuum-gas packaging machine, and was tested as above. A summary sheet of noble gas effects is given for this experiment in view of the observable parameters. A summary graph for apples and one for steak are also provided, showing clearly that both apple and steak shelf-life can be extended by noble gases.

Microbial Growth Rate Assay 26 microorganisms were assayed under at least 105 mixtures containing noble gases, and under 8 controls. The controls were 100% air, 100% carbon dioxide, 100% nitrogen, 100% oxygen, and commonly used gas-packaging mixtures made up of various fractions of nitrogen, oxygen, and carbon dioxide. These latter bracket the range of common application gas mixtures. The assay mixtures consisted of series of two-component ("A"+"B") mixtures of Ar, Xe, Kr, and Ne wherein each gas was made to constitute 0.1, 1.0, 5.0, or 100% of component "A", then another noble gas was used to constitute the rest of component "A", and then this first "A" component mixture was added to a base gas which constituted the second component "B" in the proportions 100:0, 95:5, 90:10, or 50:50. Base gases were various, but were most often argon; oxygen; nitrogen; or mixtures of nitrogen, carbon dioxide and oxygen in proportions commonly used in gas-packaging. Thus, one typical gas mixture would be Ar:Xe 99:1 (component "A") 95% of total, with air (component "B") 5% of total. Thus, a very large number of gas mixes were assayed for activity against microorganisms.

Each of the microorganisms was plated after dilution series to result in growth of single-colonies under sterile conditions. Standard ATCC cultures were employed and maintained as reccomended. Assays were conducted by inoculating 125 cc serum vials prepared with 25 cc of appropriate media after that vial had been gently evacuated and thoroughly purged with nitrogen to remove all residual gases, then thoroughly purged with the test gas. Appropriate controls were run for sterility and optimum growth conditions. Daily growth plate area coverage measurements were made, backed up by less frequent total cell counts. Results were interpreted as growth/day vs. air, overall growth/air for aerobic microorganisms, and vs. appropriate atmospheres for anaerobes. Periodic measurement of carbon dioxide and oxygen levels in the vials were also made.

Results below show daily counts for one vial of *Alternaria alternata*, and graphed growth area comparisons for one set of gases for *A. alternata* and one set for of *Escherichia coli*. The results clearly demonstrate selective effects of different gases in inhibiting the growth of each species. The results are generalizable across gases, but each species varies in its tolerance of quantitative amounts of gas. Gases are also clearly differentially effective depending upon their fractional composition in a mix, that is different mixes of gases show different effects upon the same microorganism. These mixes show effects that are synergistic with respect to the additive activity of their components.

It is important to realize that many parameters contribute to the variance in the obtained results of these assays including the concentration of oxygen, carbon dioxide, water vapor temperature and salt concentrations, for example.

DETAILED EXAMPLES OF THE INVENTION
Large-Scale Empirical Assay Results
Chemical Reactions For chemical oxidation reactions it has been found that noble gases strongly inhibit oxidation, generally in the order Xe>Kr>Ar>Ne>He, having positive and unique utility in preventing oxidation even in the presence of oxygen, whereas nitrogen has no such ability excepting in the simple displacement of oxygen. Other oxygenated species, such as carbon dioxide are reactively destructive.

DETAILED DESCRIPTION OF THE PREFERRED EMBODIMENTS

Generally, in accordance with the present invention, it has been surprisingly discovered that it is possible to directly affect the rate of oxidation of chemicals or chemical preparations. That is, in accordance with the present invention, it has been discovered that certain gases can directly affect the oxidation rate of chemicals and not merely slow oxidation only as function of physical and inert displacement of oxygen. Generally, the present invention is effected by contacting the chemicals or chemical preparations during at least a protion of storage thereof to a noble gas, a mixture of noble gases or a gaseous mixture containing at least one noble gas.

Effect of Gases on Enzymes

Enzymes, both endogenous to the product or secreted by the microorganisms found in the product are often strongly inhibited by noble gases. The effect of the noble gases are summarized by class below. An example of this inhibition is in the very strong inhibition of oxidases.

The follwing Table summarizes the maximum inhibition of enzymes activity realized with various noble gases under various storage conditions.

Class I. Oxidoreductase (EC 1)

Tyrosinase EC 1.14.18.1
at 25° and optimal reaction conditions, simple saturation of solution with gas:

| Gas | Result |
| --- | --- |
| Xe | −73% (inhibition vs air) |
| Kr | −73% |
| Ar | −60% |
| Ne | −46.7% |
| 90:10 Xe:Kr mix | −50% |
| Ar:Xe 99:1 | −70% |
| N2 | 0% |
| CO2 | 0% |

Glucose oxidase EC 1.1.3.4

| Gas | Result |
| --- | --- |
| Xe | −91.6% (inhibition) |
| Kr | −92.7% |
| Ar | −85.8% |
| Ne | −61.7% |

Class II. Transferases (EC2)

Inhibited by noble gases depending upon active site characteristics.

Gamma-glutamyl transpeptidase EC 2.3.2.2

| Gas | Result |
| --- | --- |
| Xe | −7% (inhibition) |
| Kr | −8% |
| Ar | −5% |
| Ne | −3% |

Aspartate aminotransferase (EC 2.6.1.1)

| Gas | Result |
| --- | --- |
| Xe | −17% (inhibition) |
| Kr | −82% |
| Ar | −17% |
| Ne | −12% |

Class III. Hydrolases (EC3)

Lipase EC 3.1.1.3
Showed up to −20% inhibition with Argon and noble gases.

Protease (α-Chymotrypsin EC 3.4.21.1)
Showed up to −20 inhibition with Argon and noble gases depending on temperature.

With Lipase

| Gas | Result |
| --- | --- |
| Xe | −25.6% |
| Kr | −25% |
| Ne | −15% |
| Ar | −18% |

Class IV. Lyases (EC4)

Citrate synthase EC 4.1.3.7
Showed maximum inhibition of −27% at 25° C. when measured as a coupled reaction with all gases.

Class V. Isomerases (EC 5)

| | |
| --- | --- |
| Ar | −37% |
| 90:10 Xe:Kr mix | −6.3% |

Phosphoglucose isomerase

| Gas | Result |
| --- | --- |
| Xe | −61% |
| Ne | −45% |

Class VI. Ligases (Synthetases) (EC 6)

Acetyl-CoA synthetase EC 6.2.1.1

| Gas | Result |
| --- | --- |
| Xe | −18% |
| Kr | −16% |
| Ar | −75% |
| Ne | −15% |

Quality Factors of Fruits and Vegetables

I. Lightly Processed Fruits and Vegetables

Examples are fresh apple slices and shredded lettuce.

Quality factors:
color
flavor
texture
appearance

Relative importance of these 3 factors vary between products.
microbiological quality
Nutritional quality
a. Flavor: most difficult quality factor to maintain.
Maintain the original aroma quality
avoid off-flavor development
The enzymes involved in off-flavor formation in fruits and vegetables seem to be peroxidases and lipoxygenases.

b. Texture: quality factor that differentiates fresh from processed foods.

Fresh fruits and vegetables: "crisp", "firm": high "turgor"

Processed foods: "soft", "chewy". Processing stress results in loss of turgor. Enzyme catalyzed reactions cause depolymerization of cell membranes and cell walls.

Loss of texture:
  pectinesterase
  polygalacturonase
  pectine methyl esterase
  galacturonase c. Appearance:

Discoloration of lightly processed fruits and vegetables is often the factor that determines their shelf-life.

Enzyme catalyzed reactions which convert phenolic compounds, such as flavonoids, and derivatives of chlorogenic acid to brown melanins are the main causes of discoloration of lightly processed fruits and vegetables. When products are peeled, cut, cellular compartmentation is lost, enzymes and substrates come in contact with each other, and discoloration occurs. carbon dioxide can influence phenolic metabolism.

Breakdown of chlorophyll: loss of appealing green color. As the chlorophyll is broken down, the carotenoids are exposed, giving rise to a yellowing of the products. The importance of color in green vegetables is demonstrated by USDA quality standards where as much as 60% of the total quality score is assigned to color.

The naturally existing chlorophyllases can convert chlorophylls to water-soluble chlorophyllides, but do not significantly alter the green color. Acidic conditions can make the chlorophylls into pheophytins. The pheophytins are brown in color and are normally undesirable in most foods. The loss of green color in green vegetables is an important problem in certain thermal processing operations. The carotenoids most important in imparting color to fruits and vegetables are derivatives of α- and β-carotenes and lycopene. Due to their unsaturated nature, they are generally susceptible to oxidation. Carotenes are important to nutrition, flavor and appearance as precursors of vitamin A, precursors of some flavor volatiles and as pigments. Lipoxygenase appears to catalyze the direct oxidation of certain unsaturated fatty acids with the concurrent bleaching of carotenoids. Carotenoids are also sensitive to nonenzymatic oxidations with concurrent loss of color. Low oxygen and high relative humidity can be expected to preserve carotenes. Carotenoids are extremely susceptible to nonenzymatic oxidation in dehydrated fruits and vegetables as water acts as a barrier to oxygen diffusion.

Anthocyanins: flavonoid, phenolic-based, water-soluble compounds.

low pH red
  intermediate pH colorless
  higher pH blue

Polyphenol oxidases can degrade anthocyanins in the presence of other phenolic compounds such as catechol or chlorogenic acid.

d. Nutritional quality:

Ascorbic Acid Degradation 1 to 4% oxygen generally slows ascorbic acid degradation, presumably through prevention of oxidation (lettuce, green beans, apples).

Elevated carbon dioxide can accelerate ascorbic acid degradation.

e. Microbial quality:

Plant pathogens:
  Botrytis (strawberries)
  Monolinia
  *Geotrichum candidum*
  Aspergillus
  *Aspergillus flavus*
  Penicillium Human pathogens:
  *Clostridium botulinum* (packaged mushrooms)
  *Listeria monocytogenes* (enhanced by elevated $CO_2$) on fresh vegetables
  *Aeromonas hydrophila* (MA chilled products)

It is important to note that on oxygen level which low oxygen or excessive carbon dioxide can cause fermentative metabolism leading to accumulation of ethanol and acetaldehyde.

Respiratory activity:

Climacteric fruits:
  Apples
  Banana

Nonclimacteric fruits:
  Strawberries

Generally, in the following section, various products an the parameters of their preservation are analyzed. Sections A–D represent the four parameters of spoilage: microbes, enzymes, chemical, reactions and quality parameters for customer perception: Sections E–H are the responses provided for each of sections A–D, respectively.

1. Product: Apples

A. List of Microorganisms

Spoilage microorganisms

*Botrytis cinerea* Pers. ex Fr. gray mold rot

*Cryptosporiopsis malicorticis* (=*Gloeosporium perennans*)
  lenticel rot

*C. malicorticis* (Codl.) Nannf. (=*G. perennans* Zeller and Childs)
  lenticel rot

*Penicillium expansum* Thom
  blue mold rot

*Phlyctaena vagabunda* Desm. (=*Gloeosporium album* Osterw.)
  lenticel rot

B. List of Enzymes

Endogenous enzymes:

Polygalacturonases EC 3.2.1.15

[fruit softening]. The softening observed in ripening fruits derives from the synthesis and transport to the cell wall of wall degrading glycosidases. Fruit softening is characterized by an increase in the concentration of soluble pectic polysaccharide.

Exopoloygalacturonases EC 3.2.1.67

De-esterification of cell wall galacturonans followed by polygalacturonase action.

Pectinesterase

Involoves in the preparation of the substate for polygalacturonases

Cytochrome oxidase EC 1.9.3.1

A process other than pectin degradation is also involved in fruit softening. Softening is in some way dependent upon the operation of the respiratory enzyme cytochrome oxidase. It may involve an active ion pump regulating the ionic status of the cell wall.

β-Galactosidase EC 3.2.1.23

The softening of apples is accompanied by not only pectin solubilization but also by the loss of galactose residues from the cell wall. Loss of galactose from cell walls during ripening. Incease in this activity in apples during storage causes loss of firmness.

Peroxidases EC 1.11.1.7

Decolorizing anthocyanins

Polyphenol oxidase (PPO) EC 1.14.18.1

Direct correlation between PPO activity and degree of browning. High correlation between total phenolics and degree of browning.

Decolorizing anthocyanins

Anthocyanase

Decolorizing anthocyanins

ACC synthase prime factor controlling the rate of ethylene biosynthesis

Lipoxygenase EC 1.13.11.12 activity can increase ethylene production cellulase complex:

EC 3.2.1.4

EC 3.2.1.21 degradation of cellulose enzymatic browning reaction:

Tyrosinase EC 1.14.18.1 initiates browning reaction

Catechol oxidase EC 1.10.3.2

Laccase EC 1.10.3.1

Microorganism enzymes:

Laccase EC 1.10.3.2

C. List of Chemical Reactions of Importance

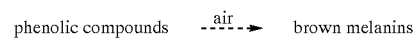

phenolic compounds $\xrightarrow{\text{air}}$ brown melanins

D. Quality Parameters of Importance

Certain varities of apples contain water-soluble flavonoid pigments.

pH is the most important factor affecting the stability of anthocyanins.

Enzymatic Browning: Tyrosinase then Catechol oxidase

E.

TABLE I

Effect of Gases on Microbes:

*Ernvinia carotovora*: Aerobes, facultative anaerobes
*Pseudomonas marginales*: Aerobes
*Acinetobacter calcoaceticus*: Aeorbes
*Alteromonas putrefacions*: Aerobes
*Serratia liquefaciens*: Facultative anaerobes
*Escherichia coli*: Facultative anaerobes
*Yersinia enterocolitica*: Facultative
*Listeria monocytogenes*: Facultative
*Penicillium italicum*: Molds
*Aspergillus niger*: Molds
*Alternaria alternata*: Molds 1. Microassays
   a. *Penicillium italicum* (ATCC 48114)

| | | |
|---|---|---|
| 95% GAS MIXES IN AIR | | |
| 95% $CO_2$ | 100% | (all in % inhibition) |
| 95% $N_2$ | 74% | |
| 95% Ar | 80% | |
| 3 best gas mixes: | | |
| 95% Ar:Ne 99.9:0.1 | 89% | |
| most other noble gas mixtures | 84% | |
| 90% GAS MIXES IN AIR | | |
| 90% $CO_2$ | 100% | |
| 90% $N_2$ | 70% | |
| 90% Ar | 78% | |
| 3 best gas mixes: | | |
| 90% Xe/Kr | 83% | |
| 90% Ar:Xe 99:1 | 83% | |
| 90% Ar:Kr 99.9:0.1 | 83% | |
| 50% GAS MIXES IN AIR | | |
| 50% $CO_2$ | 92% | |
| 50% $N_2$ | 50% | |
| 50% Ar | 55% | |
| 3 best gas mixes: | | |
| 50% Ar:Kr 99.9:0.1 | 59% | |
| 50% Ar:Xe/Kr 95:5 | 59% | |
| Kr and Ar + Xe mixes | 50% | |

F.

TABLE II

Effect of Gases on Enzymes:
Class I. Oxidoreductase (EC 1)

| Gas | Result |
|---|---|
| Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

G. Effect of Gases on Chemical Reactions

For apples, oxidation of color components is inhibited and degrative chemical oxidations are also strongly inhibited.

For example:
1. Color: one of the color changes in apples (red and green/yellow) is due to the oxidation of phenolic compounds to brown melanins. It has been found that noble gases effect oxidation in the order Xe>Kr>Ar>Ne>He in having a positive and unique utility in preventing oxidation even in the presence of oxygen.

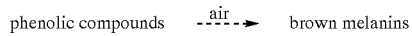

phenolic compounds --air--> brown melanins

The carotenoids that are most important in imparting color to fruits are derivatives of α- and β-carotenes and lycopene. Due to their unsaturated nature, they are generally susceptible to oxidation. It has been found that noble gases effect oxidation in the order Xe>Kr>Ar>Ne>He in having a positive and unique utility in preventing oxidation even in the presence of oxygen.

Carotenoids are extremely susceptible to nonenzymatic oxidation in dehydrated fruits and vegetables (water acts as a barrier to oxygen diffusion).

Red apples also undergo a color change due to the oxidation of anthocyanins from purplish-red to off-white. It has been found that noble gases effect oxidation of anthocyanins in the order Xe>Kr>Ar>Ne>He in having a positive and unique utility in preventing oxidation even in the presence of oxygen.

Green/yellow apples undergo a color change due to the oxidation of flavanoids. It has been found that noble gases effect oxidation of flavanoids in the order Xe>Kr>Ar>Ne>He in having a positive and unique utility in preventing oxidation even in the presence of oxygen.

It has been found that color can be maintained well beyond the point where the product becomes microbiologically unexceptable.

Ascorbic acid degradation 1 to 4% $O_2$ generally slows ascorbic acid degradation, presumably through prevention of oxidation.

Elevated $CO_2$ can accelerate ascorbic acid degradation.

2. Degradation chemical oxidations:

Enzymatic browning reaction:
   Tyrosinase EC 1.14.18.1
     initiates browning reaction
   Catechol oxidase EC 1.10.3.2
Decolorizing anthocyanins:
   Peroxidases EC 1.11.1.7
Polyphenol oxidase (PPO) EC 1.14.18.1
   Direct correlation between PPO activity and degree of browning. High correlation between total phenolics and degree of browning.
   Decolorizing anthocyanins H. Summary Generally, apples may be well preserved in gaseous mixtures containing about 80% by volume of Ar to about 80% by volume of Ar to about 99% by volume of Ar with the remainder being about 1% by volume to about 20% by volume of any one of Xe, Kr or Ne or a combination thereof. However, it is preferable to use a mixture of about 85% by volume to about 95% by volume of Ar with the remainder being about 5% by volume to about 15% by volume of any one of Xe, Kr or Ne.

Most preferably, a mixture of about 90% by volume of Ar and about 10% by volume of Xe, Kr or Ne is used.

$O_2$ and $CO_2$ may also be present, but not in large amounts. For example, if a mixture of Ar to Xe, Kr or Ne is used in a ratio of about 9:1, it is acceptable to have $O_2$ or $CO_2$ present in the amounts up to about 20 volume %, preferably no more than about 10 volume %, based on the total gas mixture.

Further, the presence of nitrogen is acceptable, as it appears to have little detrimental effect.

2. Product: Bananas

A. List of Microorganisms
   Spoilage microorganisms
   *Colletotrichum musae* (=*Gloeosporium musarum*)
   (anthracnose (bitter rot), crown rot)

*C. musae* (Berk. and Curt.) Arx (=*G. musarum* Cke. and Mass.)
   (anthracnose (bitter rot), crown rot)

*Fusarium roseum*
   (crown rot)

*F. roseum* Link emend. Snyd. and Hans
   (crown rot)

B. List of Enzymes
   endoaenous enzymes
   Polygalacturonases EC 3.2.1.15
   Exopoloygalacturonases EC 3.2.1.67
   De-esterification of cell wall galacturonans followed by polygalacturonase action.

Pectinesterase
   Involoves in the preparation of the substate for polygalacturonases Polyphenol oxidase (PPO) EC 1.14.18.1
   Widely responsible for enzymatic browning in many fruits and vegetables and particularly in bananas. Darkening of banana pulp.

Lipoxygenase EC 1.13.11.12
   Involved in flavor biogenesis: production of short-chain unsaturated aldehydes and alcohols. Activity can increase ethylene production ACC synthase
   prime factor controlling the rate of ethylene biosynthesis cellulase complex:
   EC 3.2.1.4
   EC 3.2.1.21
   degradation of cellulose amylase
   starch-sugar conversion phosphorylase
   starch-sugar conversion enzymatic browning reaction:
   Tyrosinase EC 1.14.18.1
   initiates browning reaction
   Catechol oxidase EC 1.10.3.2

Laccase EC 1.10.3.1

C. List of Chemical Reactions of Importance

Pigments as above.

D. Quality Parameters of Importance
  Starch-sugar conversion: phosphorylase and amylase
  Enzymatic Browning: Tyrosinase then Catechol oxidase
E. Table I. Effect of Gases on Microbes
  As for other vegetables.
F.

TABLE II

Effect of Gases on Enzymes:
Class I. Oxioreductase (EC 1)

| Gas | Result |
|---|---|
| Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

G. Effect of Gases on Chemical Reactions
  For bananas, oxidation of color components is inhibited and degrative chemical oxidations are also strongly inhibited.
  For example:
  1. Color: The carotenoids that are most important in imparting color to fruits are derivatives of α- and β-carotenes and lycopene. Due to their unsaturated nature, they are generally susceptible to oxidation. It has been found that noble gases effect oxidation in the order Xe>Kr>Ar>Ne>He in having a positive and unique utility in preventing oxidation even in the presence of oxygen.
    It has been found that color can be maintained well beyond the point where the product becomes microbiologically unexceptable.

2. Degrative chemical oxidations:
    enzymatic browning reaction:
      Tyrosinase EC 1.14.18.1
      initiates browning reaction
      Catechol oxidase EC 1.10.3.2

Polyphenol oxidase (PPO) EC 1.14.18.1
    Widely responsible for enzymatic browning in many fruits and vegetables and particularly in bananas. Darkening of banana pulp.
    Note: See Effect of Gases on Enzymes above for quantification of the inhibitory effect of noble gases on enzymes.
H. Summary
  Generally, the same description may be provided, and is incorporated at this point, as for apples. This is, the same gases, gas mixtures and relative amounts of each may be used to advantage.
3. Product: Bread
A. List of Microorganisms
  Molds and yeasts.
B. List of Enzymes
  Generally not important.
C. List of Chemical Reactions of Importance
  Simple oxidations.
D. Quality Parameters of Importance
  Softness (moist)
E. Table I. Effect of Gases on Microbes
  Yeasts and molds are effectively depressed by all the noble gases with respect to nitrogen or air. CO2 may be superior, but imparts color degradation and off-flavors to the bread.
F. Table II. Effect of Gases on Enzymes
  No negative effect of noble gases.
G. Effect of Gases on Chemical Reactions
  Noble gases enhance moisture retention in the bread.
H. Summary
  For bread, it is generally acceptable to use Ar and other lnoble gases in amounts of from about 70 to 100 volume %. It is acceptable to use up to about 30% $Co_2$, and up to about 20% of air or $O_2$. Thus, mixtures of about 80 to about 100% by volume of noble gas or gases may be used with about 0 to about 20% by volume of air or oxygen.
  All noble gases are useful in bread preservation, due primarily to prevention of moisture loss, inhibition of mold and yeast growth, and prevention of oxidation reactions.
4. Product: Carrots
A. List of Microorganisms:
  Spoilage microorganisms
  *Erwinia carotovora*
  (bacterial soft rot)

*Erwinia carotovora* (Jones) Holland

Pseudomonads similar to *Pseudomonas marginalis*
  (bacterial soft rot)

*Botrytis cinerea*
  (gray mold rot)

*B. cinerea* Pers. ex Fr.

*Geotrichum candidum*
  (sour rot (watery soft rot))

*Rhizopus stolonifer*
  (Rhizopus soft rot)

*Sclerotinia sclerotiorum*
  (watery soft rot)

*S. sclerotiorum* (Lib.) de Bary

B. List of Enzymes:
  Endogenous enzymes:
  Peroxidase EC 1.11.1.7
  Carrot has a medium peroxidase activity.

Catalase EC 1.11.1.6
  Causes off-flavor. A correlation exists between the storage stability of the vegetables and the activity of catalase and peroxidase. Carrot has a high catalase activity.

Phenolase EC 1.10.3.1

ACC synthase
prime factor controlling the rate of ethylene biosynthesis

Lipoxygenase EC 1.13.11.12
Activity can increase ethylene production
Oxidation by lipoxygenase can bleach carotenoids.

cellulase complex:
    EC 3.2.1.4
    EC 3.2.1.21
degradation of cellulose

Microorganism enzymes:
Laccase EC 1.10.3.2
Endopolygalacturonase EC 3.2.1.15 (extracellular)

C. List of Chemical Reactions of Importance:
    Carotenoid degradation during processing and storage:

unsaturated nature===>susceptible to isomerization and oxidation.

D. Quality Parameters of Importance:
    Ethylene induced formation of bitter isocoumarins in carrots.

α-carotenes
β-carotenes

E.

TABLE I

| Effect of Gases on Microbes: | |
|---|---|
| 1. Microassays | |
|   a. *Erwinia carotovora* (ATCC 15713) | |
| 95% GAS MIXES IN AIR | |
| 95% $CO_2$ | 100% |
| 95% $N_2$ | 0% |
| 95% Ar | 2% |
| 3 best gas mixes: | |
| 95% Ar:Ne 95:5 | 24% |
| 95% Ar:Kr 99:1 | 20% |
| 95% Ar:Ne 99:1 | 18% |
| 90% GAS MIXES IN AIR | |
| 90% $CO_2$ | 100% |
| 90% $N_2$ | 0% |
| 90% Ar | 2% |
| 3 best gas mixes: | |
| 90% Ar:Xe 99:1 | 21% |
| 90% Ar:Kr 99:1 | 20% |
| 90% Ar:Ne 99:1 | 16% |
| 50% GAS MIXES IN AIR | |
| 50% $CO_2$ | 100% |
| 50% $N_2$ | 0% |
| 50% Ar | 0% |
| Other best gas mixes: | |
| 50% Kr | 12% |
|   b. *Pseudomonas marginalis* (ATCC 10844) | |
| 95% GAS MIXES IN AIR | |
| 95% $CO_2$ | 100% |
| 95% $N_2$ | 93% |
| 95% Ar | 100% |
| 3 best gas mixes: | |
| 95% Ar:Ne 99:1 | 100% |
| 95% Ar:Ne 95:5 | 100% |

TABLE I-continued

| Effect of Gases on Microbes: | |
|---|---|
| 95% Ar:Xe/Kr 99.9:0.1 | 100% |
| 90% GAS MIXES IN AIR | |
| 90% $CO_2$ | 100% |
| 90% $N_2$ | 81% |
| 90% Ar | 85% |
| 3 best gas mixes: | |
| 90% Ar:Xe/Kr 99.9:0.1 | 100% |
| 90% Ar:Xe 95:5 | 43% |
| 90% Ar:Ne 95:5 | 43% |
| 50% GAS MIXES IN AIR | |
| 50% $CO_2$ | 100% |
| 50% $N_2$ | 0% |
| 50% Ar | 10% |
| 3 best gas mixes: | |
| 50% Ar:Kr 99:1 | 11% |
| 50% Ar:Ne 95:5 | 9% |
| 50% Xe | 16% |

TABLE 1b

Effect of Gases on Total Microorganisms from Product Trials.

| Aerobes: Gas/Gas Mix: | % | % Inhibition Compared to 100% Air |
|---|---|---|
| 1. $Co_2$ | 100 | 24% |
| 2. Ar | 100 | 33% |
| 3. (Ar:Kr):$O_2$ | [9:1]:9 | 17% |

| Anaerobes: Gas/Gas Mix: | % | % Inhibition Compared to 100% $CO_2$ |
|---|---|---|
| 1. Air | 100 | 31% |
| 2. Ar | 100 | 9% |
| 3. (Ar:Kr):$O_2$ | [9:1]:9 | 42% |
| 4. (Ar:Ne):$CO_2$ | [9:1]:9 | 32% |
| 5. (Ar:Ne):$O_2$ | [9:1]:9 | 33% |

| Yeasts: Gas/Gas Mix: | % | % Inhibition Compared to 100% Air |
|---|---|---|
| 1. $Co_2$ | 100 | 35% |
| 2. Ar | 100 | 49% |

| Molds: Gas/Gas Mix: | % | % Inhibition Compared to 100% Air |
|---|---|---|
| 1. $Co_2$ | 100 | 3% |
| 2. Ar | 100 | 20% |
| 3. Ar:$CO_2$ | 9:1 | 17% |

F.

| Effect of Gases on Enzymes: Class I. Oxidoreductase (EC 1) | |
|---|---|
| Gas | Result |
| Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |

-continued

Effect of Gases on Enzymes:
Class I. Oxidoreductase (EC 1)

| Gas | Result |
|---|---|
| Glucose oxidase EC 1.1.3.4 | |
| Xe | −91.6% (inhibition) |
| Kr | −92.7% |
| Ar | −85.8% |
| Ne | −61.7% |

G. Effect of Gases on Chemical Reactions:

For carrots, oxidation of color components is inhibited and degrative chemical oxidations are also strongly inhibited.

For example:
1. Color: The carotenoids that are most important in imparting color to fruits are derivatives of α- and β-carotenes and lycopene. Due to their unsaturated nature, they are generally susceptible to oxidation. It has been found that noble gases effect oxidation in the order Xe>Kr>Ar>Ne>He in having a positive and unique utility in preventing oxidation even in the presence of oxygen.

Carotenoids are extremely susceptible to nonenzymatic oxidation in dehydrated fruits and vegetables (water acts as a barrier to oxygen diffusion).

2. Degradative chemical oxidation:
   Lipoxygenase EC 1.13.11.12
   Lipoxygenase appears to catalyze the direct oxidation of certain unsaturated fatty acids with the concurrent bleaching of carotenoids. Carotenoids are also sensitive to nonenzymatic oxidations with concurrent loss of color.

It has been found that color can be maintained well beyond the point where the product becomes microbiologically unexceptable.

Peroxidase EC 1.11.1.7
   Decolorizing anthocyanins

Note: See Effect of Gases on Enzymes above for quantification of the inhibitory effect of noble gases on enzymes.

H. Summary:

Generally, exposure of carrots to the gases and gas mixtures of the present invention results in the improvement of color. Oxidation reactions and oxidase reactions are controlled.

In general, binary mixtures of Ar:Ne are preferably used in the relative amount of about 80 to 99 volume % Ar and 1 to 20 volumne % Ne. More preferably, about 85 to 97 volume % Ar and about 3 to 15 volume % of Ne is used. Most preferably, about 95 volume % of Ar and about 5 volume % of Ne is used.

Additionally, up to about 10 volume % Of $O_2$, air or $CO_2$ may be used.

5. Product: Fish Fillets
A. List of Microorganisms:
   I. FISH:
   Spoilage microorganisms
   Acinetobacter Aeromonas
   (known to occur)

*Aeromonas hydrophila*

Alcaligenes
   (known to occur)

Alteromonas
   (32–60% of the initial skin flora of 4 different fish)

*Alteromonas putrefaciens*

Aspergillus
   (known to occur)

Chromobacterium
   (known to occur)

Corynebacterium
   (known to occur)

Cytophaga
   (known to occur)

Enterobacter
   (known to occur)

Escherichia

Flavobacterium
   (known to occur)

Halobacterium
   (known to occur)

Microbacterium
   (known to occur)

Micrococcus

Moraxella

Penicililium
   (known to occur)

Photobacterium
   (known to occur)

Pseudomonas spp.
   (32–60% of the initial skin flora of 4 different fish)

Pseudoionas marinoglutinosa

Pseudomonas aeruginosa

Streptococcus
   (known to occur)

Oospora
   (known to occur)

Scopulariopsis
   (known to occur)

Vibrio
(known to occur)

Wallemia (Sporendonema)
(known to occur)

Candida
(most frequently found)

Cryptococcus
(known to occur)

Debaryomyces
(known to occur)

Hansenula
(known to occur)

Pichia
(known to occur)

Pullularia
(known to occur)

Rhodotorula
(most frequently found)

Sporobolomyces
(known to occur)

Torula
(most frequently found)

Torulopsis
(known to occur)

Trichosporon
(known to occur)

FRESH ICED FISH:
Spoilage microorganisms
Acinetobacter

Alteromonas

*Alteromonas putrefaciens* (=*Pseudomonas putrefaciens*)
(important fish spoilage organism)

Moraxella

Pseudomonas spp.

*Pseudomonas fragi*

CHILL STORED ROCK COD FILLETS IN 80% $CO_2$/20% AIR ATMOSPHERE:

Spoilage microorganisms
Lactobacillus
(71–87% of flora after 21 days, plus some tan-colored pseudomonads)

COD MUSCLE:

Spoilage microorganisms
Pseudomonas sp.

*Pseudomonas fluorescens*

*Pseudomonas fragi*

*Pseudomonas putida*

*Pseudomonas putrefaciens*

HADDOCK:
Spoilage microorganisms Pseudomonas spp. of Shewan's Group II and III/IV (particularly active in the spoilage process)

CHILL STORED HADDOCK:

Spoilage microorganisms
*Pseudomonas putrefaciens*

HERRING FILLETS IN AIR:

Spoilage microorganisms
*Alteromonas putrefaciens*
(62–95% of the flora after spoilage)

Pseudomonads
(62–95% of the flora after spoilage)

CHILL STORED HERRING FILLETS IN 100% $CO_2$ ATMOSPHERE:

Spoilage microorganisms
Lactobacillus
(almost 100% of spoilage bacterial flora)

CHILL STORED PACIFIC HAKE:

Spoilage microorganisms
Acinetobacter
(Highest % of the initial flora. Not isolated after 14 days)

Moraxella
(Highest % of the initial flora. Not isolated after 14 days)

Pseudomonas spp. of Shewan's Group II
(dominant types of all bacteria after 14 days)

ENGLISH SOLE AT 5° C.:

Spoilage microorganisms
Aeromonas spp.
(among the most active spoilers)

Pseudomonas spp. of Shewan's Group I and III/IV
(among the most active spoilers)

Vibrio spp.
(among the most active spoilers)

B. List of Enzymes:
Endogenous enzymes

Phospholipase (hydrolase) in fish muscle (much of the study of fish muscle lipolysis has been with lean fish in which the primary lipid constituent is phopholipid). Lipolysis occurs extensively in fish muscle post-mortem and is associated with quality deterioration in the frozen tissue. Major cause of quality deterioration.

Lipases EC 3.1.1.3
in fish muscle.

metmyoglobin reductase

Lipoxygenase EC 1.13.11.12 in fish tissues. Fish tissues, which are rich in n-3 polyunsaturated fatty acids, are very susceptible to lipid oxidation. Once lipid oxidation is initiated, very low concentrations of aldehydes with n-3 double bonds cause distinctive oxidative off-flavors. Involved in the initiation of oxidation in fish skin tissue-extracts containing high heme concentrations. Catalyzes the formation of hydroperoxides in Emerald shiner and Rainbow trout. Because of the abundance of long-chain polyunsaturated fatty acids in fish, enzyme-initiated hydroperoxidation can be significant in relation to the flavor quality of fish at a later date. Thus, early control of oxidative enzymes in fish should suppress reactions which promote the development of undesirable, autoxidatively-derived volatile carbonyls later during subsequent processing and storage.

Microsomal Lipid Peroxidation Enzyme System in fish muscle. The fish muscle microsomal fraction is very active at relatively low temperatures and even has significant activity in the frozen state. The exact role of this enzyme system in fish quality is still not fully understood. Since the microsomal lipid peroxidation enzyme system is active at temperatures below the freezing point of fish tissue, it is possible that enzymatic lipid peroxidation activates phospholipase A2 to initiate phospholipids hydrolysis. In frozen fish muscle, increased level of lipid peroxidation correlates with an increasing level of phospholipids hydrolysis. It is possible that an endogenous lipid peroxidizing capacity may play a fundamental role in turnover and metabolism of membrane lipids.

Myleoperoxidase-like enzyme in fish leukocytes. Capable of initiating lipid oxidation along with concurrent carotenoid degradation when $H_2O_2$ and halide salts are present.

Proteinases
  Cathepsin D EC 3.4.23.5
  Neutral proteinase
  Cathepsin B EC 3.4.22.1
  Alkaline proteinase
in fish skeletal muscle. Involved in the breakdown of tissue proteins. Affect quality. Implicated in the textural degradation of minced fish meat.

β-Glucuronidase EC 3.2.1.31
in fish skeletal muscle (lysosomal and microsomal localization). Involved in the hydrolysis of glucose-galactose moieties present in collagen and the mucopolysaccharide-protein complexes of the connective tissue matrix. Also implicated in the cleavage of glucuronidic disaccharide linkages of the protein polysaccharide complex occuring in the connective tissue. Autolytic process leading to early spoilage.

Glycolysis Pathway System
Production of energy, accumulation of lactic acid. The source of most post-mortem energy under anaerobic conditions is glygogen breakdown through glycolysis.

Creatine kinase EC 2.7.3.2
Involved in the regeneration of ATP. Accounts for 13–20% of total sarcoplasmic proteins in fish muscle.

Myofibrillar and sarcoplasmic ATPases
Catalyzes the breakdown of ATP in fish muscle. Onset of rigor-mortis: ATP and creatine phosphate breakdown and lactic acid accumulation in fish muscle.

COD MUSCLE:

Endogenous enzymes
Phospholipase (Hydrolase)
Most of the hydrolysis in cod is autolytic, not bacterial, in nature. Extensive: 75% of cod phospholipid is hydrolyzed in the first month of frozen storage at −7° C. Lipid hydrolysis has been almost exclusively attributed to phospholipid hydrolysis.

Lipoxygenase EC 1.13.11.12
Trans-2, cis-4-heptadienal, cis-4-heptenal, and hexenal increase with the time and temperature of storage. These correspond to the possible oxidation products of n-3 unsaturated fatty acids released primarily from the phospholipids of frozen stored cod.

Microorganism enzymes:
Glycosidases (β-D-Glucosidase EC 3.2.1.21, β-D-Galactosidase EC 3.2.1.23)

Proteases
  Fish myosin is the most effective in supporting growth and enzyme secretion by *Aeromonas hydrophila*.
Protease
  Substantial degradation of fish actomyosin even at refrigerated temperatures.
*Pseudomonas fluorescens*
  Endo Pectate Lyase EC 4.2.2.3 (extracellular)
  Lipase EC 3.1.1.3 (extracellular)
  Glycosidases (β-D-Glucosidase
  EC 3.2.1.21, β-D-Galactosidase EC 3.2.1.23)
Lipase EC 3.1.1.3 (*Aspergillus niger*)
Lipase EC 3.1.1.3 (*Candida paralipolytica*)
Lipase EC 3.1.1.3 (Pseudomonas spp.)
Lipase EC 3.1.1.3 (Pseudomonas sp.)
Glucoamylase EC 3.2.1.3 (extracellular)
α-Galactosidase EC 3.2.1.22 (*A. oryzae*/extracellular)
Proteolytic enzymes (extracellular, *Pseudomonas fragi*)

C. List of Chemical Reactions of Importance: oxidation

Oxymyoglobin ---------->metmyoglobin

D. Quality Parameters of Importance:
  Bright red color: oxymyoglobin
  Brown color: metmyoglobin
  Reduction of metmyoglobin to myoglobin: succinic dehydrogenase, metmyoglobin reductase
  Greening of tuna (only when cooked):
    TMAO trimethylamine oxide+heat-denatured metmyoglobin

E.

TABLE I

Effect of Gases on Microbes:

1. Microassays:
   a. *Acinetobacter calcoaceticus* (ATCC 23055)

| 95% GAS MIXES IN AIR | |
   |---|---|
   | 95% $CO_2$ | 100% |
   | 95% $N_2$ | 88% |
   | 95% Ar | 93% |
   | 3 best gas mixes: | |
   | 95% Xe | 94% |
   | 95% Ar:Kr 50:50 | 100% |
   | 95% Ar:Xe 99:1 | 93% |
   | 90% GAS MIXES IN AIR | |
   | 90% $CO_2$ | 100% |
   | 90% $N_2$ | 84% |
   | 90% Ar | 93% |
   | Other best gas mixes: | |
   | 90% Ar:Ne 50:50 | 90% |
   | 50% GAS MIXES IN AIR | |
   | 50% $CO_2$ | 90% |
   | 50% $N_2$ | 80% |
   | 50% Ar | 88% |
   | Other best gas mixes: | |
   | 50% Ar:Xe 50:50 | 90% |
   | 50% Ar:Xe 95:5 | 90% | b. *Alteromonas putrefaciens* (ATCC 8071)

All $O_2$ mixes (95%, 90%, and 50%) and all $CO_2$ mixes (95%, 90%, 50%) give 100% inhibition.

| 95% GAS MIXES IN AIR | |
   |---|---|
   | 95% $CO_2$ | 100% |
   | 95% $N_2$ | 100% |
   | 95% Ar | 100% |
   | Other best gas mixes: | |
   | 95% Ne | 49% |
   | 95% Xe | 100% |
   | 90% GAS MIXES IN AIR | |
   | 90% $CO_2$ | 100% |
   | 90% $N_2$ | 50% |
   | 90% Ar | 63% |
   | Other best gas mixes: | |
   | 90% Kr | 61% |
   | 90% Xe/Kr | 62% |
   | 50% GAS MIXES IN AIR | |
   | 50% $CO_2$ | 100% |

50% $N_2$ and 50% Ar: for all the 50% mixes in air (except for $O_2$ and $CO_2$), slower growth than in air but reaches the same plateau.

c. *Aspergillus niger* (ATCC 16888)

| 95% GAS MIXES IN AIR | |
   |---|---|
   | 95% $CO_2$ | 100% |
   | 95% $N_2$ | 64% |
   | 95% Ar | 64% |
   | 3 best gas mixes: | |
   | 95% Xe | 94% |
   | 95% Ar:Kr 99.9:0.1 | 76% |
   | 95% Ar:Ne 99.9:0.1 | 76% |
   | 90% GAS MIXES IN AIR | |
   | 90% $CO_2$ | 100% |
   | 90% $N_2$ | 52% |
   | 90% Ar | 64% |
   | 3 best gas mixes: | |
   | 90% Xe | 94% |
   | 90% Ar:Kr 95:5 | 81% |
   | 90% Ar:Xe/Kr 99.9:0.1 | 70% |
   | 50% GAS MIXES IN AIR | |
   | 50% $CO_2$ | 100% |
   | 50% $N_2$ | 42% |
   | 50% Ar | 49% |
   | 3 best gas mixes: | |
   | 50% Ar:Xe/Kr 99.9:0.1 | 52% |
   | 50% Ar:Kr 95:5 | 52% |
   | 50% Ar:Ne 99:1 | 52% |

TABLE I-continued

Effect of Gases on Microbes:

d. *Penicillium italicum* (ATCC 48114)

| 95% GAS MIXES IN AIR | |
   |---|---|
   | 95% $CO_2$ | 100% |
   | 95% $N_2$ | 74% |
   | 95% Ar | 80% |
   | 3 best gas mixes: | |
   | 95% Ar:Ne 99.9:0.1 | 89% |
   | most other noble gas mixtures | 84% |
   | 90% GAS MIXES IN AIR | |
   | 90% $CO_2$ | 100% |
   | 90% $N_2$ | 70% |
   | 90% Ar | 78% |
   | 3 best gas mixes: | |
   | 90% Xe/Kr | 83% |
   | 90% Ar:Xe 99:1 | 83% |
   | 90% Ar:Kr 99.9:0.1 | 83% |
   | 50% GAS MIXES IN AIR | |
   | 50% $CO_2$ | 92% |
   | 50% $N_2$ | 50% |
   | 50% Ar | 55% |
   | 3 best gas mixes: | |
   | 50% Ar:Kr 99.9:0.1 | 59% |
   | 50% Ar:Xe/Kr 95:5 | 59% |
   | Kr and Ar + Xe mixes | 50% | e. *Pseudomonas marginalis* (ATCC 10844)

| 95% GAS MIXES IN AIR | |
   |---|---|
   | 95% $CO_2$ | 100% |
   | 95% $N_2$ | 93% |
   | 95% Ar | 100% |
   | 3 best gas mixes: | |
   | 95% Ar:Ne 99:1 | 100% |
   | 95% Ar:Ne 95:5 | 100% |
   | 95% Ar:Xe/Kr 99.9:0.1 | 100% |
   | 90% GAS MIXES IN AIR | |
   | 90% $CO_2$ | 100% |
   | 90% $N_2$ | 81% |
   | 90% Ar | 85% |
   | 3 best gas mixes: | |
   | 90% Ar:Xe/Kr 99.9:0.1 | 100% |
   | 90% Ar:Xe 95:5 | 43% |
   | 90% Ar:Ne 95:5 | 43% |
   | 50% GAS MIXES IN AIR | |
   | 50% $CO_2$ | 100% |
   | 50% $N_2$ | 0% |
   | 50% Ar | 10% |
   | 3 best gas mixes: | |
   | 50% Ar:Kr 99:1 | 11% |
   | 50% Ar:Ne 95:5 | 9% |
   | 50% Xe | 16% | f. *Serratia liquefaciens* (ATCC 35551)

| 95% GAS MIXES IN AIR | |
   |---|---|
   | 95% $CO_2$ | 47% |
   | 95% $N_2$ | 0% |
   | 95% Ar | 0% |
   | Other best gas mixes: | |
   | 95% Ar:Xe 99:1 | 15% |
   | 95% Ar:Xe 99:5 | 18% |
   | 90% GAS MIXES IN AIR | |
   | 90% $CO_2$ | 2% |
   | 90% $N_2$ | 0% |
   | 90% Ar | 0% |
   | Other best gas mixes: | |
   | 90% Xe | 14% |
   | 50% GAS MIXES IN AIR | |
   | 50% $CO_2$ | 0% |
   | 50% $N_2$ | 0% |
   | 50% Ar | 0% | g. *Escherichia coli* (ATCC 9637)

| 95% GAS MIXES IN AIR | |
   |---|---|
   | 95% $CO_2$ | 100% |
   | 95% $N_2$ | 62% |
   | 95% Ar | 78% |
   | 3 best gas mixes: | |

TABLE I-continued

Effect of Gases on Microbes:

| | |
|---|---|
| 95% Ar:Ne 95:5 | 78% |
| 95% Xe | 82% |
| 95% Ar:Kr 95:5 | 78% |
| 90% GAS MIXES IN AIR | |
| 90% $CO_2$ | 100% |
| 90% $N_2$ | 51% |
| 90% Ar | 65% |
| 3 best gas mixes: | |
| 90% Kr | 78% |
| 90% Xe | 78% |
| 90% Ar:Xe 99:1 | 67% |
| 50% GAS MIXES IN AIR | |
| 50% $CO_2$ | 100% |
| 50% $N_2$ | 12% |
| 50% Ar | 15% |
| Other best gas mixes: | |
| 50% Ar:Kr 99:1 | 16% |
| 50% Ar:Xe/Kr 95:5 | 17% |

TABLE 1b

Effect of Gases on Total Microorganisms from Product Trials.

| Aerobes: Gas/Gas Mix: | % | % Inhibition Compared to 100% Air |
|---|---|---|
| 1. $CO_2$ | 100 | 14% |
| 2. Ar | 100 | 13% |
| 3. Ar:Ne | 9:1 | 3% |
| 4. [Ar:Ne]:$O_2$ | [9:1]:9 | 1% |
| 5. [Ar:Ne]:$CO_2$ | [9:1]:9 | 4% |

| Anaerobes: Gas/Gas Mix: | % | % Inhibition Compared to 100% $CO_2$ |
|---|---|---|
| 1. Air | 100 | 61% |
| 2. Ar | 100 | 2% |

| Yeasts: Gas/Gas Mix: | % | % Inhibition Compared to 100% Air |
|---|---|---|
| 1. $CO_2$ | 100 | 36% |
| 2. Ar | 100 | 35% |
| 3. Ar:$CO_2$ | 9:1 | 56% |

| Molds: Gas/Gas Mix: | % | % Inhibition Compared to 100% Air |
|---|---|---|
| 1. $CO_2$ | 100 | 18% |
| 2. Ar | 100 | 15% |
| 3. Ar:$CO_2$ | 9:1 | 21% |
| 4. Ar:Kr | 9:1 | 16% |

F.

TABLE II

Effect of Gases on Enzymes:
Class I. Oxdoreductase (EC 1)

| Gas | Result |
|---|---|
| Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |

TABLE II-continued

Effect of Gases on Enzymes:
Class I. Oxdoreductase (EC 1)

| Gas | Result |
|---|---|
| Glucose oxidase EC 1.1.3.4 | |
| Xe | −91.6% (inhibition) |
| Kr | −92.7% |
| Ar | −85.8% |
| Ne | −61.7% |

Class III. Hydrolases (EC3)
Generally strongly enhanced by noble gases.

Lipase EC 3.1.1.3
Showed up to −20% inhibition with Argon and noble gases.

Protease (α-Chymotrypsin EC 3.4.21.1)
Showed up to −20 inhibition with Argon and noble gases depending on temperature.

G. Effect of Gases on Chemical Reactions:
For fish, oxidation of color components is inhibited and degrative chemical oxidations are also strongly inhibited.
For example:

1. Color:
   Bright red color: oxymyoglobin
   Brown color: metmyoglobin
   Greening of tuna (only when cooked):
   TMAO trimethylamine oxide+heat-denatured metmyoglobin

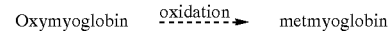

Oxymyoglobin $\xrightarrow{oxidation}$ metmyoglobin

It has been found that noble gases effect oxidation in the order Xe>Kr>Ar>Ne>He in having a positive and unique utility in preventing oxidation even in the presence of oxygen.

It has been found that color can be maintained well beyond the point where the product becomes microbiologically unexceptable.

2. Degrative chemical oxidation:
   Phospholipase (hydrolase)
      in fish muscle (much of the study of fish muscle lipolysis has been with lean fish in which the primary lipid constituent is phopholipid). Lipolysis occurs extensively in fish muscle post-mortem and is associated with quality deterioration in the frozen tissue. Major cause of quality deterioration.

Lipases EC 3.1.1.3
in fish muscle.

metmyoglobin reductase succinic dehydrogenase metmyoalobin reductase

Lipoxygenase EC 1.13.11.12
   in fish tissues. Fish tissues, which are rich in n-3 polyunsaturated fatty acids, are very susceptible to lipid oxidation.

Proteinases
Cathepsin D EC 3.4.23.5
Neutral proteinase
Cathepsin B EC 3.4.22.1
Alkaline proteinase
   in fish skeletal muscle. Involved in the breakdown of tissue proteins. Affect quality. Implicated in the textural degradation of minced fish meat.

Glycolysis Pathway System
Production of energy, accumulation of lactic acid. The source of most post-mortem energy under anaerobic conditions is glygogen breakdown through glycolysis.

Note: See Effect of Gases on Enzymes above for quantification of the inhibitory effect of noble gases on enzymes.

H. Summary:
Generally, mixtures of Ar and Dr or Xe in relative amounts of about 50–95 volume % Ar and about 5–50 volume % Kr work quite well.
However, some $CO_2$ may also be present provided that it does not mask the effects of the binary mixture.

6. Product: Green Beans, Refrigerated
A. List of Microorganisms:
Spoilage microorganisms
*Corynebacterium flacuumfaciens*
[bacterial wilt]

*Corynebacterium michiganese*
[bacterial canker]

*Erwinia carotovora*
[bacterial soft rot]

Pseudomonads similar to *Pseudomonas marginalis*
[bacterial soft rot]

*Pseudomonas phaseolicola*
[halo blight]

*Xanthomonas phaseoli*
[common blight]

*Botrytis cinerea*
[gray mold rot]

*Colleototrichum coccodes*
[anthracnose (spotting)]

*Geotrichum candidum*
[sour rot (watery soft rot)]

*Rhizopus stolonifer*
[Rhizopus soft rot]

B. List of Enzymes:
Endogenous enzymes:
ACC synthase
prime factor controlling the rate of ethylene biosynthesis Lipoxygenase EC 1.13.11.12
activity can increase ethylene production Chlorophyllase EC 3.1.1.14

Peroxidase cellulase complex:
   EC 3.2.1.4
   EC 3.2.1.21
degradation of cellulose Microorganism enzymes:
Laccase EC 1.10.3.2 (*Botrytis cinerea*)
Endopolygalacturonase EC 3.2.1.15 (extracellular, *Rhizopus stolonifer*)

C. List of Chemical Reactions of Importance:
D. Quality Parameters of Importance:
   Ascorbic acid retention
   Chlorophyll retention
E.

TABLE I

Effect of Gases on Microbes:

1. Microassays:
   a. *Erwinia carotovora* (ATCC 15713)

| 95% GAS MIXES IN AIR | |
   |---|---|
   | 95% $CO_2$ | 100% |
   | 95% $N_2$ | 0% |
   | 95% Ar | 2% |
   | 3 best gas mixes: | |
   | 95% Ar:Ne 95:5 | 24% |
   | 95% Ar:Kr 99:1 | 20% |
   | 95% Ar:Ne 99:1 | 18% |
   | 90% GAS MIXES IN AIR | |
   | 90% $CO_2$ | 100% |
   | 90% $N_2$ | 0% |
   | 90% Ar | 2% |
   | 3 best gas mixes: | |
   | 90% Ar:Xe 99:1 | 21% |
   | 90% Ar:Kr 99:1 | 20% |
   | 90% Ar:Ne 99:1 | 16% |
   | 50% GAS MIXES IN AIR | |
   | 50% $CO_2$ | 100% |
   | 50% $N_2$ | 0% |
   | 50% Ar | 0% |
   | Other best gas mixes: | |
   | 50% Kr | 12% | b. *Pseudomonas marginalis* (ATCC 10844)

| 95% GAS MIXES IN AIR | |
   |---|---|
   | 95% $CO_2$ | 100% |
   | 95% $N_2$ | 93% |
   | 95% Ar | 100% |
   | 3 best gas mixes: | |
   | 95% Ar:Ne 99:1 | 100% |
   | 95% Ar:Ne 95:5 | 100% |
   | 95% Ar:Xe/Kr 99.9:0.1 | 100% |
   | 90% GAS MIXES IN AIR | |
   | 90% $CO_2$ | 100% |
   | 90% $N_2$ | 81% |
   | 90% Ar | 85% |
   | 3 best gas mixes: | |
   | 90% Ar:Xe/Kr 99.9:0.1 | 100% |
   | 90% Ar:Xe 95:5 | 43% |
   | 90% Ar:Ne 95:5 | 43% |
   | 50% GAS MIXES IN AIR | |
   | 50% $CO_2$ | 100% |
   | 50% $N_2$ | 0% |
   | 50% Ar | 10% |
   | 3 best gas mixes: | |
   | 50% Ar:Kr 99:1 | 11% |
   | 50% Ar:Ne 95:5 | 9% |
   | 50% Xe | 16% |

TABLE 1b

Effect of Gases on Total Microorganisms from Product Trials.

| Aerobes: Gas/Gas Mix: | % | % Inhibition Compared to 100% Air: |
|---|---|---|
| 1. $CO_2$ | 100 | 26% |
| 2. Ar | 100 | 11% |
| 3. [Ar:Kr]:$CO_2$ | [9:1]:9 | 32% |

| Anaerobes: Gas/Gas Mix: | % | % Inhibition Compared to 100% $CO_2$ |
|---|---|---|
| 1. Air | 100 | 66% |
| 2. Ar | 100 | 61% |
| 3. [Ar:Kr]$O_2$ | [9:1]:9 | 31% |

| Yeasts: Gas/Gas Mix: | % | % Inhibition Compared to 100% Air |
|---|---|---|
| 1. $CO_2$ | 100 | 55% |
| 2. Ar | 100 | 20% |
| 3. Ar:$CO_2$ | 9:1 | 41% |
| 4. Ar:Kr | 9:1 | 20% |

| Molds: Gas/Gas Mix: | % | % Inhibition Compared to 100% Air |
|---|---|---|
| 1. $CO_2$ | 100 | 2% |
| 2. Ar | 100 | 25% |
| 3. Ar:Kr | 9:1 | 31% |

F.

TABLE II

Effect of Gases on Enzymes: Class I. Oxidoreductase (EC 1)

| Gas | Result |
|---|---|

Tyrosinase EC 1.14.18.1
at 25° and optimal reaction conditions, simple saturation of solution with gas:

| Xe | −73% (inhibition) |
| Kr | −73% |
| Ar | −60% |
| Ne | −46.7% |
| 90:10 Xe:Kr | −50% |
| Ar:Xe 99:1 | −70% |

Glucose oxidase EC 1.1.3.4

| Xe | −91.6% (inhibition) |
| Kr | −92.7% |
| Ar | −85.8% |
| Ne | −61.7% |

Class III. Hydrolases (EC3)

Lipase EC 3.1.1.3

Showed up to −20% inhibition with Argon and noble gases.

Protease (α-Chymotrypsin EC 3.4.21.1)

Showed up to −20 inhibition with Argon and noble gases depending on temperature.

G. Effect of Gases on Chemical Reactions

For green beans, oxidation of color components is inhibited and degrative chemical oxidations are also strongly inhibited.

For example:

1. Color: The oxidation of chlorophyll is the primary color change. As the chlorophyll is broken down, the carotenoids are exposed, giving rise to a yellowing of the products. It has been found that noble gases effect oxidation in the order Xe>Kr>Ar>Ne>He in having a positive and unique utility in preventing oxidation even in the presence of oxygen.

Ascorbic acid degradation: maintaining a minimum of 1 to 4% $O_2$ generally slows ascorbic acid degradation by preventing oxidation. It has been found that noble gases effect oxidation in the order Xe>Kr>Ar>Ne?He in having a positive and unique utility in preventing oxidation even in the presence of oxygen.

Elevated $CO_2$ levels accelerate ascorbic acid degradation.

It has been found that color can be maintained well beyond the point where the product becomes microbiologically unexceptable.

2. Degradative chemical oxidations:

Lipoxygenase EC 1.13.11.12 activity can increase ethylene production

Chlorophyllase EC 3.1.1.14

Peroxidase cellulase complex:
  EC 3.2.1.4
  EC 3.2.1.21
degradation of cellulose Note: See Effect of Gases on Enzymes above for quantification of the inhibitory effect of noble gases on enzymes.

H. Summary:

Generally, mixtures of Ar:Kr or Xe in relative amounts of about 80–95:5–20 volume % is preferable. More preferably, relative amounts of about 85–95:5–15 volume % is used. It is still more preferable to use a mixture of Ar;Kr or Xe of about 9:1 relative in volume %.

However, it each of the above mixtures, generally about 1–15 volume % of $O_2$, preferably about 2–10 volume % of $O_2$ is included.

7. Product: Green Beans, Room Temperature

A. List of Microorganisms:
  Spoilage microorganisms
  *Corynebacterium flacuumfaciens*
  [bacterial wilt]

*Corynebacterium michiganese*
  [bacterial canker]

*Erwinia carotovora*
  [bacterial soft rot]

Pseudomonads similar to *Pseudomonas marginalis*
[bacterial soft rot]

*Pseudomonas phaseolicola*
[halo blight]

*Xanthomonas phaseoli*
[common blight]

*Botrytis cinerea*
[gray mold rot]

*Colleototrichum coccodes*
[anthracnose (spotting)]

*Geotrichum candidum*
[sour rot (watery soft rot)]

*Rhizopus stolonifer*
[Rhizopus soft rot]

B. List of Enzymes:
Endogenous enzymes:
ACC synthase
prime factor controlling the rate of ethylene biosynthesis Lipoxygenase EC 1.13.11.12
activity can increase ethylene production Chlorophyllase EC 3.1.1.14

Peroxidase cellulase complex:
   EC 3.2.1.4
   EC 3.2.1.21
degradation of cellulose Microorganism enzymes:
Laccase EC 1.10.3.2 (*Botrytis cinerea*)
Endopolygalacturonase EC 3.2.1.15 (extracellular, *Rhizopus stolonifer*)

C. List of Chemical Reactions of Importance:

D. Quality Parameters of Importance:
Ascorbic acid retention
Chlorophyll retention

E.

TABLE I

Effect of Gases on Microbes:

1. Microassays:
  a. *Erwinia carotovora* (ATCC 15713)

| | | |
|---|---|---|
| 95% GAS MIXES IN AIR | | |
| 95% $CO_2$ | 100% | |
| 95% $N_2$ | 0% | |
| 95% Ar | 2% | |
| 3 best gas mixes: | | |
| 95% Ar:Ne 95:5 | 24% | |
| 95% Ar:Kr 99:1 | 20% | |
| 95% Ar:Ne 99:1 | 18% | |

TABLE I-continued

Effect of Gases on Microbes:

| | | |
|---|---|---|
| 90% GAS MIXES IN AIR | | |
| 90% $CO_2$ | 100% | |
| 90% $N_2$ | 0% | |
| 90% Ar | 2% | |
| 3 best gas mixes: | | |
| 90% Ar:Xe 99:1 | 21% | |
| 90% Ar:Kr 99:1 | 20% | |
| 90% Ar:Ne 99:1 | 16% | |
| 50% GAS MIXES IN AIR | | |
| 50% $CO_2$ | 100% | |
| 50% $N_2$ | 0% | |
| 50% Ar | 0% | |
| Other best gas mixes: | | |
| 50% Kr | 12% | |
| b. *Pseudomonas marginalis* (ATCC 10844) | | |
| 95% GAS MIXES IN AIR | | |
| 95% $CO_2$ | 100% | |
| 95% $N_2$ | 93% | |
| 95% Ar | 100% | |
| 3 best gas mixes: | | |
| 95% Ar:Ne 99:1 | 100% | |
| 95% Ar:Ne 95:5 | 100% | |
| 95% Ar:Xe/Kr 99.9:0.1 | 100% | |
| 90% GAS MIXES IN AIR | | |
| 90% $CO_2$ | 100% | |
| 90% $N_2$ | 81% | |
| 90% Ar | 85% | |
| 3 best gas mixes: | | |
| 90% Ar:Xe/Kr 99.9:0.1 | 100% | |
| 90% Ar:Xe 95:5 | 43% | |
| 90% Ar:Ne 95:5 | 43% | |
| 50% GAS MIXES IN AIR | | |
| 50% $CO_2$ | 100% | |
| 50% $N_2$ | 0% | |
| 50% Ar | 10% | |
| 3 best gas mixes: | | |
| 50% Ar:Kr 99:1 | 11% | |
| 50% Ar:Ne 95:5 | 9% | |
| 50% Xe | 16% | |

F.

TABLE 1b

Effect of Gases on Total Microorganisms from Product Trials.

| Gas/Gas Mix: | % | % Inhibition Compared to 100% Air |
|---|---|---|
| Aerobes: | | |
| 1. $CO_2$ | 100 | 10% |
| 2. Ar | 100 | 2% |
| 3. Ar:Ne | 9:1 | 2% |
| Yeasts: | | |
| 1. $CO_2$ | 100 | 19% |
| 2. Ar | 100 | 10% |
| 3. (Ar:Ne):$O_2$ | (9:1):9 | 10% |
| 4. (Ar:Ke):$CO_2$ | (9:1):9 | 9% |
| Molds: | | |
| 1. $CO_2$ | 100 | 3% |
| 2. Ar | 100 | 15% |
| 3. (Ar:Ne):$CO_2$ | [9:1]:9 | 9% |
| 4. Ar:$O_2$ | 9:1 | 1% |

| Effect of Gases on Enzymes: | |
|---|---|
| Gas | Result |
| Class I. Oxidoreductase (EC 1) | |
| Tyrosinase EC 1.14.18.1 | |
| at 25° and optimal reaction | |
| conditions, simple saturation of | |
| solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

Class III. Hydrolases (EC3)

Lipase EC 3.1.1.3
Showed up to −20% inhibition with Argon and noble gases.

Protease (α-Chymotrypsin EC 3.4.21.1)
Showed up to −20 inhibition with Argon and noble gases depending on temperature.

G. Effect of Gases on Chemical Reactions

For green beans, oxidation of color components is inhibited and degrative chemical oxidations are also strongly inhibited.
For example:
1. Color: The oxidation of chlorophyll is the primary color change. As the chlorophyll is broken down, the carotenoids are exposed, giving rise to a yellowing of the products. It has been found that noble gases effect oxidation in the order Xe>Kr>Ar>Ne>He in having a positive and unique utility in preventing oxidation even in the presence of oxygen.

Ascorbic acid degradation: maintaining a minimum of 1 to 4% oxygen generally slows ascorbic acid degradation by preventing oxidation. It has been found that noble gases effect oxidation in the order Xe>Kr>Ar>Ne>He in having a positive and unique utility in preventing oxidation even in the presence of oxygen.

Elevated carbon dioxide levels accelerate ascorbic acid degradation.

It has been found that color can be maintained well beyond the point where the product becomes microbiologically unexceptable.

2. Degradative chemical oxidations:
    Lipoxygenase EC 1.13.11.12
    activity can increase ethylene production Chlorophyllase EC 3.1.1.14

Peroxidase cellulase complex:
    EC 3.2.1.4
    EC 3.2.1.21
    degradation of cellulose Note: See Effect of Gases on Enzymes above for quantification of the inhibitory effect of noble gases on enzymes.

H. Summary:
Generally, the most effective mixtures are those as described in the previous section for green beans, including gases, gas mixtures and relative amounts of each.

8. Product: Ground Beef

A. List of Microorganisms:

MEATS:
Spoilage microorganisms
Achromobacter

Flavobacterium

Micrococcus

Bacillus

Proteus

Moraxella

Acineobacter

Enterobacetiaceae

Candida

Lactobacilli dominate

*Clostridium perfringens*

*Pseudomonas fragi* (Pork)

*Staphylococcus aureus*

*Aeromonas hydrophila*

*Yersinia enterocolitica*

*Escherichia coli*

*Listeria monocytogenes*

PROCESSED MEATS:

Spoilage microorganisms
Lactobacillus

Streptococcus

Aspergillus

Penicillium

CURED MEATS:

Spoilage microorganisms
Aspergillus

Penicillium

VACUUM-PACKAGED MEATS:

Spoilage microorganisms
Lactobacillus

B. List of Enzymes:
Microorganism enzymes:

Lipase EC 3.1.1.3 (*Candida paralipolytica*)
Lipase EC 3.1.1.3 (Pseudomonas spp.)
Lipase EC 3.1.1.3 (*Aspergillus niger*)
Glucoamylase EC 3.2.1.3 (extracellular, *Aspergillus niger*)
α-Galactosidase EC 3.2.1.22 (*A. oryzae*/extracellular)
Proteolytic enzymes (extracellular)
  Considerable proteolysis evident after 20 days. Maximum bacterial count reached on day 6. Growth and spoilage by *Ps. fragi* occurs on the surface, and only at late stages do the effects of spoilage penetrate the entire meat sample.
protease (CAF; calcium activated factor)
Cathepsins (Lysosomal enzymes)

C. List of Chemical Reactions of Importance:

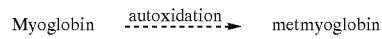

Myoglobin $\xrightarrow{\text{autoxidation}}$ metmyoglobin

D.

TABLE I

Effect of Gases on Microbes:

1. Microassays
   a. *Acinetobacter calcoaceticus* (ATCC 23055)

| | |
   |---|---|
   | 95% GAS MIXES IN AIR | |
   | 95% $CO_2$ | 100% |
   | 95% $N_2$ | 88% |
   | 95% Ar | 93% |
   | 3 best gas mixes: | |
   | 95% Xe | 94% |
   | 95% Ar:Kr 50:50 | 100% |
   | 95% Ar:Xe 99:1 | 93% |
   | 90% GAS MIXES IN AIR | |
   | 90% $CO_2$ | 100% |
   | 90% $N_2$ | 84% |
   | 90% Ar | 93% |
   | Other best gas mixes: | |
   | 90% Ar:Ne 50:50 | 90% |
   | 50% GAS MIXES IN AIR | |
   | 50% $CO_2$ | 90% |
   | 50% $N_2$ | 80% |
   | 50% Ar | 88% |
   | Other best gas mixes: | |
   | 50% Ar:Xe 50:50 | 90% |
   | 50% Ar:Xe 95:5 | 90% | b. *Aspergillus niger* (ATCC 16888)

| | |
   |---|---|
   | 95% GAS MIXES IN AIR | |
   | 95% $CO_2$ | 100% |
   | 95% $N_2$ | 64% |
   | 95% Ar | 64% |

TABLE I-continued

Effect of Gases on Microbes:

| | |
|---|---|
| 3 best gas mixes: | |
| 95% Xe | 94% |
| 95% Ar:Kr 99.9:0.1 | 76% |
| 95% Ar:Ne 99.9:0.1 | 76% |
| 90% GAS MIXES IN AIR | |
| 90% $CO_2$ | 100% |
| 90% $N_2$ | 52% |
| 90% Ar | 64% |
| 3 best gas mixes: | |
| 90% Xe | 94% |
| 90% Ar:Kr 95:5 | 81% |
| 90% Ar:Xe/Kr 99.9:0.1 | 70% |
| 50% GAS MIXES IN AIR | |
| 50% $CO_2$ | 100% |
| 50% $N_2$ | 42% |
| 50% Ar | 49% |
| 3 best gas mixes: | |
| 50% Ar:Xe/Kr 99.9:0.1 | 52% |
| 50% Ar:Kr 95:5 | 52% |
| 50% Ar:Ne 99:1 | 52% | c. *Penicillium italicum* (ATCC 48114)

| | |
|---|---|
| 95% GAS MIXES IN AIR | |
| 95% $CO_2$ | 100% |
| 95% $N_2$ | 74% |
| 95% Ar | 80% |
| 3 best gas mixes: | |
| 95% Ar:Ne 99.9:0.1 | 89% |
| most other noble gas mixtures | 84% |
| 90% GAS MIXES IN AIR | |
| 90% $CO_2$ | 100% |
| 90% $N_2$ | 70% |
| 90% Ar | 78% |
| 3 best gas mixes: | |
| 90% Xe/Kr | 83% |
| 90% Ar:Xe 99:1 | 83% |
| 90% Ar:Kr 99.9:0.1 | 83% |
| 50% GAS MIXES IN AIR | |
| 50% $CO_2$ | 92% |
| 50% $N_2$ | 50% |
| 50% Ar | 55% |
| 3 best gas mixes: | |
| 50% Ar:Kr 99.9:0.1 | 59% |
| 50% Ar:Xe/Kr 95:5 | 59% |
| Kr and Ar + Xe mixes | 50% | d. *Pseudomonas marginalis* (ATCC 10844)

| | |
|---|---|
| 95% GAS MIXES IN AIR | |
| 95% $CO_2$ | 100% |
| 95% $N_2$ | 93% |
| 95% Ar | 100% |
| 3 best gas mixes: | |
| 95% Ar:Ne 99:1 | 100% |
| 95% Ar:Ne 95:5 | 100% |
| 95% Ar:Xe/Kr 99.9:0.1 | 100% |
| 90% GAS MIXES IN AIR | |
| 90% $CO_2$ | 100% |
| 90% $N_2$ | 81% |
| 90% Ar | 85% |
| 3 best gas mixes: | |
| 90% Ar:Xe/Kr 99.9:0.1 | 100% |
| 90% Ar:Xe 95:5 | 43% |
| 90% Ar:Ne 95:5 | 43% |
| 50% GAS MIXES IN AIR | |
| 50% $CO_2$ | 100% |
| 50% $N_2$ | 0% |
| 50% Ar | 10% |
| 3 best gas mixes: | |
| 50% Ar:Kr 99:1 | 11% |
| 50% Ar:Ne 95:5 | 9% |
| 50% Xe | 16% |

TABLE I-continued

Effect of Gases on Microbes:

e. *Serratia liquefaciens* (ATCC 35551)

| | |
|---|---|
| 95% GAS MIXES IN AIR | |
| 95% CO$_2$ | 47% |
| 95% N$_2$ | 0% |
| 95% Ar | 0% |
| 3 best gas mixes: | |
| 95% Ar:Xe 99:1 | 15% |
| 95% Ar:Xe 99:5 | 18% |
| 90% GAS MIXES IN AIR | |
| 90% CO$_2$ | 2% |
| 90% N$_2$ | 0% |
| 90% Ar | 0% |
| Other best gas mixes | |
| 90% Xo | 14% |
| 50% GAS MIXES IN AIR | |
| 50% CO$_2$ | 0% |
| 50% N$_2$ | 0% |
| 50% Ar | 0% | f. *Escherichia coli* (ATCC 9637)

| | |
|---|---|
| 95% GAS MIXES IN AIR | |
| 95% CO$_2$ | 100% |
| 95% N$_2$ | 62% |
| 95% Ar | 78% |
| 3 best gas mixes: | |
| 95% Ar:Ne 95:5 | 78% |
| 95% Xe | 82% |
| 95% Ar:Kr 95:5 | 78% |
| 90% GAS MIXES IN AIR | |
| 90% CO$_2$ | 100% |
| 90% N$_2$ | 51% |
| 90% Ar | 65% |
| 3 best gas mixes: | |
| 90% Kr | 78% |
| 90% Xe | 78% |
| 90% Ar:Xe 99:1 | 67% |
| 50% GAS MIXES IN AIR | |
| 50% CO$_2$ | 100% |
| 50% N$_2$ | 12% |
| 50% Ar | 15% |
| Other best gas mixes: | |
| 50% Ar:Kr 99:1 | 16% |
| 50% Ar:Xe/Kr 95:5 | 17% | g. *Listeria monocytogenes* (ATCC 984)

| | |
|---|---|
| Best inhibitory gases: | |
| 50% Ar:Ne 99.9:0.1 | 13% |
| 50% Ar:Ne 99:1 | 8% |
| 50% Ar:Ne | 8% | h. *Staphylococcus aureus* (ATCC 25923)

| | |
|---|---|
| 95% GAS MIXES IN AIR | |
| 95% CO$_2$ | 100% |
| 95% N$_2$ | 55% |
| 95% Ar | 61% |
| 3 best gas mixes: | |
| 95% Xe | 61% |
| 95% Kr | 61% |
| 95% Ar:Xe/Kr 99:1 | 61% | i. *Yersinia enterocolitica* (ATCC 23715)

| | |
|---|---|
| Best inhibitory gases: | |
| 50% Ar:Xe/Kr 99.9:0.1 | 16% |
| 50% Ar:Ne 99:1 | 13% |
| 90% Ar:Xe/Kr 95:5 | 10% |
| 90% Ar | 8% |
| 95% Ar:Kr 95:5 | 4% |

All nitrogen mixes show no inhibition.

TABLE 1b

Effect of Gases on Total Microorganisms from Product Trials.

| Aerobes: Gas/Gas Mix: | % | % Inhibition Compared to 100% Air |
|---|---|---|
| 1. CO$_2$ | 100 | 9% |
| 2. Ar | 100 | 0.4% |
| 3. Ar:O$_2$ | 9:1 | 0.1% |

| Anaerobes: Gas/Gas Mix: | % | % Inhibition Compared to 100% CO$_2$ |
|---|---|---|
| 1. Ar | 100 | 16% |
| 2. Ar:Ne | 9:1 | 7% |

| Yeasts: Gas/Gas Mix: | % | % Inhibition Compared to 100% Air |
|---|---|---|
| 1. Co$_2$ | 100 | 4% |
| 2. Ar | 100 | 28% |
| 3. Ar:O$_2$ | 9:1 | 20% |

| Molds: Gas/Gas Mix: | % | % Inhibition Compared to 100% Air |
|---|---|---|
| 1. Co$_2$ | 100 | 2% |
| 2. Ar | 100 | 4% |
| 3. Ar:CO$_2$ | 9:1 | 10% |
| 4. Ar:Kr | 9:1 | 7% |
| 5. [Ar:Ne]:CO$_2$ | [9:1]:9 | 8% |

F. Effect of Gases on Enzymes

Class III. Hydrolases (EC3)

90:10 Xe:Kr mix +18[{]ps

Lipase EC 3.1.1.3

Showed up to −20% inhibition with Argon and noble gases.

Protease (α-Chymotrypsin EC 3.4.21.1)

Showed up to −20 inhibition with Argon and noble gases depending on temperature.

G. Summary:

Generally, Ar may be used to advantage alone or with O$_2$ UP to about 20% or about 10–20% CO$_2$ or about 10–20% N$_2$O 10–20% combined in volume % of CO$_2$ and N$_2$O.

9. Product: Lettuce

A. List of Microorganisms:

Spoilage microorganisms

*Erwinia carotovora*
(bacterial soft rot)

Pseudomonads similar to *Pseudomonas marginalis*
(bacterial soft rot)

*Pseudomonas marginalis* (Brown) Stevens
(side slime)

*Pseudomonas cichorii*
(bacterial zonate spot)

*Botrytis cinerea*
(gray mold rot)

*B. cinerea* Pers. ex Fr.

*Geotrichum candidum*
(sour rot (watery soft rot))

B. List of Enzymes:
 Endogenous enzymes:
 ACC synthase
 prime factor controlling the rate of ethylene biosynthesis Lipoxygenase EC 1.13.11.12
 activity can increase ethylene production Chlorophyllase EC 3.1.1.14

Peroxidase cellulase complex:
  EC 3.2.1.4
  EC 3.2.1.21
 degradation of cellulose Microorganism enzymes:
 Laccase EC 1.10.3.2 (*Botrytis cinerea*)

C. List of Chemical Reactions of Importance:

D. Quality Parameters of Importance:
 Texture
 Appearance

Ascorbic degradation is associated with wilting in green leafy vegetables.

Carotene is a precursor to vitamin A. Carotenes are subject to oxidation and to degradation associated with wilting of leafy vegetables.

Yellowing of leafy vegetables (lettuce) during senescence: loss of chlorophyll.

E.

TABLE I

Effect of Gases on Microbes:

1. Microassays:
 a. *Erwinia carotovora* (ATCC 15713)

95% GAS MIXES IN AIR
    95% $CO_2$           100%
    95% $N_2$             0%
    95% Ar                2%
    3 best gas mixes:
    95% Ar:Ne 95:5       24%
    95% Ar:Kr 99:1       20%
    95% Ar:Ne 99:1       18%
    90% GAS MIXES IN AIR
    90% $CO_2$           100%
    90% $N_2$             0%
    90% Ar                2%

TABLE I-continued

Effect of Gases on Microbes:

3 best gas mixes:
    90% Ar:Xe 99:1       21%
    90% Ar:Kr 99:1       20%
    90% Ar:Ne 99:1       16%
    50% GAS MIXES IN AIR
    50% $CO_2$           100%
    50% $N_2$             0%
    50% Ar                0%
    Other best gas mixes:
    50% Kr               12% b. *Pseudomonas marginalis* (ATCC 10844)

95% GAS MIXES IN AIR
    95% $CO_2$           100%
    95% $N_2$             93%
    95% Ar               100%
    3 best gas mixes:
    95% Ar:Ne 99:1       100%
    95% Ar:Ne 95:5       100%
    95% Ar:Xe/Kr 99.9:0.1 100%
    90% GAS MIXES IN AIR
    90% $CO_2$           100%
    90% $N_2$             81%
    90% Ar               85%
    3 best gas mixes:
    90% Ar:Xe/Kr 99.9:0.1 100%
    90% Ar:Xe 95:5       43%
    90% Ar:Ne 95:5       43%
    50% GAS MIXES IN AIR
    50% $CO_2$           100%
    50% $N_2$             0%
    50% Ar               10%
    3 best gas mixes:
    50% Ar:Kr 99:1       11%
    50% Ar:Ne 95:5        9%
    50% Xe               16%

TABLE 1b

Effect of Gases on Total Microorganisms from Product Trials.

| Gas/Gas Mix | % | % Inhibition Compared to 100% Air |
|---|---|---|
| Aerobes: | | |
| 1. $CO_2$ | 100 | 9% |
| 2. Ar | 100 | 0.4% |
| 3. Ar:$O_2$ | 9:1 | 0.1% |
| Anaerobes: | | |
| 1. Ar | 100 | 16% |
| 2. Ar:Ne | 9:1 | 7% |
| Yeasts: | | |
| 1. $Co_2$ | 100 | 4% |
| 2. Ar | 100 | 28% |
| 3. Ar:$O_2$ | 9:1 | 20% |
| Molds: | | |
| 1. $Co_2$ | 100 | 2% |
| 2. Ar | 100 | 4% |
| 3. Ar:$CO_2$ | 9:1 | 10% |
| 4. Ar:Kr | 9:1 | 7% |
| 5. [Ar:Ne]:$CO_2$ | [9:1]:9 | 8% |

F.

| Effect of Gases on Enzymes: Class I. Oxidoreductase (EC 1) | |
|---|---|
| Gas | Result |
| Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

Class III. Hydrolases (EC3)

Lipase EC 3.1.1.3
Showed up to −20% inhibition with Argon and noble gases.

Protease (α-Chymotrypsin EC 3.4.21.1)
Showed up to −20 inhibition with Argon and noble gases depending on temperature.

Class IV. Lyases(EC4)

Citrate synthase EC 4.1.3.7
Showed maximum inhibition of −27% at 25° C. when measured as a coupled reaction with all gases.

G. Effect of Gases on Chemical Reactions:
For lettuce, oxidations of color components is inhibited and degrative chemical oxidations are also strongly inhibited.
For example:
1. Color: The oxidation of chlorophyll is the primary color change. As the chlorophyll is broken down, the carotenoids are exposed, giving rise to a yellowing of the products. It has been found that noble gases effect oxidation in the order Xe>Kr>Ar>Ne>He in having a positive and unique utility in preventing oxidation even in the presence of oxygen.

Ascorbic acid degradation: maintaining a minimum of 1 to 4% $O_2$ generally slows ascorbic acid degradation by preventing oxidation. It has been found that noble gases effect oxidation in the order Xe>Kr>Ar>Ne>He in having a positive and unique utility in preventing oxidation even in the presence of oxygen.

Elevated $CO_2$ levels accelerate ascorbic acid degradation.

The carotenoids that are most important in imparting color to fruits are derivatives of α- and β-carotenes and lycopene. Due to their unsaturated nature, they are generally susceptible to oxidation. It has been found that noble gases effect oxidation in the order Xe>Kr>Ar>Ne>He in having a positive and unique utility in preventing oxidation even in the presence of oxygen.

Carotenoids are extremely susceptible to nonenzymatic oxidation in dehydrated fruits and vegetables (water acts as a barrier to oxygen diffusion).

It has been found that color can be maintained well beyond the point where the product becomes microbiologically unexceptable.

2. Degrative chemical oxidations:
ACC synthase
prime factor controlling the rate of ethylene biosynthesis Linoxygenase EC 1.13.11.12
activity can increase ethylene production Chlorophyllase EC 3.1.1.14
converts chlorophylls to water-soluble chlorophyllides. Acidic conditions can make the chlorophylls into pheophytin. the pheophytins are brown in color and are normally undesirable in most foods. The loss of green color in green vegetables is an important problem in certain thermal processing operations.

Peroxidase cellulase complex:
 EC 3.2.1.4
 EC 3.2.1.21
degradation of cellulose

Note: See Effect of Gases on Enzymes above for quantification of the inhibitory effect of noble gases on enzymes.

H. Summary:
Generally, a mixture of Ar:Ne of about 80–95:5–20 volume % is preferable, with the mixture of about 90–95:5–10 volume % being more preferable. Most preferable of all is a mixture of about Ar:Ne/95:5.
Additionally, $O_2$ and $CO_2$ may be used in amounts of up to about 5 volume %.
10. Product: Mixed Salad (Chef Salad)
 Lettuce (see above)
 Tomatoes (see above)
 Carrots (see above)
 Cucumbers
 Radishes
 Cheese, Chedder
 Meat; Ham, Turkey (see above)
 Eggs, Boiled
 Red Cabbage A. List of Microorganisms:
 1. Cucumbers
 Spoilage microorganisms
 *Erwinia carotovora*
 (bacterial soft rot)

Pseudomonads similar to *Pseudomonas marginalis*
 (bacterial soft rot)

*Pseudomonas lachrymans*
(angular leaf spot)

*Botrytis cinerea*
(gray mold rot)

*Colleototrichum coccodes*
(anthracnose (spotting))

*Rhizopus stolonifer*
(Rhizopus soft rot)

2. Radishes
Spoilage microorganisms
*Erwinia carotovora*
(bacterial soft rot)

Pseudomonads similar to *Pseudomonas marginalis*
(bacterial soft rot)

*Botrytis cinerea*
(gray mold rot)

*Geotrichum candidum*
(sour rot (watery soft rot))

*Rhizopus stolonifer*
(Rhizopus soft rot)

3. Cheese, Chedder

4. Eggs, Boiled

5. Cabbage, Red
Spoilage microorganisms
*Listeria monocytogenes*

6. Lettuce, tomatoes, and carrots: see above

B. List of Enzymes:
  1. Cucumbers
  Endogenous enzymes
  Polygalacturonase EC 3.2.1.15
    Exopoloygalacturonases EC 3.2.1.67
  De-esterification of cell wall galacturonans followed by polygalacturonase action.

Pectinesterase
  Involoves in the preparation of the substate for polygalacturonases Peroxidase (POD) EC 1.11.1.7
  Stale, off-flavors.

Catalase EC 1.11.1.6
  Adverse flavors.

Lipoxygenase EC 1.13.11.12
  Activity required for the production of aldehydes typical of fresh cucumber flavor.

ACC synthase
  prime factor controlling the rate of ethylene biosynthesis

Lipoxygenase EC 1.13.11.12
  activity can increase ethylene production cellulase complex:
    EC 3.2.1.4
    EC 3.2.1.21
  degradation of cellulose 2. Radishes
  Endogenous enzymes
  ACC synthase
  prime factor controlling the rate of ethylene biosynthesis Lipoxygenase EC 1.13.11.12
  activity can increase ethylene production cellulase complex:
    EC 3.2.1.4
    EC 3.2.1.21
  degradation of cellulose 3. Cheese, Chedder 4. Eggs, Boiled 5. Cabbage, Red
  Endogenous enzymes
  ACC synthase
  prime factor controlling the rate of ethylene biosynthesis Lipoxygenase EC 1.13.11.12
  activity can increase ethylene production cellulase complex:
    EC 3.2.1.4
    EC 3.2.1.21
  degradation of cellulose Microorganism enzymes:
  Laccase EC 1.10.3.2 (*Botrytis cinerea*, cucumbers and radishes)
  Endopolygalacturonase EC 3.2.1.15 (extracellular, *Rhizopus stolonifer*, cucumbers and radishes)

6. Lettuce, tomatoes, and carrots: see above

C. List of Chemical Reactions of Importance:
D. Quality Parameters of Importance:

Leafy vegetables: Lettuce and Red Cabage
  Texture
  Appearance

Ascorbic degradation is associated with wilting in green leafy vegetables.

Carotene is a precursor to vitamin A. Carotenes are subject to oxidation and to degradation associated with wilting of leafy vegetables.

intermediate respiration rates

Carrots

Ethylene induced formation of bitter isocoumarins in carrots.

Cucumbers chilling injury

E.

TABLE I

Effect of Gases on Microbes:

1. Microassays:
    a. *Erwinia carotovora* (ATCC 15713)

| | | |
|---|---|---|
| 95% GAS MIXES IN AIR | | |
| 95% $CO_2$ | 100% | |
| 95% $N_2$ | 0 | |
| 95% Ar | 2 | |
| 3 best gas mixes: | | |
| 95% Ar:Ne 95:5 | 24% | |
| 95% Ar:Kr 99:1 | 20% | |
| 95% Ar:Ne 99:1 | 18% | |
| 90% GAS MIXES IN AIR | | |
| 90% $CO_2$ | 100% | |
| 90% $N_2$ | 0 | |
| 90% Ar | 2 | |
| 3 best gas mixes: | | |
| 90% Ar:Xe 99:1 | 21% | |
| 90% Ar:Kr 99:1 | 20% | |
| 90% Ar:Ne 99:1 | 16% | |
| 50% GAS MIXES IN AIR | | |
| 50% $CO_2$ | 100% | |
| 50% $N_2$ | 0% | |
| 50% Ar | 0% | |
| Other best gas mixes: | | |
| 50% Kr | 12% | | b. *Pseudomonas marginalis* (ATCC 10844)

| | | |
|---|---|---|
| 95% GAS MIXES IN AIR | | |
| 95% $CO_2$ | 100% | |
| 95% $N_2$ | 93% | |
| 95% Ar | 100% | |
| 3 best gas mixes: | | |
| 95% Ar:Ne 99:1 | 100% | |
| 95% Ar:Ne 95:5 | 100% | |
| 95% Ar:Xe/Kr 99.9:0.1 | 100% | |
| 90% GAS MIXES IN AIR | | |
| 90% $CO_2$ | 100% | |
| 90% $N_2$ | 81% | |
| 90% Ar | 85% | |
| 3 best gas mixes: | | |
| 90% Ar:Xe/Kr 99.9:0.1 | 100% | |
| 90% Ar:Xe 95:5 | 43% | |
| 90% Ar:Ne 95:5 | 43% | |
| 50% GAS MIXES IN AIR | | |
| 50% $CO_2$ | 100% | |
| 50% $N_2$ | 0% | |
| 50% Ar | 10% | |
| 3 best gas mixes: | | |
| 50% Ar:Kr 99:1 | 11% | |
| 50% Ar:Ne 95:5 | 9% | |
| 50% Xe | 16% | | c. *Listeria monocytogenes* (ATCC 984)

| | | |
|---|---|---|
| Best inhibitory gases: | | |
| 50% Ar:Ne 99.9:0.1 | 13% | |
| 50% Ar:Ne 99:1 | 8% | |
| 50% Ar:Ne | 8% | |

TABLE 1b

Effect of Gases on Total Microorganisms from Product Trials.

| Aerobes: Gas/Gas Mix: | % | % Inhibition Compared to 100% Air |
|---|---|---|
| 1. $CO_2$ | 100 | 2% |
| 2. Ar | 100 | 12% |
| 3. [Ar:Ne]:$CO_2$ | [9:1]:9 | 13% |

| Anaerobes: Gas/Gas Mix: | % | % Inhibition Compared to 100% $CO_2$ |
|---|---|---|
| 1. Ar | 100 | 6% |
| 2. Ar | 100 | 1% |
| 3. Ar:$O_2$ | 9:1 | 5% |
| 4. Ar:Ne | 9:1 | 2% |

| Yeasts: Gas/Gas Mix: | % | % Inhibition Compared to 100% Air |
|---|---|---|
| 1. $Co_2$ | 100 | 63% |
| 2. Ar | 100 | 47% |
| 3. Ar:Kr | 9:1 | 56% |
| 4. [Ar:Ne]:$CO_2$ | [9:1]:9 | 51% |

| Molds: Gas/Gas Mix: | % | % Inhibition Compared to 100% Air |
|---|---|---|
| 1. $Co_2$ | 100 | 4% |
| 2. Ar | 100 | 2% |

F.

Effect of Gases on Enzymes:
Class I. Oxidoreductase (EC 1)

| Gas | Result |
|---|---|
| Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

Class III. Hydrolases (EC3)

Lipase EC 3.1.1.3

Showed up to −20% inhibition with Argon and noble gases.

Protease (α-Chymotrypsin EC 3.4.21.1)

Showed up to −20 inhibition with Argon and noble gases depending on temperature.

Class IV. Lyases(EC4)

Citrate synthase EC 4.1.3.7
Showed maximum inhibition of −27% at 25° C. when measured as a coupled reaction with all gases.

G. Effect of Gases on Chemical Reactions

For mixed salads (chef salads), oxidation of color components is inhibited and degrative chemical oxidations are also strongly inhibited.

For example:

Lettuce (see above)

Tomatoes (see above)

Carrots (see above)

Cucumbers

For cucumbers, oxidation of color components is inhibited and degrative chemical oxidations are also strongly inhibited.

For example:
1. Color: The oxidation of chlorophyll is the primary color change. As the chlorophyll is broken down, the carotenoids are exposed, giving rise to a yellowing of the products. It has been found that noble gases effect oxidation in the order Xe>Kr>Ar>Ne>He in having a positive and unique utility in preventing oxidation even in the presence of oxygen.

Ascorbic acid degradation: maintaining a minimum of 1 to 4% $O_2$ generally slows ascorbic acid degradation by preventing oxidation. It has been found that noble gases effect oxidation in the order Xe>Kr>Ar>Ne>He in having a positive and unique utility in preventing oxidation even in the presence of oxygen.

Elevated $CO_2$ levels accelerate ascorbic acid degradation.

It has been found that color can bemaintained well beyond the point where the product becomes microbiologically unexceptable.

2. Degrative chemical oxidations:

Polygalacturonase EC 3.2.1.15
 Exopoloygalacturonases EC 3.2.1.67
 De-esterification of cell wall galacturonans followed by polygalacturonase action.

Pectinesterase
Involoves in the preparation of the substate for polygalacturonases Peroxidase (POD) EC 1.11.1.7
Stale, off-flavors.

Catalase EC 1.11.1.6
Adverse flavors.

Lipoxygenase EC 1.13.11.12
Activity required for the production of aldehydes typical of fresh cucumber flavor.

ACC synthase
prime factor controlling the rate of ethylene biosynthesis cellulase complex:
 EC 3.2.1.4
 EC 3.2.1.21
degradation of cellulose Note: See Effect of Gases on Enzymes above for quantification of the inhibitory effect of noble gases on enzymes.

Radishes
For radishes, oxidation of color components is inhibited and degrative chemical oxidations are also strongly inhibited.

For example:
1. Color: The primary color changes are the oxidation of anthocyanins from purplish-red to off-white and the oxidation of flavanoids from bright red to brown. It has been found that noble gases effect oxidation of both the anthocyanins and flavanoids in the order Xe>Kr>Ar>Ne>He in having a positive and unique utility in preventing oxidation even in the presence of oxygen.

It has been found that color can be maintained well beyond the point where the product becomes microbiologically unacceptable.

2. Degrative chemical oxidations:

ACC synthase
prime factor controlling the rate of ethylene biosynthesis

Lipoxygenase EC 1.13.11.12
activity can increase ethylene production cellulose complex:
 EC 3.2.1.4
 EC 3.2.1.21
degradation of cellulose Note: See Effect of Gases on Enzymes above for quantification of the inhibitory effect of noble gases on enzymes.

2. Degrative chemical oxidations:

Note: See Effect of Gases on Enzymes above for quantification of the inhibitory effect of noble gases on enzymes.

Ham, Turkey (see above)

Eggs, Boiled
1. Color: For hard boiled eggs, oxidation of color components is inhibited and degrative chemical oxidations are also strongly inhibited.

It has been found that color can be maintained well beyond the point where the product becomes microbiologically unexceptable.

2. Degrative chemical oxidations:

Note: See Effect of Gases on Enzymes above for quantification of the inhibitory effect of noble gases on enzymes.

Red Cabbage

For red cabbage, oxidation of color components is inhibited and degrative chemical oxidations are also strongly inhibited.

For example:
1. Color: The primary color changes are the oxidation of anthocyanins from purplish-red to off-white and the oxidation of flavanoids from bright red to brown. It has been found that noble gases effect oxidation of both the anthocyanins and flavanoids in the order Xe>Kr>Ar>Ne>He in having a positive and unique utility in preventing oxidation even in the presence of oxygen.

It has been found that color can be maintained well beyond the point where the product becomes microbiologically unexceptable.

2. Degrative chemical oxidations:
ACC synthase
prime factor controlling the rate of ethylene biosynthesis Lipoxygenase EC 1.13.11.12
activity can increase ethylene production cellulase complex:
EC 3.2.1.4
EC 3.2.1.21
degradation of cellulose Note: See Effect of Gases on Enzymes above for quantification of the inhibitory effect of noble gases on enzymes.

H. Summary:
Generally, mixtures of Ar:Kr:$O_2$ or Ar:Ne:$CO_2$ work well in relative amounts of about (8–9.5:2–0.5):5–10% each. More preferably, however, relative amounts of about (9:1):9% are used.

11. Product: Mushrooms
A. List of Microorganisms:
*Clostridium botulinum*
B. List of Enzymes:
Endogenous enzymes Polyphenol oxidase (PPO) EC 1.14.18.1

ACC synthase prime factor controlling the rate of ethylene biosynthesis

Lipoxygenase EC 1.13.11.12 activity can increase ethylene production enzymatic browning reaction:
Tyrosinase EC 1.14.18.1
initiates browning reaction
Catechol oxidase EC 1.10.3.2

Laccase EC 1.10.3.1

C. List of Chemical Reactions of Importance:

$$\text{phenolic compounds} \xrightarrow{\text{air}} \text{brown melanins}$$

D. Quality Parameters of Importance:

Enzymatic browning:
Tyrosinase
Catechol oxidase

Storage in 0% $O_2$ inhibits catechol oxidase activity and browning.

Enzymatic Browning: Tyrosinase then Catechol oxidase

E. Table I. Effect of Gases on Microbes:

As for other vegetables.

F.

Effect of Gases on Enzymes: Class I. Oxdoseductase (EC 1)

| Gas | Result |
|---|---|
| Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

G. Effect of Gases on Chemical Reactions:

For mushrooms, oxidation of color components is inhibited and degrative chemical oxidations are also strongly inhibited.

For example:

1. Color: the color changes in mushrooms is due to the oxidation of phenolic compounds to brown melanins. It has been found that noble gases effect oxidation in the order Xe>Kr>Ar>Ne>He in having a positive and unique utility in preventing oxidation even in the presence of oxygen.

$$\text{phenolic compounds} \xrightarrow{\text{air}} \text{brown melanins}$$

It has been found that color can be maintained well beyond the point where the product becomes microbiologically unexceptable.

2. Degrative chemical oxidations:

Enzymatic browning:

Tyrosinase

Catechol oxidase

Storage in 0% $O_2$ inhibits catechol oxidase activity and browning.

Note: See Effect of Gases on Enzymes above for quantification of the inhibitory effect of noble gases on enzymes.

G. Table III. Effect of Gases on Chemical Reactions:

H. Summary:

Generally, fundamental improvements in color in mushrooms are observed with gas mixtures of about 3–97 volume % of Ar and about 17–3 volume % of any one of Ne, Kr, Xe or any combination thereof.

More preferably, however, it is desirable to use about 5–90 volume % of Ar and about 90–5 volume % of any one of Ne, Kr, Xe or any combination thereof.

12. Product: Pasta

A. List of Microorganisms:

Molds and yeasts.

B. List of Enzymes:

Generally not important.

C. List of Chemical Reactions of Importance:

Simple oxidations.

D. Quality Parameters of Importance:

Softness (moist)
Color retention

E. Table I. Effect of Gases on Microbes:

Yeasts and molds are effectively depressed by all the noble gases with respect to nitrogen or air. CO2 may be superior, but imparts color degradation and off-flavors to the pasta.

F. Table II. Effect of Gases on Enzymes:

No negative effect of noble gases.

G. Effect of Gases on Chemical Reactions:
Noble gases enhance moisture retention in the pasta.

H. Summary:
Generally, mixtures contining about 80–95 volume % of Ar and about 5–20 volume % of Xe or Kr may be used. It is preferred, however, to use about 85–93 volume % of Ar and about 7–15 volume % of Xe or Kr. It is more preferred still to use about 90 volume % of Ar and about 10 volume % of Xe or Kr.
It is also advantageous to use mixtures containing about 70–85 volume % Ar, 3–12 volume % of kr or Ne and about 10–20 volume % of $O_2$ with the total being 100 volume %. It is more preferred, however, to use a mixture containing about 75–80 volume % of Ar, 7–10 volume % of Kr or ne and about 13–17 volumen % of $O_2$.
It is most preferred, however, to use a mixture containing about 77 volume % Ar, 8 volume % of Kr or Ne and 15 volume % of $O_2$.

13. Product: Shrimp

A. List of Microorganisms:
Spoilage microorganisms
Acinetobacter
(predominant)

Aspergillus
(known to occur)

Candida
(most frequently found)

*Clostridium botulinum*

Cryptococcus
(known to occur)

Debaryomyces
(known to occur)

Hansenula
(known to occur)

Moraxella
(predominant)

Oospora
(known to occur)

Pichia
(known to occur)

Pullularia
(known to occur)

Pseudomonads
(predominant)

Penicillium
(known to occur)

Rhodotorula
(most frequently found)

Scopulariopsis
(known to occur)

Sporobolomyces
(known to occur)

Torula
(most frequently found)

Torulopsis
(known to occur)

Trichosporon
(known to occur)

Wallemia (Sporendonema)
(known to occur)

Yeast spp.
(predominant)

SHRIMP HELD AT 0° C.:

Spoilage microorganisms
Pseudomonas spp. (dominant spoilers (after 13 days), with only 2% of the spoilage flora being Gram+ in contrast to 38% for the fresh product)
Aeromonas spp.
Vibrio spp.

SHRIMP HELD AT 5.6 AND 11.1° C.:

Spoilage microorganisms
Moraxella
(dominate spoilage)

SHRIMP HELD AT 16.7 AND 22.2° C.:

Spoilage microorganisms
Proteus
(dominate spoilage)

B. List of Enzymes:
Endogenous enzymes
Phenoloxidase EC 1.10.3.1 in fresh white shrimps. Catalyzes the oxidation of 3,4-dihydroxyphenylalanine (phenolic substrate). The discoloration on shrimp commonly called melanosis or blackspot is not appealing to consumers and reduces its market value ($pH_{opt}$ 6.5–7.5, $T_{opt}$=45° C.).

Alkaline proteinase (endopeptidase) in shrimp muscle ($pH_{opt}$ 8.0, $T_{opt}$=60° C.).
Exopeptidase
in shrimp muscle ($pH_{opt}$ 6.8, $T_{opt}$=40° C.).

Enzymic dephosphorylation of inosine monophosphate (IMP)
via inosine to hypoxanthine (Hx) occurs within the period of edibility of shrimp muscle stored in ice. These changes are involved in the loss of desirable fresh flavors (IMP) and the development of bitter off-flavor. The dephosphorylation of IMP is predominantly autolytic. The accumulation of Hx results from both autolytic and bacterial enzymes.

Phenol oxidase

Microorganism enzymes:
Glucoamylase EC 3.2.1.3 (extracellular, *Aspergillus niger*)
α-Galactosidase EC 3.2.1.22 (*A. oryzae*/extracellular, *Aspergillus niger*)
Lipase EC 3.1.1.3 (*Candida paralipolytica*)
Lipase EC 3.1.1.3 (Pseudomonas spp., Shrimp held at 0° C.)
Lipase EC 3.1.1.3 (*Aspergillus niger*)

C. List of Chemical Reactions of Importance:

D. Quality Parameters of Importance:
Melanosis or black spot

E.

TABLE I

Effect of Gases on Microbes:

1. Microassays
   a. *Acinetobacter calcoaceticus* (ATCC 23055)

| 95% GAS MIXES IN AIR | |
| --- | --- |
| 95% $CO_2$ | 100% |
| 95% $N_2$ | 88% |
| 95% Ar | 93% |
| 3 best gas mixes: | |
| 95% Xe | 94% |
| 95% Ar:Kr 50:50 | 100% |
| 95% Ar:Xe 99:1 | 93% |
| 90% GAS MIXES IN AIR | |
| 90% $CO_2$ | 100% |
| 90% $N_2$ | 84% |
| 90% Ar | 93% |
| Other best gas mixes: | |
| 90% Ar:Ne 50:50 | 90% |
| 50% GAS MIXES IN AIR | |
| 50% $CO_2$ | 90% |
| 50% $N_2$ | 80% |
| 50% Ar | 88% |
| Other best gas mixes: | |
| 50% Ar:Xe 50:50 | 90% |
| 50% Ar:Xe 95:5 | 90% | b. *Aspergillus niger* (ATCC 16888)

| 95% GAS MIXES IN AIR | |
| --- | --- |
| 95% $CO_2$ | 100% |
| 95% $N_2$ | 64% |
| 95% Ar | 64% |
| 3 best gas mixes: | |
| 95% Xe | 94% |
| 95% Ar:Kr 99.9:0.1 | 76% |
| 95% Ar:Ne 99.9:0.1 | 76% |
| 90% GAS MIXES IN AIR | |
| 90% $CO_2$ | 100% |
| 90% $N_2$ | 52% |
| 90% Ar | 64% |
| 3 best gas mixes: | |
| 90% Xe | 94% |
| 90% Ar:Kr 95:5 | 81% |
| 90% Ar:Xe/Kr 99.9:0.1 | 70% |
| 50% GAS MIXES IN AIR | |
| 50% $CO_2$ | 100% |
| 50% $N_2$ | 42% |
| 50% Ar | 49% |
| 3 best gas mixes: | |
| 50% Ar:Xe/Kr 99.9:0.1 | 52% |
| 50% Ar:Kr 95:5 | 52% |
| 50% Ar:Ne 99:1 | 52% | c. *Penicillium italicum* (ATCC 48114)

| 95% GAS MIXES IN AIR | |
| --- | --- |
| 95% $CO_2$ | 100% |
| 95% $N_2$ | 74% |
| 95% Ar | 80% |
| 3 best gas mixes: | |
| 95% Ar:Ne 99.9:0.1 | 89% |
| most other noble gas mixtures | 84% |
| 90% GAS MIXES IN AIR | |
| 90% $CO_2$ | 100% |
| 90% $N_2$ | 70% |
| 90% Ar | 78% |
| 3 best gas mixes: | |
| 90% Xe/Kr | 83% |
| 90% Ar:Xe 99:1 | 83% |
| 90% Ar:Kr 99.9:0.1 | 83% |
| 50% GAS MIXES IN AIR | |
| 50% $CO_2$ | 92% |
| 50% $N_2$ | 50% |
| 50% Ar | 55% |

TABLE I-continued

Effect of Gases on Microbes:

3 best gas mixes:

| | |
|---|---|
| 50% Ar:Kr 99.9:0.1 | 59% |
| 50% Ar:Xe/Kr 95:5 | 59% |
| Kr and Ar + Xe mixes | 50% | d. *Pseudomonas marginalis* (ATCC 10844)

| | |
|---|---|
| 95% GAS MIXES IN AIR | |
| 95% $CO_2$ | 100% |
| 95% $N_2$ | 93% |
| 95% Ar | 100% |
| 3 best gas mixes: | |
| 95% Ar:Ne 99:1 | 100% |
| 95% Ar:Ne 95:5 | 100% |
| 95% Ar:Xe/Kr 99.9:0.1 | 100% |
| 90% GAS MIXES IN AIR | |
| 90% $CO_2$ | 100% |
| 90% $N_2$ | 81% |
| 90% Ar | 85% |
| Other best gas mixes: | |
| 90% Ar:Xe/Kr 99.9:0.1 | 100% |
| 90% Ar:Xe 95:5 | 43% |
| 90% Ar:Ne 95:5 | 43% |
| 50% GAS MIXES IN AIR | |
| 50% $CO_2$ | 100% |
| 50% $N_2$ | 0% |
| 50% Ar | 10% |
| 3 best gas mixes: | |
| 50% Ar:Kr 99:1 | 11% |
| 50% Ar:Ne 95:5 | 9% |
| 50% Xe | 16% |

TABLE 1b

Effect of Gases on Total Microorganisms from Product Trials.

| Aerobes:<br>Gas/Gas Mix: | % | % Inhibition<br>Compared to<br>100% Air |
|---|---|---|
| 1. $CO_2$ | 100 | 4% |
| 2. Ar | 100 | 1% |
| 3. Ar:Kr | 9:1 | 2% |

| Anaerobes:<br>Gas/Gas Mix: | % | % Inhibition<br>Compared to<br>100% $CO_2$ |
|---|---|---|
| 1. Air | 100 | 6% |
| 2. Ar | 100 | 4% |
| 3. Ar:Kr | 9:1 | 9% |

| Yeasts:<br>Gas/Gas Mix: | % | % Inhibition<br>Compared to<br>100% Air |
|---|---|---|
| 1. $Co_2$ | 100 | 8% |
| 2. Ar | 100 | 2% |
| 3. [Ar:Ne]:$CO_2$ | 9:1 | 1% |

| Molds:<br>Gas/Gas Mix: | % | % Inhibition<br>Compared to<br>100% Air |
|---|---|---|
| 1. $Co_2$ | 100 | 2% |
| 2. Ar | 100 | 5% |

F.

TABLE II

Effect of Gases on Enzymes:
Class I. Oxidoreductase (EC 1)

| Gas | Result |
|---|---|
| Tyrosinase EC 1.14.18.1<br>at 25° and optimal reaction<br>conditions, simple saturation of<br>solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

G. Effect of Gases on Chemical Reactions

For shrimp, oxidation of color components is inhibited and degrative chemical oxidations are also strongly inhibited.

For example:

1. Color: The carotenoids that are most important in imparting color are derivatives of α- and β-carotenes and lycopene. Due to their unsaturated nature, they are generally susceptible to oxidation. It has been found that noble gases effect oxidation in the order Xe>Kr>Ar>Ne>He in having a positive and unique utility in preventing oxidation even in the presence of oxygen.

It has been found that color can be maintained well beyond the point where the product becomes microbiologically unexceptable.

2. Degrative chemical oxidations:

Phenoloxidase EC 1.10.3.1 in fresh white shrimps. Catalyzes the oxidation of 3,4-dihydroxyphenylalanine (phenolic substrate). The discoloration on shrimp commonly called melanosis or blackspot is not appealing to consumers and reduces its market value ($pH_{opt}$ 6.5–7.5, $T_{opt}$=45° C.).

Alkaline proteinase (endopeptidase)

in shrimp muscle ($pH_{opt}$ 8.0, $T_{opt}$=60° C.).

Exopeptidase in shrimp muscle ($pH_{opt}$ 6.8, $T_{opt}$=40° C.).

Enzymic dephosphorylation of inosine monophosphate (IMP)

via inosine to hypoxanthine (Hx) occurs within the period of edibility of shrimp muscle stored in ice. These changes are involved in the loss of desirable fresh flavors (IMP) and the development of bitter off-flavor. The dephosphorylation of IMP is predominantly autolytic. The accumulation of Hx results from both autolytic and bacterial enzymes.

Phenol oxidase

Note: See Effect of Gases on Enzymes above for quantification of the inhibitory effect of noble gases on enzymes.

H. Summary:

Therefore, for cleaned, colored shrimp or other seafood pure argon or a; mixture of about 8–95:2–0.5 Ar:Kr, Xe or Ne works quite well. It is more preferred, however, if relative amounts of about 9:1 Ar:Kr, Xe or Ne is used.

Additionally, up to about 20% $CO_2$ may be used in the mixture.

14. Product: Smelt

A. List of Microorganisms:
I. FISH:
Spoilage microorganisms
Acinetobacter

Aeromonas
(known to occur)

*Aeromonas hydrophila*

Alcaligenes
(known to occur)

Alteromonas
(32–60% of the initial skin flora of 4 different fish)

*Alteromonas putrefaciens*

Aspergillus
(known to occur)

Chromobacterium
(known to occur)

Corynebacterium
(known to occur)

Cytophaga
(known to occur)

Enterobacter
(known to occur)

Escherichia

Flavobacterium
(known to occur)

Halobacterium
(known to occur)

Microbacterium
(known to occur)

Micrococcus

Moraxella

Penicillium
(known to occur)

Photobacterium
(known to occur)

Pseudomonas spp.
(32–60% of the initial skin flora of 4 different fish)

*Pseudomonas marinoglutinosa*

*Pseudomonas aeruginosa*

Streptococcus
(known to occur)

Oospora
(known to occur)

Scopulariopsis
(known to occur)

Vibrio
(known to occur)

Wallemia (Sporendonema)
(known to occur)

Candida
(most frequently found)

Cryptococcus
(known to occur)

Debaryomyces
(known to occur)

Hansenula
(known to occur)

Pichia
(known to occur)

Pullularia
(known to occur)

Rhodotorula
(most frequently found)

Sporobolomyces
(known to occur)

Torula
(most frequently found)

Torulopsis
(known to occur)

Trichosporon
(known to occur)

FRESH ICED FISH:

Spoilage microorganisms
Acinetobacter

Alteromonas

*Alteromonas putrefaciens* (=*Pseudomonas putrefaciens*)
(important fish spoilage organism)

Moraxella

Pseudomonas spp.

*Pseudomonas fragi*

CHILL STORED ROCK COD FILLETS IN 80% $CO_2$/20% AIR ATMOSPHERE:

Spoilage microorganisms
Lactobacillus
(71–87% of flora after 21 days, plus some tan-colored pseudomonads)

COD MUSCLE:

Spoilage microorganisms
Pseudomonas sp.

*Pseudomonas fluorescens*

*Pseudomonas fragi*

*Pseudomonas putida*

*Pseudomonas putrefaciens*

HADDOCK:

Spoilage microorganisms
Pseudomonas spp. of Shewan's Group II and III/IV
(particularly active in the spoilage process)

CHILL STORED HADDOCK:

Spoilage microorganisms
*Pseudomonas putrefaciens*

HERRING FILLETS IN AIR:

Spoilage microorganisms
*Alteromonas putrefaciens*
(62–95% of the flora after spoilage)

Pseudomonads
(62–95% of the flora after spoilage)

CHILL STORED HERRING FILLETS IN 100% $CO_2$ ATMOSPHERE:

Spoilage microorganisms
Lactobacillus
[almost 100% of spoilage bacterial flora]

CHILL STORED PACIFIC HAKE:

Spoilage microorganisms
Acinetobacter
(Highest % of the initial flora. Not isolated after 14 days)

Moraxella
(Highest % of the initial flora. Not isolated after 14 days)

Pseudomonas spp. of Shewan's Group II
(dominant types of all bacteria after 14 days)

ENGLISH SOLE AT 5° C.:

Spoilage microorganisms
Aeromonas spp.
(among the most active spoilers)

Pseudomonas spp. of Shewan's Group I and III/IV
(among the most active spoilers)

Vibrio spp.
(among the most active spoilers)

B. List of Enzymes:
Endogenous enzymes
Phospholipase (hydrolase)
  in fish muscle (much of the study of fish muscle lipolysis has been with lean fish in which the primary lipid constituent is phopholipid). Lipolysis occurs extensively in fish muscle post-mortem and is associated with quality deterioration in the frozen tissue. Major cause of quality deterioration.

Lipases EC 3.1.1.3
in fish muscle.

metmyoglobin reductase

Lipoxygenase EC 1.13.11.12 in fish tissues. Fish tissues, which are rich in n-3 polyunsaturated fatty acids, are very susceptible to lipid oxidation. Once lipid oxidation is initiated, very low concentrations of aldehydes with n-3 double bonds cause distinctive oxidative off-flavors. Involved in the initiation of oxidation in fish skin tissue-extracts containing high heme concentrations. Catalyzes the formation of hydroperoxides in Emerald shiner and Rainbow trout. Because of the abundance of long-chain polyunsaturated fatty acids in fish, enzyme-initiated hydroperoxidation can be significant in relation to the flavor quality of fish at a later date. Thus, early control of oxidative enzymes in fish should suppress reactions which promote the development of undesirable, autoxidatively-derived volatile carbonyls later during subsequent processing and storage.

Microsomal Lipid Peroxidation Enzyme System in fish muscle. The fish muscle microsomal fraction is very active at relatively low temperatures and even has significant activity in the frozen state. The exact role of this enzyme system in fish quality is still not fully understood. Since the microsomal lipid peroxidation enzyme system is active at temperatures below the freezing point of fish tissue, it is possible that enzymatic lipid peroxidation activates phospholipase A2 to initiate phosphololipids hydrolysis. In frozen fish muscle, increased level of lipid peroxidation correlates with an increasing level of phospholipids hydrolysis. It is possible that an endogenous lipid peroxidizing capacity may play a fundamental role in turnover and metabolism of membrane lipids.

Myleoperoxidase-like enzyme
in fish leukocytes. Capable of initiating lipid oxidation along with concurrent carotenoid degradation when $H_2O_2$ and halide salts are present.

Proteinases
Cathepsin D EC 3.4.23.5
Neutral proteinase
Cathepsin B EC 3.4.22.1
Alkaline proteinase
in fish skeletal muscle. Involved in the breakdown of tissue proteins. Affect quality. Implicated in the textural degradation of minced fish meat.

β-Glucuronidase EC 3.2.1.31
in fish skeletal muscle (lysosomal and microsomal localization). Involved in the hydrolysis of glucose-galactose moieties present in collagen and the mucopolysaccharide-protein complexes of the connective tissue matrix. Also implicated in the cleavage of glucuronidic disaccharide linkages of the protein polysaccharide complex occuring in the connective tissue. Autolytic process leading to early spoilage.

Glycolysis Pathway System
Production of energy, accumulation of lactic acid. The source of most post-mortem energy under anaerobic conditions is glygogen breakdown through glycolysis.

Creatine kinase EC 2.7.3.2
Involved in the regeneration of ATP. Accounts for 13–20% of total sarcoplasmic proteins in fish muscle.

Myofibrillar and sarcoplasmic ATPases
Catalyzes the breakdown of ATP in fish muscle. Onset of rigor-mortis: ATP and creatine phosphate breakdown and lactic acid accumulation in fish muscle.

COD MUSCLE:

Endogenous enzymes
Phospholipase (Hydrolase)
Most of the hydrolysis in cod is autolytic, not bacterial, in nature. Extensive: 75% of cod phospholipid is hydrolyzed in the first month of frozen storage at −7° C. Lipid hydrolysis has been almost exclusively attributed to phospholipid hydrolysis.

Lipoxygenase EC 1.13.11.12
Trans-2, cis-4-heptadienal, cis-4-heptenal, and hexenal increase with the time and temperature of storage. These correspond to the possible oxidation products of n-3 unsaturated fatty acids released primarily from the phospholipids of frozeir stored cod.

Microorganism enzymes:
Glycosidases (β-D-Glucosidase EC 3.2.1.21, β-D-Galactosidase EC 3.2.1.23)
Proteases
Fish myosin is the most effective in supporting growth and enzyme secretion by *Aeromonas hydrophila*.

Protease
Substantial degradation of fish actomyosin even at refrigerated temperatures.
*Pseudomonas fluorescens*
Endo Pectate Lyase EC 4.2.2.3 (extracellular)
Lipase EC 3.1.1.3 (extracellular)
Glycosidases (β-D-Glucosidase EC 3.2.1.21, β-D-Galactosidase EC 3.2.1.23)
Lipase EC 3.1.1.3 (*Aspergillus niger*)
Lipase EC 3.1.1.3 (*Candida paralipolytica*)
Lipase EC 3.1.1.3 (Pseudomonas spp.)
Lipase EC 3.1.1.3 (Pseudomonas sp.)
Glucoamylase EC 3.2.1.3 (extracellular)
α-Galactosidase EC 3.2.1.22 (*A. oryzae*/extracellular)

Proteolytic enzymes (extracellular, *Pseudomonas fragi*)

C. List of Chemical Reactions of Importance:
oxidation

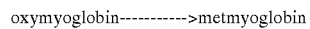
oxymyoglobin----------->metmyoglobin

D. Quality Parameters of Importance:
Bright red color: oxymyoglobin
Brown color: metmyoglobin
Reduction of metmyoglobin to myoglobin: succinic dehydrogenase, metmyoglobin reductase
Greening of tuna (only when cooked):
TMAO trimethylamine oxide+heat-denatured metmyoglobin
E.

TABLE I

Effect of Gases on Microbes:

1. Microassays
   a. *Acinetobacter calcoaceticus* (ATCC 23055)

| | |
|---|---|
| 95% GAS MIXES IN AIR | |
| 95% CO₂ | 100% |
| 95% N₂ | 88% |
| 95% Ar | 93% |
| 3 best gas mixes: | |
| 95% Xe | 94% |
| 95% Ar:Kr 50:50 | 100% |
| 95% Ar:Xe 99:1 | 93% |
| 90% GAS MIXES IN AIR | |
| 90% CO₂ | 100% |
| 90% N₂ | 84% |
| 90% Ar | 93% |
| Other best gas mixes: | |
| 90% Ar:Ne 50:50 | 90% |
| 50% GAS MIXES IN AIR | |
| 50% CO₂ | 90% |
| 50% N₂ | 80% |
| 50% Ar | 88% |
| Other best gas mixes: | |
| 50% Ar:Xe 50:50 | 90% |
| 50% Ar:Xe 95:5 | 90% | b. *Alteromonas putrefaciens* (ATCC 8071)

All O₂ mixes (95%, 90%, and 50%) and all CO₂ mixes (95%, 90%, 50%) give 100% inhibition.

| | |
|---|---|
| 95% GAS MIXES IN AIR | |
| 95% CO₂ | 100% |
| 95% N₂ | 100% |
| 95% Ar | 100% |
| Other best gas mixes: | |
| 95% Ne | 49% |
| 95% Xe | 100% |
| 90% GAS MIXES IN AIR | |
| 90% CO₂ | 100% |
| 90% Ar | 63% |
| Other best gas mixes: | |
| 90% Kr | 61% |
| 90% Xe/Kr | 62% |
| 50% GAS MIXES IN AIR | |
| 50% CO₂ | 100% |

50% N₂ and 50% Ar: for all the 50% mixes in air (except for O₂ and CO₂), slower growth than in air but reaches the same plateau.

TABLE I-continued

Effect of Gases on Microbes:

c. *Aspergillus niger* (ATCC 16888)

| | |
|---|---|
| 95% GAS MIXES IN AIR | |
| 95% CO$_2$ | 100% |
| 95% N$_2$ | 64% |
| 95% Ar | 64% |
| 3 best gas mixes: | |
| 95% Xe | 94% |
| 95% Ar:Kr 99.9:0.1 | 76% |
| 95% Ar:Ne 99.9:0.1 | 76% |
| 90% GAS MIXES IN AIR | |
| 90% CO$_2$ | 100% |
| 90% N$_2$ | 52% |
| 90% Ar | 64% |
| 3 best gas mixes: | |
| 90% Xe | 94% |
| 90% Ar:Kr 95:5 | 81% |
| 90% Ar:Xe/Kr 99.9:0.1 | 70% |
| 50% GAS MIXES IN AIR | |
| 50% CO$_2$ | 100% |
| 50% N$_2$ | 42% |
| 3 best gas mixes: | |
| 50% Ar:Xe/Kr 99.9:0.1 | 52% |
| 50% Ar:Kr 95:5 | 52% |
| 50% Ar:Ne 99:1 | 52% | d. *Penicillium italicum* (ATCC 48114)

| | |
|---|---|
| 95% GAS MIXES IN AIR | |
| 95% CO$_2$ | 100% |
| 95% N$_2$ | 74% |
| 95% Ar | 80% |
| 3 best gas mixes: | |
| 95% Ar:Ne 99.9:0.1 | 89% |
| most other noble gas mixtures | 84% |
| 90% GAS MIXES IN AIR | |
| 90% CO$_2$ | 100% |
| 90% N$_2$ | 70% |
| 90% Ar | 78% |
| 3 best gas mixes: | |
| 90% Xe/Kr | 83% |
| 90% Ar:Xe 99:1 | 83% |
| 90% Ar:Kr 99.9:0.1 | 83% |
| 50% GAS MIXES IN AIR | |
| 50% CO$_2$ | 92% |
| 50% N$_2$ | 50% |
| 50% Ar | 55% |
| 3 best gas mixes: | |
| 50% Ar:Kr 99.9:0.1 | 59% |
| 50% Ar:Xe/Kr 95:5 | 59% |
| Kr and Ar + Xe mixes | 50% | e. *Pseudomonas marginalis* (ATCC 10844)

| | |
|---|---|
| 95% GAS MIXES IN AIR | |
| 95% CO$_2$ | 100% |
| 95% N$_2$ | 93% |
| 95% Ar | 100% |
| 3 best gas mixes: | |
| 95% Ar:Ne 99:1 | 100% |
| 95% Ar:Ne 95:5 | 100% |
| 95% Ar:Xe/Kr 99.9:0.1 | 100% |
| 90% GAS MIXES IN AIR | |
| 90% CO$_2$ | 100% |
| 90% N$_2$ | 81% |
| 90% Ar | 85% |
| 3 best gas mixes: | |
| (90% Ar:Xe/Kr 99.9:0.1 | 100%) |
| 90% Ar:Xe 95:5 | 43% |
| 90% Ar:Ne 95:5 | 43% |
| 50% GAS MIXES IN AIR | |
| 50% CO$_2$ | 100% |
| 50% N$_2$ | 0% |
| 50% Ar | 10% |
| 3 best gas mixes: | |
| 50% Ar:Kr 99:1 | 11% |
| 50% Ar:Ne 95:5 | 9% |
| 50% Xe | 16% | f. *Serratia liquefaciens* (ATCC 35551)

| | |
|---|---|
| 95% GAS MIXES IN AIR | |
| 95% CO$_2$ | 47% |
| 95% N$_2$ | 0% |
| 95% Ar | 0% |
| Other best gas mixes: | |
| 95% Ar:Xe 99:1 | 15% |
| 95% Ar:Xe 99:5 | 18% |
| 90% GAS MIXES IN AIR | |
| 90% CO$_2$ | 2% |
| 90% N$_2$ | 0% |
| 90% Ar | 0% |
| Other best gas mixes: | |
| 90% Xe | 14% |
| 50% GAS MIXES IN AIR | |
| 50% CO$_2$ | 0% |
| 50% N$_2$ | 0% |
| 50% Ar | 0% | g. *Escherichia coli* (ATCC 9637)

| | |
|---|---|
| 95% GAS MIXES IN AIR | |
| 95% CO$_2$ | 100% |
| 95% N$_2$ | 62% |
| 95% Ar | 78% |
| 3 best gas mixes: | |
| 95% Ar:Ne 95:5 | 78% |
| 95% Xe | 82% |
| 95% Ar:Kr 95:5 | 78% |
| 90% GAS MIXES IN AIR | |
| 90% CO$_2$ | 100% |
| 90% N$_2$ | 51% |
| 90% Ar | 65% |
| 3 best gas mixes: | |
| 90% Kr | 78% |
| 90% Xe | 78% |
| 90% Ar:Xe 99:1 | 67% |
| 50% GAS MIXES IN AIR | |
| 50% CO$_2$ | 100% |
| 50% N$_2$ | 12% |
| 50% Ar | 15% |
| Other best gas mixes: | |
| 50% Ar:Kr 99:1 | 16% |
| 50% Ar:Xe/Kr 95:5 | 17% |

TABLE 1b

Effect of Gases on Total Microorganisms from Product Trials.

| Aerobes: Gas/Gas Mix: | % | % Inhibition Compared to 100% Air |
|---|---|---|
| 1. Ar:CO$_2$ | 9:1 | 4% |
| 2. Ar:Kr | 9:1 | 2% |

| Anaerobes: Gas/Gas Mix: | % | % Inhibition Compared to 100% CO$_2$ |
|---|---|---|
| 1. Air | 100 | 4% |
| 2. Ar | 100 | 30% |
| 3. Ar:Ne | 9:1 | 12% |
| 4. [Ar:Ne]CO$_2$ | [9:1]:9 | 11% |

| Yeasts: Gas/Gas Mix: | % | % Inhibition Compared to 100% Air |
|---|---|---|
| 1. Co$_2$ | 100 | 0.8% |
| 2. Ar | 100 | 17% |
| 3. Ar:CO$_2$ | 9:1 | 21% |

TABLE 1b-continued

Effect of Gases on Total Microorganisms from Product Trials.

| Molds: Gas/Gas Mix: | % | % Inhibition Compared to 100% Air |
|---|---|---|
| 1. Co$_2$ | 100 | 29% |
| 2. Ar | 100 | 22% |
| 3. Ar:Ne | 9:1 | 29% |

F.

TABLE II

Effect of Gases on Enzymes:
Class I. Oxidoreductase (EC 1)

| Gas | Result |
|---|---|
| Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

Class III. Hydrolases (EC3)

Lipase EC 3.1.1.3
Showed up to −20% inhibition with Argon and noble gases.

Protease (α-Chymotrypsin EC 3.4.21.1)
Showed up to +20 inhibition with Argon and noble gases depending on temperature.

G. Effect of Gases on Chemical Reactions

For smelt, oxidation of color components is inhibited and degrative chemical oxidations are also strongly inhibited.
For example:
1. Color:
Bright red color: oxymyoglobin
Brown color: metmyoglobin
Greening of tuna (only when cooked):
TMAO trimethylamine oxide+heat-denatured metmyoglobin Oxymyoglobin 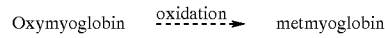 metmyoglobin It has been found that noble gases effect oxidation in the order Xe>Kr>Ar>Ne>He in having a positive and unique utility in preventing oxidation even in the presence of oxygen.

It has been found that color can bemaintained well beyond the point where the product becomes microbiologically unexceptable.

2. Degrative chemical oxidation:
Phospholipase (hydrolase)
in fish muscle (much of the study of fish muscle lipolysis has been with lean fish in which the primary lipid constituent is phopholipid). Lipolysis occurs extensively in fish muscle post-mortem and is associated with quality deterioration in the frozen tissue. Major cause of quality deterioration.

Lipases EC 3.1.1.3
in fish muscle.

metmyoglobin reductase succinic dehydrogenase metmyoglobin reductase

Lipoxygenase EC 1.13.11.12
in fish tissues. Fish tissues, which are rich in n-3 polyunsaturated fatty acids, are very susceptible to lipid oxidation.

Proteinases
Cathepsin D EC 3.4.23.5
Neutral proteinase
Cathepsin B EC 3.4.22.1
Alkaline proteinase
in fish skeletal muscle. Involved in the breakdown of tissue proteins. Affect quality. Implicated in the textural degradation of minced fish meat.

Glycolysis Pathway System
Production of energy, accumulation of lactic acid. The source of most post-mortem energy under anaerobic conditions is glygogen breakdown through glycolysis.

Note: See Effect of Gases on Enzymes above for quantification of the inhibitory effect of noble gases on enzymes.

H. Summary:
Generally, Ar may be used alone or mixtures of about 5–70 volume % with the remainder being any noble gas and about 0.5–15% volume O$_2$.
It is more preferred, however, if about 10–50 volume % of Ar is used with the remainder being any noble gas and about 1–10% volume O$_2$.
Also, up to about 20 volume % of CO$_2$ and N$_2$O may be present, based on the total volume.

15. Product: Steaks

A. List of Microorganisms:

MEATS:
Spoilage microorganisms
Achromobacter

Flavobacterium

Micrococcus

Bacillus

Proteus

Moraxella

Acineobacter

Enterobacetiaceae

Candida

Lactobacilli dominate

*Clostridium perfringens*

Leuconostoc

*Pseudomonas fragi* (Pork)

*Staphylococcus aureus*

*Aeromonas hydrophila*

*Yersinia enterocolitica*

*Escherichia coli*

*Listeria monocytogenes*

FRESH MEATS:

Spoilage microorganisms
Acinetobacter

Aeromonas

Moraxella

Pseudomonas spp.

PROCESSED MEATS:

Spoilage microorganisms
Lactobacillus

Streptococcus

Aspergillus

Penicillium

CURED MEATS:

Spoilage microorganisms
Aspergillus

Penicillium

VACUUM-PACKAGED MEATS:

Spoilage microorganisms
Lactobacillus

*Yersinia enterocolitica*

B. List of Enzymes:
Microorganism enzymes:
Lipase EC 3.1.1.3 (*Candida paralipolytica*)
Lipase EC 3.1.1.3 (Pseudomonas spp.)
Lipase EC 3.1.1.3 (*Aspergillus niger*)
Glucoamylase EC 3.2.1.3 (extracellular, *Aspergillus niger*)
α-Galactosidase EC 3.2.1.22 (*A. oryzae*/extracellular)
Proteolytic enzymes (extracellular)
Considerable proteolysis evident after 20 days.
Maximum bacterial count reached on day 6. Growth and spoilage by *Ps. fragi* occurs on the surface, and only at late stages do the effects of spoilage penetrate the entire meat sample.
protease (CAF; calcium activated factor)
Cathepsinis (Lysosomal enzymes)

C.

TABLE I

Effect of Gases on Microbes:

1. Microassays
   a. *Acinetobacter calcoaceticus* (ATCC 23055)

| | |
      |---|---|
      | 95% GAS MIXES IN AIR | |
      | 95% $CO_2$ | 100% |
      | 95% $N_2$ | 88% |
      | 95% Ar | 93% |
      | 3 best gas mixes: | |
      | 95% Xe | 94% |
      | 95% Ar:Kr 50:50 | 100% |
      | 95% Ar:Xe 99:1 | 93% |
      | 90% GAS MIXES IN AIR | |
      | 90% $CO_2$ | 100% |
      | 90% $N_2$ | 84% |
      | 90% Ar | 93% |
      | Other best gas mixes: | |
      | 90% Ar:Ne 50:50 | 90% |
      | 50% GAS MIXES IN AIR | |
      | 50% $CO_2$ | 90% |
      | 50% $N_2$ | 80% |
      | 50% Ar | 88% |
      | Other best gas mixes: | |
      | 50% Ar:Xe 50:50 | 90% |
      | 50% Ar:Xe 95:5 | 90% | b. *Aspergillus niger* (ATCC 16888)

| | |
      |---|---|
      | 95% GAS MIXES IN AIR | |
      | 95% $CO_2$ | 100% |
      | 95% $N_2$ | 64% |
      | 95% Ar | 64% |
      | 3 best gas mixes: | |
      | 95% Xe | 94% |
      | 95% Ar:Kr 99.9:0.1 | 76% |
      | 95% Ar:Ne 99.9:0.1 | 76% |
      | 90% GAS MIXES IN AIR | |
      | 90% $CO_2$ | 100% |
      | 90% $N_2$ | 52% |
      | 90% Ar | 64% |
      | 3 best gas mixes: | |
      | 90% Xe | 94% |
      | 90% Ar:Kr 95:5 | 81% |
      | 50% GAS MIXES IN AIR | |
      | 50% $CO_2$ | 100% |
      | 50% $N_2$ | 42% |
      | 3 best gas mixes: | |
      | 50% Ar:Xe/Kr 99.9:0.1 | 52% |
      | 50% Ar:Kr 95:5 | 52% |
      | 50% Ar:Ne 99:1 | 52% | c. *Pencillium italicum* (ATCC 48114)

| | |
      |---|---|
      | 95% GAS MIXES IN AIR | |
      | 95% $CO_2$ | 100% |
      | 95% $N_2$ | 74% |
      | 95% Ar | 80% |
      | 3 best gas mixes: | |
      | 95% Ar:Ne 99.9:0.1 | 89% |
      | most other noble gas mixtures | 84% |
      | 90% GAS MIXES IN AIR | |
      | 90% $CO_2$ | 100% |

TABLE I-continued

Effect of Gases on Microbes:

|  |  |
|---|---|
| 90% N₂ | 70% |
| 90% Ar | 78% |
| 3 best gas mixes: |  |
| 90% Xe/Kr | 83% |
| 90% Ar:Xe 99:1 | 83% |
| 90% Ar:Kr 99.9:0.1 | 83% |
| 50% GAS MIXES IN AIR |  |
| 50% CO₂ | 92% |
| 50% N₂ | 50% |
| 50% Ar | 55% |
| 3 best gas mixes: |  |
| 50% Ar:Kr 99.9:0.1 | 59% |
| 50% Ar:Xe/Kr 95:5 | 59% |
| Kr and Ar + Xe mixes | 50% | d. *Pseudomonas marginalis* (ATCC 10844)

|  |  |
|---|---|
| 95% GAS MIXES IN AIR |  |
| 95% CO₂ | 100% |
| 95% N₂ | 93% |
| 95% Ar | 100% |
| 3 best gas mixes: |  |
| 95% Ar:Ne 99:1 | 100% |
| 95% Ar:Ne 95:5 | 100% |
| 95% Ar:Xe/Kr 99.9:0.1 | 100% |
| 90% GAS MIXES IN AIR |  |
| 90% CO₂ | 100% |
| 90% N₂ | 81% |
| 90% Ar | 85% |
| 3 best gas mixes: |  |
| 90% Ar:Xe/Kr 99.9:0.1 | 100% |
| 90% Ar:Xe 95:5 | 43% |
| 90% Ar:Ne 95:5 | 43% |
| 50% GAS MIXES IN AIR |  |
| 50% CO₂ | 100% |
| 50% N₂ | 0% |
| 50% Ar | 10% |
| 3 best gas mixes: |  |
| 50% Ar:Kr 99:1 | 11% |
| 50% Ar:Ne 95:5 | 9% |
| 50% Xe | 16% | e. *Serratia liquefaciens* (ATCC 35551)

|  |  |
|---|---|
| 95% GAS MIXES IN AIR |  |
| 95% CO₂ | 47% |
| 95% N₂ | 0% |
| 95% Ar | 0% |
| Other best gas mixes: |  |
| 95% Ar:Xe 99:1 | 15% |
| 95% Ar:Xe 99:5 | 18% |
| 90% GAS MIXES IN AIR |  |
| 90% CO₂ | 2% |
| 90% N₂ | 0% |
| 90% Ar | 0% |
| Other best gas mixes: |  |
| 90% Xe | 14% |
| 50% GAS MIXES IN AIR |  |
| 50% CO₂ | 0% |
| 50% N₂ | 0% |
| 50% Ar | 0% | f. *Escherichia coli* (ATCC 9637)

|  |  |
|---|---|
| 95% GAS MIXES IN AIR |  |
| 95% CO₂ | 100% |
| 95%.N₂ | 62% |
| 95% Ar | 78% |
| 3 best gas mixes: |  |
| 95% Ar:Ne 95:5 | 78% |
| 95% Xe | 82% |
| 95% Ar:Kr 95:5 | 78% |
| 90% GAS MIXES IN AIR |  |
| 90% CO₂ | 100% |
| 90% N₂ | 51% |
| 90% Ar | 65% |
| 3 best gas mixes: |  |
| 90% Kr | 78% |
| 90% Xe | 78% |
| 90% Ar:Xe 99:1 | 67% |
| 50% GAS MIXES IN AIR |  |
| 50% CO₂ | 100% |
| 50% N₂ | 12% |
| 50% Ar | 15% |
| Other best gas mixes: |  |
| 50% Ar:Kr 99:1 | 16% |
| 50% Ar:Xe/Kr 95:5 | 17% | g. *Listeria monocytogenes* (ATCC 984)

|  |  |
|---|---|
| Best inhibitory gases: |  |
| 50% Ar:Ne 99.9:0.1 | 13% |
| 50% Ar:Ne 99:1 | 8% |
| 50% Ar:Ne | 8% | h. *Staphylococcus aureus* (ATCC 25923)

|  |  |
|---|---|
| 95% GAS MIXES IN AIR |  |
| 95% CO₂ | 100% |
| 95% N₂ | 55% |
| 95% Ar | 61% |
| 3 best gas mixes: |  |
| 95% Xe | 61% |
| 95% Kr | 61% |
| 95% Ar:Xe/Kr 99:1 | 61% | i. *Yersinia enterocolitica* (ATCC 23715)

|  |  |
|---|---|
| Best inhibitory gases: |  |
| 50% Ar:Xe/Kr 99.9:0.1 | 16% |
| 50% Ar:Ne 99:1 | 13% |
| 90% Ar:Xe/Kr 95:5 | 10% |
| 90% Ar | 8% |
| 95% Ar:Kr 95:5 | 4% |

All nitrogen mixes showed no inhibition.

TABLE 1b

Effect of Gases on Total Microorganisms from Product Trials.

| Aerobes: Gas/Gas Mix: | % | % Inhibition Compared to 100% Air: |
|---|---|---|
| 1. Co₂ | 100 | 21% |
| 2. Ar | 100 | 13% |
| 3. Ar:CO₂ | 9:1 | 15% |
| 4. Ar:Kr | 9:1 | 11% |

| Anaerobes: Gas/Gas Mix: | % | % Inhibition Compared to 100% CO₂: |
|---|---|---|
| 1. Air | 100 | 28% |
| 2. Ar | 100 | 6% |
| 3. Ar:CO₂ | 9:1 | 4% |
| 4. Ar:Kr | 9:1 | 14% |

| Yeasts: Gas/Gas Mix: | % | % Inhibition Compared to 100% Air: |
|---|---|---|
| 1. Co₂ | 100 | 15% |
| 2. Ar | 100 | 16% |
| 3. Ar:O₂ | 9:1 | 3% |
| 4. Ar:Ne | 9:1 | 7% |

| Molds: Gas/Gas Mix: | % | % Inhibition Compared to 100% Air: |
|---|---|---|
| 1. Co₂ | 100 | 17% |
| 2. Ar | 100 | 27% |
| 3. (Ar:Kr):CO₂ | [9:1]:9 | 17% |
| 4. Ar:Ne | 9:1 | 18% |

F. Effect of Gases on Enzymes:

Class III. Hydrolases (EC3)

Lipase EC 3.1.1.3
Showed up to –20% inhibition with Argon and noble gases.

Protease (α-Chymotrypsin EC 3.4.21.1)
Showed up to –20 inhibition with Argon and noble gases depending on temperature.

G. Generally, mixtures of Ar:Ne or Kr in amounts of 80–99.9% to 0.1 to 20 volume % are quite acceptable. It is preferable, however, to use relative amounts of about 9:1 of Ar:Ne or Kr. Up to about 5% of $O_2$ or $CO_2$ are present.

1. Degrative chemical reactions:

succinic dehydrogenase & metmyoglobin reductase
Reduction of metmyoglobin to myoglobin:

Lipase EC 3.1.1.3 (*Candida paralipolytica*, Pseudomonas spp., extracellular *Aspergillus niger*)

Glucoamylase EC 3.2.1.3 (extracellular, *Aspergillus niger*)
α-Galactosidase EC 3.2.1.22 (*A. oryzae*/ extracellular)

Proteolytic enzymes (extracellular)
Considerable proteolysis evident after 20 days. Maximum bacterial count reached on day 6. Growth and spoilage by *Ps. fragi* occurs on the surface, and only at late stages do the effects of spoilage penetrate the entire meat sample.

protease (CAF; calcium activated factor)

Cathepsins (Lysosomal enzymes)

It has been found that color can be maintained well beyond the point where the product becomes microbiologically unexceptable.

H. Summary:
Generally, mixtures of Ar:Ne or Kr in amounts of about 80–99.9 to 0.1 to 20 volume % are quite acceptable. It is preferable, however, to use relative amounts of about. 9:1 of Ar:Ne or Kr.

16. Product: Strawberries

A. List of Microorganisms:
Spoilage microorganisms
*Botrytis cinerea* Pers. ex Fr. (gray mold rot)

*Rhizopus stolonifer* (Ehr. ex Fr.) Vuill. (Rhizopus rot)

*Mucor piriformis*

B. List of Enzymes:
Endogenous enzymes
D-Galacturonase EC 3.2.1.15(fruit softening)

Polyphenol oxidase EC 1.14.18.1
In berries, loss of desirable pigmentation (anthocyanidins).

Peroxidases EC 1.11.1.7
Decolorizing anthocyanins

Polyphenol oxidase (PPO) EC 1.14.18.1
Decolorizing anthocyanins

Anthocyanase
Decolorizing anthocyanins

ACC synthase
prime factor controlling the rate of ethylene biosynthesis

Lipoxygenase EC 1.13.11.12
activity can increase ethylene production cellulase complex:
EC 3.2.1.4
EC 3.2.1.21
degradation of cellulose β-Galactosidase
Loss of galactose from cell walls during ripening.

Microorganism enzymes:

Endopolygalacturonase EC 3.2.1.15 (extracellular, *Rhizopus stolonifer*)
Laccase EC 1.10.3.2 (*Botrytis cinerea* Pers. ex Fr.)

C. List of Chemical Reactions of Importance:
Degradation of anthocyanins in the presence of other phenolic compounds.

D. Quality Parameters of Importance:
Certain varities of apples contain water-soluble flavonoid pigments.

pH is the most important factor affecting the stability of anthocyanins.

E.

TABLE I

Effect of Gases on Microbes:
Table 1b. Effect of Gases on Total Microorganisms from Product Trials.

| Aerobes:<br>Gas/Gas Mix: | % | % Inhibition<br>Compared to<br>100% Air: |
|---|---|---|
| 1. $Co_2$ | 100 | 48% |
| 2. Ar | 100 | 40% |
| 3. (Ar:Kr):$CO_2$ | (9:1):9 | 40% |

| Anaerobes:<br>Gas/Gas Mix: | % | % Inhibition<br>Compared to<br>100% $CO_2$: |
|---|---|---|
| 1. Ar:$CO_2$ | 9:1 | 17% |
| 2. (Ar:Kr):$O_2$ | [9:1]:9 | 49% |

TABLE I-continued

Effect of Gases on Microbes:
Table 1b. Effect of Gases on Total Microorganisms from Product Trials.

| Yeasts:<br>Gas/Gas Mix: | % | % Inhibition<br>Compared to<br>100% Air: |
|---|---|---|
| 1. $CO_2$ | 100 | 32% |
| 2. Ar | 100 | 12% |
| 3. (Ar:Ne):$CO_2$ | (9:1):9 | 53% |
| 4. Ar:Kr | 9:1 | 23% |

| Molds:<br>Gas/Gas Mix: | % | % Inhibition<br>Compared to<br>100% Air: |
|---|---|---|
| 1. $CO_2$ | 100 | 100% |
| 2. Ar | 100 | 80% |

F.

Effect of Gases on Enzymes:

| Gas | Result |
|---|---|
| Class I. Oxidoreductase (EC 1) | |
| Tyrosinase EC 1.14.18.1 | |
| at 25° and optimal reaction | |
| conditions, simple saturation of | |
| solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

Lipase EC 3.1.1.3
Showed up to −20% inhibition with Argon and noble gases.
Protease (α-Chymotrypsin EC 3.4.21.1)
Showed up to −20 inhibition with Argon and noble gases depending on temperature.

Class IV. Lyases(EC4)

Citrate synthase EC 4.1.3.7
Showed maximum inhibition of −27% at 25° C. when measured as a coupled reaction with all gases.

G. Effect of Gases on Chemical Reactions
For strawberries, oxidation of color components is inhibited and degrative chemical oxidations are also strongly inhibited.
For example:
1. Color: The primary color changes are the oxidation of anthocyanins from purplish-red to off-white and the oxidation of flavanoids from bright red to brown. It has been found that noble gases effect oxidation of both the anthocyanins and flavanoids in the order Xe>Kr>Ar>Ne>He in having a positive and unique utility in preventing oxidation even in the presence of oxygen.

It has been found that color can be maintained well beyond the point where the product becomes microbiologically unexceptable.

2. Degrative chemical oxidations:
D-Galacturonase EC 3.2.1.15
(fruit softening)

Polyphenol oxidase EC 1.14.18.1
In berries, loss of desirable pigmentation (anthocyanidins).

Peroxidases EC 1.11.1.7
Decolorizing anthocyanins

Polyphenol oxidase (PPO) EC 1.14.18.1
Decolorizing anthocyanins

Anthocyanase
Decolorizing anthocyanins

ACC synthase
prime factor controlling the rate of ethylene biosynthesis

Lipoxygenase EC 1.13.11.12
activity can increase ethylene production cellulase complex:
EC 3.2.1.4
EC 3.2.1.21
degradation of cellulose β-Galactosidase
Loss of galactose from cell walls during ripening.

Note: See Effect of Gases on Enzymes above for quantification of the inhibitory effect of noble gases on enzymes.

H. Summary:
Generally, mixtures of Ar:Kr or Ne in relative amounts of about (80–95:5–20) with about 5–12% $CO_2$ are quite advantageous. It is more preferable, however, to use relative amounts of Ar:Kr or Ne of about 9:1 with about 8–10%, more preferably 9% $CO_2$.

17. Product: Tomatoes

A. List of Microorganisms:
Spoilage microorganisms
*Erwinia carotovora*
(bacterial soft rot)

*Erwinia carotovora* (Jones) Holland

Pseudomonads similar to *Pseudomonas marginalis*
(bacterial soft rot)

*Pseudomonas tomato*
(bacterial speck)

*Xanthomonas vesicatoria*
(bacterial spot)

*Alternaria tenuis* Auct.
(Alternaria rot)

*Alternaria alteria*

*Botrytis cinerea*
(gray mold rot)

*B. cinerea* Pers. ex Fr.

*Colleototrichum coccodes*
(anthracnose (spotting))

Fusarium

*Geotrichum candidum*
(sour rot (watery soft rot))

*G. candidum* Link ex Pers.

Phytophora spp.
(Phytophora rot (blight+rot))

*Rhizopus stolonifer*
(Rhizopus soft rot]0.3.2 (*Botrytis cinerea*))

*R. stolonifer* (Ehr. ex Fr.) Vuill.

B. List of Enzymes:
 Endogenous enzymes
 Cytokinin nucleosidases
 in ripe tomato fruit. This enzyme system has a role in the metabolism of cytokinins in tomatoes. It may function to regulate the pool of active cytokinins (which govern growth, ripening and senescence processes).

ACC synthase
Prime factor controlling the rate of ethylene biosynthesis

Lipoxygenase EC 1.13.11.12
Activity can increase ethylene production.
Involved in flavor biogenesis.
Oxidation by lipoxygenase can bleach carotenoids. Increase volatiles during maturation.

Polygalacturonases EC 3.2.1.15 (PG I and PG II)
in ripe tomatoes. Hydrolysis of glycosidic linkages in protopectin during ripening. Solubilization of uronic acid from pectinesterase-free tomato cell walls. PG II is about twice as effective as PG I in solubilizing cell walls. Polygalacturonase cleaves pectate randomly first to oligogalacturonates and ultimately to galacturonic acid, but the rate of hydrolysis decreases rapidly with decreasing chain length.
Endopolygalacturonase EC
Major role in ripe red tomatoes.

Pectinesterase EC 3.1.1.11
De-esterification of pectin: acts at both the reducing ends and interior loci on highly esterified pectin chains. Pectinesterase action must precede degradation of pectin by polygalacturonase, and in this way PE could exert regulation on the process of fruit softening. Tomatoes are a particularly rich source of the enzyme. The activity is high in green tomatoes and increases about 4-fold during ripening.

Cellulase EC 3.2.1.4
Degrades carboxymethylcellulose. Cellulase may be involved not only in tomato softening but also in cell enlargement during fruit development.
cellulase complex:
 EC 3.2.1.4
 EC 3.2.1.21
degradation of cellulose Peroxidases EC 1.11.1.7
Peroxidase activities increase steadily throughout fruit development. The physiological function of peroxidase in fruit ripening processes seems to be auxin degradation.

Ethylene as a plant hormone has been known to trigger a variety of ripening processes such as the stimulation of polygalacturonase activity in tomatoes.

Microorganism enzyme:
Endopolygalacturonase EC 3.2.1.15 (extracellular, *Rhizopus stolonifer*)
Laccase EC 1.1

β-Galactosidase
Loss of galactose from cell walls during ripening.

C. List of Chemical Reactions of Importance:
 Carotenoid degradation during processing and storage:

unsaturated nature ===>susceptible to isomerization and oxidation.

D. Quality Parameters of Importance:
 lycopene

Lipoxygenase increases the volatiles during maturation of the fruit.

E.

TABLE I

Effect of Gases on Microbes:

1. Microassays
   a. *Alternaria alternata* (ATCC 13963)

| 95% GAS MIXES IN AIR | |
      |---|---|
      | 95% $CO_2$ | 100% |
      | 95% $N_2$ | 44% |
      | 95% Ar | 50% |
      | Other best gas mixes: | |
      | 95% Ne | 50% |
      | 90% GAS MIXES IN AIR | |
      | 90% $CO_2$ | 100% |
      | 90% $N_2$ | 15% |
      | 90% Ar | 23% |
      | Other best gas mixes: | |
      | 90% Ar:Xe 95:5 | 24% | b. *Erwinia carotovora* (ATCC 15713)

| 95% GAS MIXES IN AIR | |
      |---|---|
      | 95% $CO_2$ | 100% |
      | 95% $N_2$ | 0% |
      | 95% Ar | 2% |
      | 3 best gas mixes: | |
      | 95% Ar:Ne 95:5 | 24% |
      | 95% Ar:Kr 99:1 | 20% |
      | 95% Ar:Ne 99:1 | 18% |

TABLE I-continued

Effect of Gases on Microbes:

| | | |
|---|---|---|
| 90% GAS MIXES IN AIR | | |
| 90% $CO_2$ | | 100% |
| 90% $N_2$ | | 0% |
| 90% Ar | | 2% |
| 3 best gas mixes: | | |
| 90% Ar:Xe 99:1 | | 21% |
| 90% Ar:Kr 99:1 | | 20% |
| 90% Ar:Ne 99:1 | | 16% |
| 50% GAS MIXES IN AIR | | |
| 50% $CO_2$ | | 100% |
| 50% $N_2$ | | 0% |
| 50% Ar | | 0% |
| Other best gas mixes: | | |
| 50% Kr | | 12% |
| c. *Pseudomonas marginalis* (ATCC 10844) | | |
| 95% GAS MIXES IN AIR | | |
| 95% $CO_2$ | | 100% |
| 95% $N_2$ | | 93% |
| 95% Ar | | 100% |
| 3 best gas mixes: | | |
| 95% Ar:Ne 99:1 | | 100% |
| 95% Ar:Ne 95:5 | | 100% |
| 95% Ar:Xe/Kr 99.9:0.1 | | 100% |
| 90% GAS MIXES IN AIR | | |
| 90% $CO_2$ | | 100% |
| 90% $N_2$ | | 81% |
| 90% Ar | | 85% |
| 3 best gas mixes: | | |
| 90% Ar:Xe/Kr 99.9:0.1 | | 100% |
| 90% Ar:Xe 95:5 | | 43% |
| 90% Ar:Ne 95:5 | | 43% |
| 50% GAS MIXES IN AIR | | |
| 50% $CO_2$ | | 100% |
| 50% $N_2$ | | 0% |
| 50% Ar | | 10% |
| 3 best gas mixes: | | |
| 50% Ar:Kr 99:1 | | 11% |
| 50% Ar:Ne 95:5 | | 9% |
| 50% Xe | | 16% |

TABLE 1b

Effect of Gases on Total Microorganisms from Product Trials.

| Aerobes: Gas/Gas Mix: | % | % Inhibition Compared to 100% Air: |
|---|---|---|
| 1. $CO_2$ | 100 | 92% |
| 2. Ar | 100 | 96% |

| Anaerobes: Gas/Gas Mix: | % | % Inhibition Compared to 100% $CO_2$: |
|---|---|---|
| 1. Air | 100 | 34% |
| 2. Ar | 100 | 22% |
| 3. [Ar:Ne]:$CO_2$ | [9:1]:9 | 35% |

| Yeasts: Gas/Gas Mix: | % | % Inhibition Compared to 100% Air: |
|---|---|---|
| 1. $CO_2$ | 100 | 80% |
| 2. Ar | 100 | 38% |
| 3. (Ar:Kr):$CO_2$ | [9:1]:9 | 56% |

| Molds: Gas/Gas Mix: | % | % Inhibition Compared to 100% Air: |
|---|---|---|
| 1. $CO_2$ | 100 | 62% |
| 2. Ar | 100 | 51% |

TABLE 1b-continued

Effect of Gases on Total Microorganisms from Product Trials.

| | | |
|---|---|---|
| 3. Ar:Kr | 9:1 | 56% |
| 4. Ar:Ne | 9:1 | 55% |
| 5. (Ar:Ne):$CO_2$ | [9:1]:9 | 72% |

F.

Effect of Gases on Enzymes:

| Gas | Result |
|---|---|
| Class I. Oxidoreductase (EC 1) Tyrosinase EC 1.14.18.1 at 25° and optimal reaction conditions, simple saturation of solution with gas: | |
| Xe | −73% (inhibition) |
| Kr | −73% |
| Ar | −60% |
| Ne | −46.7% |
| 90:10 Xe:Kr | −50% |
| Ar:Xe 99:1 | −70% |
| Glucose oxidase EC 1.1.3.4 | |
| Xe | −91.6% (inhibition) |
| Kr | −92.7% |
| Ar | −85.8% |
| Ne | −61.7% |

Class III. Hydrolases (EC3)

Lipase EC 3.1.1.3

Showed up to −20% inhibition with Argon and noble gases.

Protease (α-Chymotrypsin EC 3.4.21.1)

Showed up to −20 inhibition with Argon and noble gases depending on temperature.

Class IV. Lyases(EC4)

Citrate synthase EC 4.1.3.7

Showed maximum inhibition of −27% at 25° C. when measured as a coupled reaction with all gases.

G. Effect of Gases on Chemical Reactions

For tomatoes, oxidation of color components is inhibited and degrative chemical oxidations are also strongly inhibited.

For example:

1. Color: The carotenoids that are most important in imparting color to fruits are derivatives of α- and β-carotenes and lycopene. Due to their unsaturated nature, they are generally susceptible to oxidation. It has been found that noble gases effect oxidation in the order Xe>Kr>Ar>Ne>He in having a positive and unique utility in preventing oxidation even in the presence of oxygen.

Carotenoids are extremely susceptible to nonenzymatic oxidation in dehydrated fruits and vegetables (water acts as a barrier to oxygen diffusion).

It has been found that color can be maintained well beyond the point where the product becomes microbiologically unexceptable.

2. Degrative chemical oxidations:

Cytokinin nucleosidases
   in ripe tomato fruit. This enzyme system has a role in the metabolism of cytokinins in tomatoes. It may function to regulate the pool of active cytokinins (which govern growth, ripening and senescence processes).

ACC synthase
Prime factor controlling the rate of ethylene biosynthesis

Lipoxypenase EC 1.13.11.12
Activity can increase ethylene production.
Involved in flavor biogenesis.
Oxidation by lipoxygenase can bleach carotenoids.
Increase volatiles during maturation.

Polygalacturonases EC 3.2.1.15 (PG I and PG II)
   in ripe tomatoes. Hydrolysis of glycosidic linkages in protopectin during ripening. Solubilization of uronic acid from pectinesterase-free tomato cell walls. PG II is about twice as effective as PG I in solubilizing cell walls. Polygalacturonase cleaves pectate randomly first to oligogalacturonates and ultimately to galacturonic acid, but the rate of hydrolysis decreases rapidly with decreasing chain length.
Endopolyaalacturonase EC
Major role in ripe red tomatoes.

Pectinesterase EC 3.1.1.11
De-esterification of pectin: acts at both the reducing ends and interior loci on highly esterified pectin chains. Pectinesterase action must precede degradation of pectin by polygalacturonase, and in this way PE could exert regulation on the process of fruit softening. Tomatoes are a particularly rich source of the enzyme. The activity is high in green tomatoes and increases about 4-fold during ripening.

Cellulase EC 3.2.1.4
Degrades carboxymethylcellulose. Cellulase may be involved not only in tomato softening but also in cell enlargement during fruit development.
cellulase complex:
   EC 3.2.1.4
   EC 3.2.1.21
degradation of cellulose Peroxidases EC 1.11.1.7
Peroxidase activities increase steadily throughout fruit development. The physiological function of peroxidase in fruit ripening processes seems to be auxin degradation.

Note: See Effect of Gases on Enzymes above for quantification of the inhibitory effect of noble gases on enzymes.

Additionally, the experiment as described above was conducted to demonstrate the effect of different gases used in gas packaging on various foods. The results are described below.

EXPERIMENT

Diverse foods, such as apples, bananas, carrots, tomatoes, green beans, strawberries, steak and fish were subjected to gas packaging using various gases.

The bases used are described in Table A herein below, while the results of treatment after 1 seek are described in Tables B and C herein below.

TABLE A

GAS PACKAGING EXPERIMENT ON DIVERSE COMMODITIES

| TREATMENTS | |
|---|---|
| I | 100% $N_2$ |
| II | 100% AR |
| III | 95% AR + 5% XE |
| IV | 90% Ar + 5% XE + 5% $O_2$ |
| V | 100% XE |
| VI | 95% AR + 5% KR |
| VII | 90% AR + 5% KR + 5% $O_2$ |
| VIII | 100% KR |
| IX | 100% AIR |

TABLE B

|  | I | II | III | IV | V | VI | VII | VIII | IX |
|---|---|---|---|---|---|---|---|---|---|
| APPLES | 1 9 | 1 9 | 1 8 | 1 8 | 1 8 | 1 9 | 1 9 | 1 9 | 1 8 |
| BANANAS | 5 8 9 | 5 8 | 5 8 | 5 8 9 | 5 8 10 | 5 8 * | 5 8 10 | 8 9 | 8 9 |
| CARROTS | 9 11 | 9 | 6 9 11 | 6 9 | 6 9 11 | 6 9 11 | 9 | 6 9 | 9 |
| TOMATOES GREEN BEANS | 1 6 8 | 1 4 6 | 1 24 68 | 1 2 | 1 4 8 10 | 4 2 6 8 | 1 1 6 | 4 6 8 | 1 1 |
| STRAWBERRIES | 6 11 | 1 | 6 | 1 | 6 | 6 | 6 | 6 | 6 |
| STEAK | 6 8 | 6 8 | 6 8 | 6 8 | 6 8 | 6 8 | 6 8 | 6 8 | 6 6 |
| FISH | 4 6 | 6 | 6 | 5 | 4 6 | 5 6 9 | 6 | 6 | 5 6 |

KEY =
1. NO CHANGE
2. MOLD GROWTH
3. SOFTNESS
4. BACTERIAL GROWTH
5. SPLITTING
6. MOISTURE (JUICE PRODUCTION)
7. SHRIVELING
8. BROWNING
9. DRYING
10. ROTTING
11. POUCH EXPANDED
* BANANA SPLIT DURING THE PACKAGING

TABLE C

| | TREATMENT WITH LESS DETERIORATION AFTER 1 WEEK | TREATMENT WITH MOST DETERIORATION AFTER 1 WEEK |
|---|---|---|
| APPLES | V - BROWNED AND DRIED SLOWEST; NO GROWTH OBSERVED | I - SOME ROTTING OBSERVED |
| BANANAS | VII- STILL SOME YELLOW AND MINIMAL AMOUNT OF JUICE SECRETED | 1 - SKINNED BLACKENED AND SOFTENED EARLIEST |
| CARROTS | VII- LEAST AMOUNT OF DRYING | VIII - VERY MOLDY AFTER ONE WEEK |
| TOMATOES | VII - LEAST AMOUNT OF MOLD ONE CORE AFTER ONE WEEK; NO JUICE SECRETED | V - MOST AMOUNT OF MOLD ON CORE; PEEL WAS CRACKING AND SECRETED A LOT OF JUICE |
| GREEN BEANS | VII - STAYED GREENEST THE LONGEST | IV - VERY MOLDY AFTER ONE WEEK |
| STRAW-BERRIES | II - RETAINED ITS JUICE DURING OBSERVATIONS | VII - SOME MOLD OBSERVED AFTER ONE WEEK |
| STEAK | IX - BROWNED AND DRIED THE SLOWEST | V - MOST MOLD OBSERVED AFTER ONE WEEK |
| FISH | VII - LEAST MOLD AND ROTTING OBSERVED. RETAINED MOST OF ITS JUICE | VIII - MOST MOLD AND ROTTING OBSERVED |

Thus, the present invention provides a variety of advantageous methods.

Generally, any of the methods of the present invention may utilize a noble gas, mixture of noble gases or mixture containing at least one noble gas also containing one or more other gases, such as nitrogen, oxygen, air, carbon dioxide, nitrous oxide or carbon monoxide or any condition thereof.

Further, the present invention specifically contemplates the use of offstream gas mixtures, such as about 90:10 (Kr/Xe).

Also, the present invention also specifically contemplates the use of mixtures of deoxygenated air, i.e., having generally less than about 15% by volume, preferably less than about 10% by volume, of air and at least one noble gas in an amount sufficient to offset the oxidizing effect of the oxygen therein.

Generally, the present gases and gas mixtures exhibit an improved food shelf-life at ambient, refrigeration, freezing or cooking temperatures, such as from about −190° C. to about 260° C.

Moreover, the present gases and gas mixtures are advantageously used to increase the shelf-life of fresh horticultural commodities, such as fruits and vegetables or fresh poultry such as chicken, and related products, such as eggs. Additionally, the present invention may be used to advantage to increase the shelf-life of baked and par-baked bakery products, such as bread and doughs, and even of flavorings, spices, and fragrances, including extracts, leaf and ground spices.

Furthermore, the present invention may be used to advantage in enhancing the shelf-life in storage of fermented food products, such as cheese, yoghurts and yeasts and of dairy products, such as milk, cheese and butter.

The present gases and gas mixtures are also advantageously used in increasing the shelf-life of processed and ready-to-eat foods, such as pizza, potato chips, pretzels, nuts and other so-called snack foods.

Moreover, the effects of the present invention may be used to increase shelf-life of any food, regardless of whether the atmosphere is added during and/or after cooking.

Moreover, the effect of the present invention may be obtained in conjunction with vacuum packaging with the atmosphere added thereafter.

The present gases or gas mixtures are demonstrated to increase shelf-life of these products when processed under high pressure of these atmospheres and then stabilized at 1 atm.

The present gases or gas mixtures are effective when the noble gas or mixture of gases is dissolved in liquid before, during or after processing.

The present gases or gas mixtures are effective when the noble gas or mixture is added as a liquid, especially as during a freezing under liquefied gas.

The present gases or gas mixtures act to control the activity of enzymes important in food product degradation, including enzymes endogenous in the food, endogenous to microbial metabolism, exogenously applied during processing of the food, and exogenously secreted by the microorganism.

The present gases or gas mixtures act to control oxidation of food products.

The present gases or gas mixtures act to increase the shelf-life of food products whether these are fresh, unprocessed, processed, cooked, smoked, canned, or salted.

The present invention is effective using any means allowing contact between the gas and the food product including: flushing; injecting; sparging; application of vacuum followed by gas flushing; pressurization; introduction into an impermeable or semipermeable film covered or formed container containing product and sealed; having gas continuously flushed through, on, or around a food product; under septic or sterile conditions; wherein the container is pressurized or not; wherein the container is of a bulk, shipping, or individual serving type; wherein the container is a formable pouch, injectable pouch, sealable pouch, formable tray, vacuum formable tray or pouch, heat formable tray or pouch, or film covered tray; wherein the container is frozen, refrigerated or kept at ambient temperature, or later cooked.

Generally, the present invention provides a process for controlling the enzymes which cause microbe to grow in food and/or food by contacting said food with noble gas and/or mixtures of noble gases and/or noble gas-containing mixtures.

A process for controlling the enzymes "produced by the food itself which cause degradation of said food by contacting said food with a noble gas and/or mixtures of noble gas-containing mixtures.

A process for controlling enzymes secreted by spoilage microorganisms in and/or on food by contacting said food with a noble gas and/or mixtures of noble gases and/or noble gas-containing mixtures.

A process for controlling enzymes in and/or on food by contacting said food with a noble gas and/or mixtures of noble gases and/or noble gas-containing mixtures.

A process for preserving color and/or appearance of a food product by contacting said food with a noble gas and/or mixtures of noble gases and/or gas-containing mixtures.

A process for controlling the non-enzymatic chemical oxidation reactions of a food product by contacting said food with a noble gas and/or mixtures of noble gases and/or gas-containing mixtures.

Having described the present invention it will now be apparent to one of ordinary skill in the art that many changes and modifications may be made to the above-described embodiments without departing from the spirit and the scope of the present invention.

What is claimed and desired to be secured by United States Letters Patent is:

1. A process for preserving vegetables, comprising color retention or inhibition of degradative chemical oxidation thereof or a combination thereof, which comprises subjecting said vegetables to a gaseous atmosphere consisting essentially of:
   a) about 80 to 97% volume of argon; and
   b) about 3 to 20% by volume of a second gas selected from the group consisting of krypton, and xenon; based on the total volume of the gaseous atmosphere.

2. The process of claim 1, wherein said vegetables are selected from the group consisting of radishes, broccoli, carrots, green beans, cabbage, lettuce, tomatoes, cucumbers and mixtures thereof.

3. The process of claim 1, wherein said vegetables are in a form of a pre-mixed salad.

4. The process of claim 1, wherein said gaseous atmosphere consists essentially of about 85 to 97% by volume of argon and about 3 to 15% by volume of krypton.

5. The process of claim 1, wherein said vegetables are frozen.

6. The process of claim 1, wherein said vegetables are packaged.

7. The process of claim 1, which further comprises vacuum packaging said vegetables prior to subjecting said vegetables to said gaseous atmosphere.

8. The process of claim 1, wherein said vegetables are subjected to said gaseous atmosphere by flushing, injecting, sparging, applying a vacuum and then flushing, pressurizing, or introducing said gaseous atmosphere into an impermeable or semipermeable film covering said vegetables.

9. The process of claim 1, wherein the vegetables are packed with impermeable or semi-permeable film.

10. The process of claim 1, wherein said preserving further comprises decreasing microorganisms growth on said vegetables.

11. The process of claim 10, wherein said preserving further comprises inhibiting enzymes endogeneous to said vegetables or secreted by said microorganisms.

12. The precess of claim 1, wherein said preserving further comprises maintaining turgor of said vegetables.

13. The process of claim 1, wherein said color retention comprises retention of color due to chlorophyll, carotenes, carotenoids or anthocyanins.

14. The process of claim 1, wherein said gaseous atmosphere consists essentially of 80% to 95% by volume of argon, and 5 to 20% by volume of krypton or xenon.

15. The process of claim 11, which comprises inhibiting enzymes endogeneous to said vegetables, comprising ACC synthase, lipoxygenase, chlorophyllase or peroxidase.

16. A process for preserving vegetables, comprising color retention or inhibition of degradative chemical oxidation thereof or a combination thereof, which comprises subjecting said vegetables to a gaseous atmosphere consisting essentially of:
   i) a carrier gas selected from the group consisting of carbon dioxide, air and oxygen; and
   ii) a mixture of the following gases:
      a) about 80 to 97% volume of argon; and
      b) about 3 to 20% by volume of a second gas selected from the group consisting of krypton, and xenon; based on the total volume of the gaseous atmosphere.

* * * * *